United States Patent
Ma et al.

(10) Patent No.: US 12,507,266 B2
(45) Date of Patent: Dec. 23, 2025

(54) DEFAULT BEAM FOR COMMUNICATION NETWORKS

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US); Bharat Shrestha, San Diego, CA (US); Jun Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/484,411

(22) Filed: Oct. 10, 2023

(65) Prior Publication Data
US 2024/0040597 A1    Feb. 1, 2024

Related U.S. Application Data

(63) Continuation of application No. 17/359,291, filed on Jun. 25, 2021, now Pat. No. 11,930,515.
(Continued)

(51) Int. Cl.
*H04W 72/51*    (2023.01)
*H04W 4/029*    (2018.01)
(Continued)

(52) U.S. Cl.
CPC ......... *H04W 72/51* (2023.01); *H04W 36/322* (2023.05); *H04W 72/046* (2013.01);
(Continued)

(58) Field of Classification Search
CPC .......... H04B 7/18513; H04B 7/18545; H04W 36/06; H04W 36/322; H04W 4/023;
(Continued)

(56) References Cited

U.S. PATENT DOCUMENTS 11,071,164 B2 *   7/2021   Zhou .................... H04W 76/38
2016/0323800 A1   11/2016   Ulupinar et al.
(Continued)

FOREIGN PATENT DOCUMENTS

WO    WO-2019100972 A1    5/2019
WO    WO-2019168762 A1    9/2019
(Continued)

OTHER PUBLICATIONS

Co-pending U.S. Appl. No. 17/304,528, inventor Ma; Liangping, filed Jun. 22, 2021.
(Continued)

*Primary Examiner* — Kashif Siddiqui
(74) *Attorney, Agent, or Firm* — Holland & Hart LLP/QUALCOMM Incorporated

(57) ABSTRACT

Methods, systems, and devices for wireless communications are described. A user equipment (UE) may determine an inactivity timer associated with a first set of one or more beams used for communicating with a network entity associated with a satellite has expired. The UE may identify location information corresponding to the location of the UE with respect to the network entity. The UE may identify beam geometry information for one or more beams associated with the network entity. For example, the UE may receive the beam geometry information from the network entity. The UE may process the location information and the beam geometry information to identify a second set of one or more beams, the second set different than the first set. The
(Continued)

UE and the network entity may communicate according to the second set of one or more beams.

19 Claims, 28 Drawing Sheets

Related U.S. Application Data

(60) Provisional application No. 63/047,769, filed on Jul. 2, 2020.

(51) Int. Cl.
  *H04W 36/32* (2009.01)
  *H04W 72/044* (2023.01)
  *H04W 72/23* (2023.01)
  *H04W 74/04* (2009.01)
  *H04W 74/0833* (2024.01)
  *H04W 74/0838* (2024.01)

(52) U.S. Cl.
  CPC ............ *H04W 72/23* (2023.01); *H04W 74/04* (2013.01); *H04W 4/029* (2018.02); *H04W 74/0833* (2013.01); *H04W 74/0838* (2024.01)

(58) Field of Classification Search
  CPC ... H04W 4/029; H04W 72/046; H04W 72/23; H04W 72/51; H04W 74/006; H04W 74/04; H04W 74/0833; H04W 74/0838
  See application file for complete search history.

(56) References Cited

U.S. PATENT DOCUMENTS

| | | | |
|---|---|---|---|
| 2019/0037451 A1 | 1/2019 | Chaponniere et al. | |
| 2019/0357262 A1* | 11/2019 | Cirik | H04W 24/08 |
| 2020/0052782 A1 | 2/2020 | Wang et al. | |
| 2020/0213067 A1* | 7/2020 | Cirik | H04L 1/1678 |
| 2020/0275485 A1* | 8/2020 | Babaei | H04W 74/006 |
| 2020/0351067 A1* | 11/2020 | Hui | H04L 5/001 |
| 2022/0006600 A1 | 1/2022 | Ma et al. | |
| 2022/0007248 A1* | 1/2022 | Shrestha | H04W 24/08 |
| 2022/0007346 A1 | 1/2022 | Ma | |
| 2022/0007351 A1* | 1/2022 | Ma | H04W 72/23 |
| 2022/0007372 A1 | 1/2022 | Ma et al. | |
| 2023/0224725 A1 | 7/2023 | Ma et al. | |
| 2023/0232384 A1 | 7/2023 | Ma et al. | |

FOREIGN PATENT DOCUMENTS

| | | | |
|---|---|---|---|
| WO | WO-2020020738 A1 * | 1/2020 | ............ H04W 72/23 |
| WO | WO-2022000409 A1 | 1/2022 | |
| WO | WO-2022000418 A1 | 1/2022 | |

OTHER PUBLICATIONS

Co-pending U.S. Appl. No. 17/304,955, inventor Ma; Liangping, filed Jun. 29, 2021.
Co-pending U.S. Appl. No. 17/324,982, inventor Shrestha; Bharat, filed May 19, 2021.
Co-pending U.S. Appl. No. 17/359,377, inventor Ma; Liangping, filed Jun. 25, 2021.
3GPP TR 38.821: "3rd Generation Partnership Project, Technical Specification Group Radio Access Network, Solutions for NR to Support Non-Terrestrial Networks (NTN) (Release16)", 3GPP Standard, Technical Report, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020, XP051860814, pp. 1-140, Section 1, Section 5, Section 7.2.1.1, Section 6.2.3, Section 6.2.4, Sections 7.3.1 and 7.3.2.
International Preliminary Report On Patentability—PCT/US2021/039407—The International Bureau of WIPO—Geneva, Switzerland—Jan. 12, 2023.
International Search Report and Written Opinion—PCT/US2021/039407—ISA/EPO—Jan. 21, 2022.
Partial International Search Report—PCT/US2021/039407—ISA/EPO—Oct. 29, 2021.

* cited by examiner

DEFAULT BEAM FOR COMMUNICATION NETWORKS

CROSS REFERENCE

The present Application for Patent is a continuation of U.S. patent application Ser. No. 17/359,291 by Ma et al., entitled "DEFAULT BEAM FOR COMMUNICATION NETWORKS," filed Jun. 25, 2021, which claims the benefit of U.S. Provisional Patent Application No. 63/047,769 by Ma et al., entitled "DEFAULT SATELLITE BEAM FOR COMMUNICATION NETWORKS," filed Jul. 2, 2020, assigned to the assignee hereof, and expressly incorporated by reference herein.

INTRODUCTION

The following relates to wireless communications and more specifically to reliability enhancements at a user equipment (UE).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as a UE.

SUMMARY

A method for wireless communications at a UE is described. The method may include processing location information corresponding to a location of the UE with respect to a network entity and beam geometry information for one or more beams associated with the network entity to identify a second set of one or more beams based at least in part on an inactivity timer associated with a first set of one or more beams being expired, the second set of one or more beams different from the first set of one or more beams and communicating with the network entity according to the second set of one or more beams.

An apparatus for wireless communications at a UE is described. The apparatus may include a processor and memory coupled to the processor, the processor and memory configured to cause the apparatus to process location information corresponding to a location of the UE with respect to a network entity and beam geometry information for one or more beams associated with the network entity to identify a second set of one or more beams based at least in part on an inactivity timer associated with a first set of one or more beams being expired, the second set of one or more beams different from the first set of one or more beams and communicate with the network entity according to the second set of one or more beams.

Another apparatus for wireless communications at a UE is described. The apparatus may include means for processing location information corresponding to a location of the UE with respect to a network entity and beam geometry information for one or more beams associated with the network entity to identify a second set of one or more beams based at least in part on an inactivity timer associated with a first set of one or more beams being expired, the second set of one or more beams different from the first set of one or more beams and means for communicating with the network entity according to the second set of one or more beams.

A non-transitory computer-readable medium storing code for wireless communications at a UE is described. The code may include instructions executable by a processor to process location information corresponding to a location of the UE with respect to a network entity and beam geometry information for one or more beams associated with the network entity to identify a second set of one or more beams based at least in part on an inactivity timer associated with a first set of one or more beams being expired, the second set of one or more beams different from the first set of one or more beams and communicate with the network entity according to the second set of one or more beams.

Some examples of the method, apparatuses, and non-transitory computer-readable medium described herein may further include operations, features, means, or instructions for receiving, from the network entity, an indication of the beam geometry information for the one or more beams associated with the network entity.

Some examples of the method, apparatuses, and non-transitory computer-readable medium described herein may further include operations, features, means, or instructions for determining a set of coordinates corresponding to the location of the UE, where the location information includes the set of coordinates and transmitting, to the network entity, an indication of the determined set of coordinates.

In some examples of the method, apparatuses, and non-transitory computer-readable medium described herein, the beam geometry information may be associated with the first set of one or more beams.

Some examples of the method, apparatuses, and non-transitory computer-readable medium described herein may further include operations, features, means, or instructions for determining a set of coordinates corresponding to the location of the UE, where the location information includes the set of coordinates, determining an identifier associated with the network entity, the identifier including information associated with the beam geometry information for the one or more beams associated with the network entity, and identifying the second set of one or more beams may be based at least in part on the set of coordinates and the identifier.

In some examples of the method, apparatuses, and non-transitory computer-readable medium described herein, the second set of one or more beams includes a set of multiple beam tuples, each beam tuple of the set of multiple beam tuples including a subset of the second set of one or more beams and each beam tuple associated with a time interval during which the UE may be communicating with the network entity using the beam tuple.

Some examples of the method, apparatuses, and non-transitory computer-readable medium described herein may further include operations, features, means, or instructions for receiving, from the network entity, an indication of the second set of one or more beams.

Some examples of the method, apparatuses, and non-transitory computer-readable medium described herein may further include operations, features, means, or instructions for transmitting, to the network entity, an indication of the second set of one or more beams and receiving a feedback message corresponding to the indication.

In some examples of the method, apparatuses, and non-transitory computer-readable medium described herein, the communicating with the network entity may include operations, features, means, or instructions for performing a beam switching operation from the first set of one or more beams to the second set of one or more beams.

Some examples of the method, apparatuses, and non-transitory computer-readable medium described herein may further include operations, features, means, or instructions for switching to one or more bandwidth parts (BWPs) associated with the second set of one or more beams.

Some examples of the method, apparatuses, and non-transitory computer-readable medium described herein may further include operations, features, means, or instructions for determining the inactivity timer associated with the first set of one or more beams used for communicating with the network entity may have expired, identifying the location information corresponding to the location of the UE with respect to the network entity, and identifying the beam geometry information for the one or more beams associated with the network entity.

In some examples of the method, apparatuses, and non-transitory computer-readable medium described herein, the identifying the second set of one or more beams may include operations, features, means, or instructions for identifying one or more resources associated with the second set of one or more beams, the one or more resources allocated for a scheduling request, monitoring a downlink control channel using one or more BWPs associated with the second set of one or more beams for the one or more resources, and transmitting, to the network entity, the scheduling request based at least in part on the monitoring.

In some examples of the method, apparatuses, and non-transitory computer-readable medium described herein, the identifying the second set of one or more beams may include operations, features, means, or instructions for receiving, from the network entity, an indication of a random access preamble and a random access occasion associated with a contention free random access procedure and performing the contention free random access procedure according to the random access preamble and the random access occasion.

In some examples of the method, apparatuses, and non-transitory computer-readable medium described herein, the identifying the second set of one or more beams may include operations, features, means, or instructions for performing a contention based random access procedure for at least one beam of the second set of one or more beams.

In some examples of the method, apparatuses, and non-transitory computer-readable medium described herein, the identifying the beam geometry information for the one or more beams associated with the network entity may include operations, features, means, or instructions for identifying the beam geometry information as a function of time.

In some examples of the method, apparatuses, and non-transitory computer-readable medium described herein, the beam geometry information includes a shape, a size, a velocity, an angular width, or a combination associated with the one or more beams.

Some examples of the method, apparatuses, and non-transitory computer-readable medium described herein may further include operations, features, means, or instructions for calculating one or more parameters associated with the beam geometry information based at least in part on an altitude of the network entity, a speed of the network entity, a direction of the one or more beams, an angular width of the one or more beams or a combination thereof.

In some examples of the method, apparatuses, and non-transitory computer-readable medium described herein, the UE and the network entity may be nodes in a non-terrestrial network (NTN).

A method for wireless communications at a UE is described. The method may include receiving, from a network entity, an indication of a second set of one or more beams based at least in part on an inactivity timer associated with a first set of one or more beams being expired, the second set of one or more beams different from the first set of one or more beams and communicating with the network entity according to the second set of one or more beams.

An apparatus for wireless communications at a UE is described. The apparatus may include a processor and memory coupled to the processor, the processor and memory configured to cause the apparatus to receive, from a network entity, an indication of a second set of one or more beams based at least in part on an inactivity timer associated with a first set of one or more beams being expired, the second set of one or more beams different from the first set of one or more beams and communicate with the network entity according to the second set of one or more beams.

Another apparatus for wireless communications at a UE is described. The apparatus may include means for receiving, from a network entity, an indication of a second set of one or more beams based at least in part on an inactivity timer associated with a first set of one or more beams being expired, the second set of one or more beams different from the first set of one or more beams and means for communicating with the network entity according to the second set of one or more beams.

A non-transitory computer-readable medium storing code for wireless communications at a UE is described. The code may include instructions executable by a processor to receive, from a network entity, an indication of a second set of one or more beams based at least in part on an inactivity timer associated with a first set of one or more beams being expired, the second set of one or more beams different from the first set of one or more beams and communicate with the network entity according to the second set of one or more beams.

Some examples of the method, apparatuses, and non-transitory computer-readable medium described herein may further include operations, features, means, or instructions for determining the inactivity timer associated with the first set of one or more beams used for communicating with the network entity may have expired, where transmitting the indication may be based at least in part on determining the inactivity timer may have expired and the first set of one or more beams may be a sequence of beams.

Some examples of the method, apparatuses, and non-transitory computer-readable medium described herein may further include operations, features, means, or instructions for identifying location information corresponding to a location of the UE with respect to the network entity and transmitting, to the network entity, the location information.

In some examples of the method, apparatuses, and non-transitory computer-readable medium described herein, the location information includes a set of coordinates.

In some examples of the method, apparatuses, and non-transitory computer-readable medium described herein, the communicating with the network entity may include operations, features, means, or instructions for performing a beam switching operation from the first set of one or more beams to the second set of one or more beams.

Some examples of the method, apparatuses, and non-transitory computer-readable medium described herein may further include operations, features, means, or instructions for switching to one or more BWPs associated with the second set of one or more beams.

In some examples of the method, apparatuses, and non-transitory computer-readable medium described herein, the UE and the network entity may be nodes in a non-terrestrial network (NTN).

A method for wireless communications at a network entity is described. The method may include transmitting, to a UE, a message via a first set of one or more beams, transmitting, to the UE, an indication of beam geometry information for one or more beams associated with the network entity, and communicating with the UE according to a second set of one or more beams, the second set of one or more beams different from the first set of one or more beams.

An apparatus for wireless communications at a network entity is described. The apparatus may include a processor and memory coupled to the processor, the processor and memory configured to cause the apparatus to transmit, to a UE, a message via a first set of one or more beams, transmit, to the UE, an indication of beam geometry information for one or more beams associated with the network entity, and communicate with the UE according to a second set of one or more beams, the second set of one or more beams different from the first set of one or more beams.

Another apparatus for wireless communications at a network entity is described. The apparatus may include means for transmitting, to a UE, a message via a first set of one or more beams, means for transmitting, to the UE, an indication of beam geometry information for one or more beams associated with the network entity, and means for communicating with the UE according to a second set of one or more beams, the second set of one or more beams different from the first set of one or more beams.

A non-transitory computer-readable medium storing code for wireless communications at a network entity is described. The code may include instructions executable by a processor to transmit, to a UE, a message via a first set of one or more beams, transmit, to the UE, an indication of beam geometry information for one or more beams associated with the network entity, and communicate with the UE according to a second set of one or more beams, the second set of one or more beams different from the first set of one or more beams.

Some examples of the method, apparatuses, and non-transitory computer-readable medium described herein may further include operations, features, means, or instructions for identifying location information corresponding to a location of the UE with respect to the network entity and determining the beam geometry information for the one or more beams associated with the network entity.

In some examples of the method, apparatuses, and non-transitory computer-readable medium described herein, the determining the beam geometry information may include operations, features, means, or instructions for receiving, from the UE, an indication of the location information corresponding to the location of the UE with respect to the network entity.

Some examples of the method, apparatuses, and non-transitory computer-readable medium described herein may further include operations, features, means, or instructions for receiving, from the UE, an indication of a set of coordinates corresponding to the location of the UE.

In some examples of the method, apparatuses, and non-transitory computer-readable medium described herein, the beam geometry information may be associated with the first set of one or more beams.

Some examples of the method, apparatuses, and non-transitory computer-readable medium described herein may further include operations, features, means, or instructions for identifying the second set of one or more beams based at least in part on location information corresponding to a location of the UE and transmitting, to the UE, an indication of the second set of one or more beams.

In some examples of the method, apparatuses, and non-transitory computer-readable medium described herein, the second set of one or more beams includes a set of multiple beam tuples, each beam tuple of the set of multiple beam tuples including a subset of the second set of one or more beams and each beam tuple associated with a time interval during which the UE may be communicating with the network entity using the beam tuple.

Some examples of the method, apparatuses, and non-transitory computer-readable medium described herein may further include operations, features, means, or instructions for receiving, from the UE, an indication of the second set of one or more beams and transmitting a feedback message based at least in part on the received indication.

Some examples of the method, apparatuses, and non-transitory computer-readable medium described herein may further include operations, features, means, or instructions for transmitting, to the UE, an indication of one or more resources associated with the second set of one or more beams, the one or more resources allocated for a scheduling request and receiving, from the UE, the scheduling request during the one or more resources.

Some examples of the method, apparatuses, and non-transitory computer-readable medium described herein may further include operations, features, means, or instructions for transmitting, to the UE, an indication of a random access preamble and a random access occasion associated with a contention free random access procedure.

Some examples of the method, apparatuses, and non-transitory computer-readable medium described herein may further include operations, features, means, or instructions for identifying the beam geometry information as a function of time.

In some examples of the method, apparatuses, and non-transitory computer-readable medium described herein, the beam geometry information includes a shape, a size, a velocity, an angular width, or a combination associated with the one or more beams.

Some examples of the method, apparatuses, and non-transitory computer-readable medium described herein may further include operations, features, means, or instructions for calculating one or more parameters associated with the beam geometry information based at least in part on an altitude of the network entity, a speed of the network entity, a direction of the one or more beams, an angular width of the one or more beams or a combination thereof.

In some examples of the method, apparatuses, and non-transitory computer-readable medium described herein, the UE and the network entity may be nodes in a non-terrestrial network (NTN).

A method for wireless communications at a network entity is described. The method may include transmitting, to a UE, an indication of a second set of one or more beams based at least in part on an inactivity timer associated with a first set of one or more beams used for communicating with the UE has expired, the second set of one or more beams different from the first set of one or more beams and communicating with the UE according to the second set of one or more beams.

An apparatus for wireless communications at a network entity is described. The apparatus may include a processor and memory coupled to the processor, the processor and memory configured to cause the apparatus to transmit, to a UE, an indication of a second set of one or more beams based at least in part on an inactivity timer associated with a first set of one or more beams used for communicating with the UE has expired, the second set of one or more beams different from the first set of one or more beams and communicate with the UE according to the second set of one or more beams.

Another apparatus for wireless communications at a network entity is described. The apparatus may include means for transmitting, to a UE, an indication of a second set of one or more beams based at least in part on an inactivity timer associated with a first set of one or more beams used for communicating with the UE has expired, the second set of one or more beams different from the first set of one or more beams and means for communicating with the UE according to the second set of one or more beams.

A non-transitory computer-readable medium storing code for wireless communications at a network entity is described. The code may include instructions executable by a processor to transmit, to a UE, an indication of a second set of one or more beams based at least in part on an inactivity timer associated with a first set of one or more beams used for communicating with the UE has expired, the second set of one or more beams different from the first set of one or more beams and communicate with the UE according to the second set of one or more beams.

Some examples of the method, apparatuses, and non-transitory computer-readable medium described herein may further include operations, features, means, or instructions for determining the inactivity timer associated with the first set of one or more beams used for communicating with the UE may have expired, where transmitting the indication may be based at least in part on determining the inactivity timer may have expired and the first set of one or more beams may be a sequence of beams.

Some examples of the method, apparatuses, and non-transitory computer-readable medium described herein may further include operations, features, means, or instructions for receiving, from the UE, location information corresponding to a location of the UE with respect to the network entity and determining the second set of one or more beams based at least in part on the location information.

In some examples of the method, apparatuses, and non-transitory computer-readable medium described herein, the location information includes a set of coordinates.

Some examples of the method, apparatuses, and non-transitory computer-readable medium described herein may further include operations, features, means, or instructions for determining the second set of one or more beams based at least in part on the first set of one or more beams.

In some examples of the method, apparatuses, and non-transitory computer-readable medium described herein, the communicating with the network entity may include operations, features, means, or instructions for performing a beam switching operation from the first set of one or more beams to the second set of one or more beams.

Some examples of the method, apparatuses, and non-transitory computer-readable medium described herein may further include operations, features, means, or instructions for switching to one or more BWPs associated with the second set of one or more beams.

In some examples of the method, apparatuses, and non-transitory computer-readable medium described herein, the UE and the network entity may be nodes in a non-terrestrial network (NTN).

A method for wireless communications at a UE is described. The method may include receiving, from a network entity, an indication of a second BWP of a set of multiple BWPs, each BWP of the set of multiple BWPs associated with at least one of location information and timing information, the location information corresponding to a location of the UE with respect to the network entity, switching from a first BWP to the second BWP based at least in part on the location information and the timing information, and communicating with the network entity using a beam of a set of one or more beams, the beam corresponding to the second BWP.

An apparatus for wireless communications at a UE is described. The apparatus may include a processor and memory coupled to the processor, the processor and memory configured to cause the apparatus to receive, from a network entity, an indication of a second BWP of a set of multiple BWPs, each BWP of the set of multiple BWPs associated with at least one of location information and timing information, the location information corresponding to a location of the UE with respect to the network entity, switch from a first BWP to the second BWP based at least in part on the location information and the timing information, and communicate with the network entity using a beam of a set of one or more beams, the beam corresponding to the second BWP.

Another apparatus for wireless communications at a UE is described. The apparatus may include means for receiving, from a network entity, an indication of a second BWP of a set of multiple BWPs, each BWP of the set of multiple BWPs associated with at least one of location information and timing information, the location information corresponding to a location of the UE with respect to the network entity, means for switching from a first BWP to the second BWP based at least in part on the location information and the timing information, and means for communicating with the network entity using a beam of a set of one or more beams, the beam corresponding to the second BWP.

A non-transitory computer-readable medium storing code for wireless communications at a UE is described. The code may include instructions executable by a processor to receive, from a network entity, an indication of a second BWP of a set of multiple BWPs, each BWP of the set of multiple BWPs associated with at least one of location information and timing information, the location information corresponding to a location of the UE with respect to the network entity, switch from a first BWP to the second BWP based at least in part on the location information and the timing information, and communicate with the network entity using a beam of a set of one or more beams, the beam corresponding to the second BWP.

In some examples of the method, apparatuses, and non-transitory computer-readable medium described herein, the set of one or more beams may be a sequence of beams.

Some examples of the method, apparatuses, and non-transitory computer-readable medium described herein may further include operations, features, means, or instructions for mapping each beam in the sequence of beams to a corresponding BWP.

A method for wireless communications at a network entity is described. The method may include transmitting, to a UE, an indication of a second BWP of a set of multiple BWPs, each BWP of the set of multiple BWPs associated with at least one of location information and timing information, the location information corresponding to a location of the UE with respect to the network entity, switching from a first BWP to the second BWP based at least in part on the location information and the timing information, and communicating with the UE using a beam of a set of one or more beams, the beam corresponding to the second BWP.

An apparatus for wireless communications at a network entity is described. The apparatus may include a processor and memory coupled to the processor, the processor and memory configured to cause the apparatus to transmit, to a UE, an indication of a second BWP of a set of multiple BWPs, each BWP of the set of multiple BWPs associated with at least one of location information and timing information, the location information corresponding to a location of the UE with respect to the network entity, switch from a first BWP to the second BWP based at least in part on the location information and the timing information, and communicate with the UE using a beam of a set of one or more beams, the beam corresponding to the second BWP.

Another apparatus for wireless communications at a network entity is described. The apparatus may include means for transmitting, to a UE, an indication of a second BWP of a set of multiple BWPs, each BWP of the set of multiple BWPs associated with at least one of location information and timing information, the location information corresponding to a location of the UE with respect to the network entity, means for switching from a first BWP to the second BWP based at least in part on the location information and the timing information, and means for communicating with the UE using a beam of a set of one or more beams, the beam corresponding to the second BWP.

A non-transitory computer-readable medium storing code for wireless communications at a network entity is described. The code may include instructions executable by a processor to transmit, to a UE, an indication of a second BWP of a set of multiple BWPs, each BWP of the set of multiple BWPs associated with at least one of location information and timing information, the location information corresponding to a location of the UE with respect to the network entity, switch from a first BWP to the second BWP based at least in part on the location information and the timing information, and communicate with the UE using a beam of a set of one or more beams, the beam corresponding to the second BWP.

In some examples of the method, apparatuses, and non-transitory computer-readable medium described herein, the set of one or more beams may be a sequence of beams.

Some examples of the method, apparatuses, and non-transitory computer-readable medium described herein may further include operations, features, means, or instructions for mapping each beam in the sequence of beams to a corresponding BWP.

A method of wireless communications at a UE is described. The method may include determining an inactivity timer associated with a first set of one or more beams used for communicating with a network entity has expired, identifying location information corresponding to a location of the UE with respect to the network entity, identifying beam geometry information for one or more beams associated with the network entity, processing the location information and the beam geometry information to identify a second set of one or more beams based on the expired inactivity timer, the second set of one or more beams different from the first set of one or more beams, and communicating with the network entity according to the second set of one or more beams.

An apparatus for wireless communications at a UE is described. The apparatus may include a processor and memory coupled to the processor, the processor and memory configured to cause the apparatus to determine an inactivity timer associated with a first set of one or more beams used for communicating with a network entity has expired, identify location information corresponding to a location of the UE with respect to the network entity, identify beam geometry information for one or more beams associated with the network entity, process the location information and the beam geometry information to identify a second set of one or more beams based on the expired inactivity timer, the second set of one or more beams different from the first set of one or more beams, and communicate with the network entity according to the second set of one or more beams.

Another apparatus for wireless communications at a UE is described. The apparatus may include means for determining an inactivity timer associated with a first set of one or more beams used for communicating with a network entity has expired, identifying location information corresponding to a location of the UE with respect to the network entity, identifying beam geometry information for one or more beams associated with the network entity, processing the location information and the beam geometry information to identify a second set of one or more beams based on the expired inactivity timer, the second set of one or more beams different from the first set of one or more beams, and communicating with the network entity according to the second set of one or more beams.

A non-transitory computer-readable medium storing code for wireless communications at a UE is described. The code may include instructions executable by a processor to determine an inactivity timer associated with a first set of one or more beams used for communicating with a network entity has expired, identify location information corresponding to a location of the UE with respect to the network entity, identify beam geometry information for one or more beams associated with the network entity, process the location information and the beam geometry information to identify a second set of one or more beams based on the expired inactivity timer, the second set of one or more beams different from the first set of one or more beams, and communicate with the network entity according to the second set of one or more beams.

Some examples of the method, apparatuses, and non-transitory computer-readable medium described herein may further include operations, features, means, or instructions for receiving, from the network entity, an indication of the beam geometry information for the one or more beams associated with the network entity.

Some examples of the method, apparatuses, and non-transitory computer-readable medium described herein may further include operations, features, means, or instructions for determining a set of coordinates corresponding to the location of the UE, where the location information includes the set of coordinates, and transmitting, to the network entity, an indication of the determined set of coordinates.

In some examples of the method, apparatuses, and non-transitory computer-readable medium described herein, the beam geometry information may be associated with the first set of one or more beams.

Some examples of the method, apparatuses, and non-transitory computer-readable medium described herein may further include operations, features, means, or instructions for determining a set of coordinates corresponding to the location of the UE, where the location information includes the set of coordinates, and determining an identifier associated with the network entity, the identifier including information associated with the beam geometry information for the one or more beams associated with the network entity, where identifying the second set of one or more beams may be based on the set of coordinates and the identifier.

In some examples of the method, apparatuses, and non-transitory computer-readable medium described herein, the second set of one or more beams includes a set of beam tuples, each beam tuple of the set of beam tuples including a subset of the second set of one or more beams and each beam tuple associated with a time interval during which the UE may be communicating with the network entity using the beam tuple.

Some examples of the method, apparatuses, and non-transitory computer-readable medium described herein may further include operations, features, means, or instructions for receiving, from the network entity, an indication of the second set of one or more beams.

Some examples of the method, apparatuses, and non-transitory computer-readable medium described herein may further include operations, features, means, or instructions for transmitting, to the network entity, an indication of the second set of one or more beams, and receiving a feedback message corresponding to the indication.

In some examples of the method, apparatuses, and non-transitory computer-readable medium described herein, communicating with the network entity further may include operations, features, means, or instructions for performing a beam switching operation from the first set of one or more beams to the second set of one or more beams.

Some examples of the method, apparatuses, and non-transitory computer-readable medium described herein may further include operations, features, means, or instructions for switching to one or more BWPs associated with the second set of one or more beams.

In some examples of the method, apparatuses, and non-transitory computer-readable medium described herein, identifying the second set of one or more beams further may include operations, features, means, or instructions for identifying one or more resources associated with the second set of one or more beams, the one or more resources allocated for a scheduling request, monitoring a downlink control channel using one or more BWPs associated with the second set of one or more beams for the one or more resources, and transmitting, to the network entity, the scheduling request based on the monitoring.

In some examples of the method, apparatuses, and non-transitory computer-readable medium described herein, identifying the second set of one or more beams further may include operations, features, means, or instructions for receiving, from the network entity, an indication of a random access preamble and a random access occasion associated with a contention free random access procedure, and performing the contention free random access procedure according to the random access preamble and the random access occasion.

In some examples of the method, apparatuses, and non-transitory computer-readable medium described herein, identifying the second set of one or more beams further may include operations, features, means, or instructions for performing a contention based random access procedure for at least one beam of the second set of one or more beams.

In some examples of the method, apparatuses, and non-transitory computer-readable medium described herein, identifying the beam geometry information for the one or more beams associated with the network entity further may include operations, features, means, or instructions for identifying the beam geometry information as a function of time.

In some examples of the method, apparatuses, and non-transitory computer-readable medium described herein, the beam geometry information includes a shape, a size, a velocity, an angular width, or a combination associated with the one or more beams.

Some examples of the method, apparatuses, and non-transitory computer-readable medium described herein may further include operations, features, means, or instructions for calculating one or more parameters associated with the beam geometry information based on an altitude of the network entity, a speed of the network entity, a direction of the one or more beams, an angular width of the one or more beams or a combination thereof.

In some examples of the method, apparatuses, and non-transitory computer-readable medium described herein, the UE and the network entity may be nodes in a non-terrestrial network (NTN).

A method of wireless communications at a network entity is described. The method may include transmitting, to a UE, a message via a first set of one or more beams, identifying location information corresponding to a location of the UE with respect to the network entity, determining beam geometry information for one or more beams associated with the network entity, transmitting, to the UE, an indication of the determined beam geometry information, and communicating with the UE according to a second set of one or more beams, the second set of one or more beams different from the first set of one or more beams.

An apparatus for wireless communications at a network entity is described. The apparatus may include a processor and memory coupled to the processor, the processor and memory configured to cause the apparatus to transmit, to a UE, a message via a first set of one or more beams, identify location information corresponding to a location of the UE with respect to the network entity, determine beam geometry information for one or more beams associated with the network entity, transmit, to the UE, an indication of the determined beam geometry information, and communicate with the UE according to a second set of one or more beams, the second set of one or more beams different from the first set of one or more beams.

Another apparatus for wireless communications at a network entity is described. The apparatus may include means for transmitting, to a UE, a message via a first set of one or more beams, identifying location information corresponding to a location of the UE with respect to the network entity, determining beam geometry information for one or more beams associated with the network entity, transmitting, to the UE, an indication of the determined beam geometry information, and communicating with the UE according to a second set of one or more beams, the second set of one or more beams different from the first set of one or more beams.

A non-transitory computer-readable medium storing code for wireless communications at a network entity is described. The code may include instructions executable by a processor to transmit, to a UE, a message via a first set of one or more beams, identify location information corresponding to a location of the UE with respect to the network entity, determine beam geometry information for one or more beams associated with the network entity, transmit, to the UE, an indication of the determined beam geometry information, and communicate with the UE according to a second set of one or more beams, the second set of one or more beams different from the first set of one or more beams.

In some examples of the method, apparatuses, and non-transitory computer-readable medium described herein, determining the beam geometry information further may include operations, features, means, or instructions for receiving, from the UE, an indication of the location information corresponding to the location of the UE with respect to the network entity.

Some examples of the method, apparatuses, and non-transitory computer-readable medium described herein may further include operations, features, means, or instructions for receiving, from the UE, an indication of a set of coordinates corresponding to the location of the UE.

In some examples of the method, apparatuses, and non-transitory computer-readable medium described herein, the beam geometry information may be associated with the first set of one or more beams.

Some examples of the method, apparatuses, and non-transitory computer-readable medium described herein may further include operations, features, means, or instructions for identifying the second set of one or more beams based on the location information, and transmitting, to the UE, an indication of the second set of one or more beams.

In some examples of the method, apparatuses, and non-transitory computer-readable medium described herein, the second set of one or more beams includes a set of beam tuples, each beam tuple of the set of beam tuples including a subset of the second set of one or more beams and each beam tuple associated with a time interval during which the UE may be communicating with the network entity using the beam tuple.

Some examples of the method, apparatuses, and non-transitory computer-readable medium described herein may further include operations, features, means, or instructions for receiving, from the UE, an indication of the second set of one or more beams, and transmitting a feedback message based on the received indication.

Some examples of the method, apparatuses, and non-transitory computer-readable medium described herein may further include operations, features, means, or instructions for transmitting, to the UE, an indication of one or more resources associated with the second set of one or more beams, the one or more resources allocated for a scheduling request, and receiving, from the UE, the scheduling request during the one or more resources.

Some examples of the method, apparatuses, and non-transitory computer-readable medium described herein may further include operations, features, means, or instructions for transmitting, to the UE, an indication of a random access preamble and a random access occasion associated with a contention free random access procedure.

Some examples of the method, apparatuses, and non-transitory computer-readable medium described herein may further include operations, features, means, or instructions for identifying the beam geometry information as a function of time.

In some examples of the method, apparatuses, and non-transitory computer-readable medium described herein, the beam geometry information includes a shape, a size, a velocity, an angular width, or a combination associated with the one or more beams.

Some examples of the method, apparatuses, and non-transitory computer-readable medium described herein may further include operations, features, means, or instructions for calculating one or more parameters associated with the beam geometry information based on an altitude of the network entity, a speed of the network entity, a direction of the one or more beams, an angular width of the one or more beams or a combination thereof.

In some examples of the method, apparatuses, and non-transitory computer-readable medium described herein, the UE and the network entity may be nodes in an NTN.

A method of wireless communications at a UE is described. The method may include determining an inactivity timer associated with a first set of one or more beams used for communicating with a network entity has expired, receiving, from the network entity, an indication of a second set of one or more beams based on the expired inactivity timer, the second set of one or more beams different from the first set of one or more beams, and communicating with the network entity according to the second set of one or more beams.

An apparatus for wireless communications at a UE is described. The apparatus may include a processor and memory coupled to the processor, the processor and memory configured to cause the apparatus to determine an inactivity timer associated with a first set of one or more beams used for communicating with a network entity has expired, receive, from the network entity, an indication of a second set of one or more beams based on the expired inactivity timer, the second set of one or more beams different from the first set of one or more beams, and communicate with the network entity according to the second set of one or more beams.

Another apparatus for wireless communications at a UE is described. The apparatus may include means for determining an inactivity timer associated with a first set of one or more beams used for communicating with a network entity has expired, receiving, from the network entity, an indication of a second set of one or more beams based on the expired inactivity timer, the second set of one or more beams different from the first set of one or more beams, and communicating with the network entity according to the second set of one or more beams.

A non-transitory computer-readable medium storing code for wireless communications at a UE is described. The code may include instructions executable by a processor to determine an inactivity timer associated with a first set of one or more beams used for communicating with a network entity has expired, receive, from the network entity, an indication of a second set of one or more beams based on the expired inactivity timer, the second set of one or more beams different from the first set of one or more beams, and communicate with the network entity according to the second set of one or more beams.

Some examples of the method, apparatuses, and non-transitory computer-readable medium described herein may further include operations, features, means, or instructions for identifying location information corresponding to a location of the UE with respect to the network entity, and transmitting, to the network entity, the location information.

In some examples of the method, apparatuses, and non-transitory computer-readable medium described herein, the location information includes a set of coordinates.

Some examples of the method, apparatuses, and non-transitory computer-readable medium described herein may further include operations, features, means, or instructions for performing a beam switching operation from the first set of one or more beams to the second set of one or more beams.

Some examples of the method, apparatuses, and non-transitory computer-readable medium described herein may further include operations, features, means, or instructions for switching to one or more BWPs associated with the second set of one or more beams.

In some examples of the method, apparatuses, and non-transitory computer-readable medium described herein, the UE and the network entity may be nodes in an NTN.

A method of wireless communications at a network entity is described. The method may include determining an inactivity timer associated with a first set of one or more beams used for communicating with a network entity has expired, transmitting, to a UE, an indication of a second set of one or more beams based on the expired inactivity timer, the second set of one or more beams different from the first set of one or more beams, and communicating with the UE according to the second set of one or more beams.

An apparatus for wireless communications at a network entity is described. The apparatus may include a processor and memory coupled to the processor, the processor and memory configured to cause the apparatus to determine an inactivity timer associated with a first set of one or more beams used for communicating with a UE has expired, transmit, to a UE, an indication of a second set of one or more beams based on the expired inactivity timer, the second set of one or more beams different from the first set of one or more beams, and communicate with the UE according to the second set of one or more beams.

Another apparatus for wireless communications at a network entity is described. The apparatus may include means for determining an inactivity timer associated with a first set of one or more beams used for communicating with a UE has expired, transmitting, to a UE, an indication of a second set of one or more beams based on the expired inactivity timer, the second set of one or more beams different from the first set of one or more beams, and communicating with the UE according to the second set of one or more beams.

A non-transitory computer-readable medium storing code for wireless communications at a network entity is described. The code may include instructions executable by a processor to determine an inactivity timer associated with a first set of one or more beams used for communicating with a UE has expired, transmit, to a UE, an indication of a second set of one or more beams based on the expired inactivity timer, the second set of one or more beams different from the first set of one or more beams, and communicate with the UE according to the second set of one or more beams.

Some examples of the method, apparatuses, and non-transitory computer-readable medium described herein may further include operations, features, means, or instructions for receiving, from the UE, location information corresponding to a location of the UE with respect to the network entity, and determining the second set of one or more beams based on the location information.

In some examples of the method, apparatuses, and non-transitory computer-readable medium described herein, the location information includes a set of coordinates.

Some examples of the method, apparatuses, and non-transitory computer-readable medium described herein may further include operations, features, means, or instructions for determining the second set of one or more beams based on the first set of one or more beams.

Some examples of the method, apparatuses, and non-transitory computer-readable medium described herein may further include operations, features, means, or instructions for performing a beam switching operation from the first set of one or more beams to the second set of one or more beams.

Some examples of the method, apparatuses, and non-transitory computer-readable medium described herein may further include operations, features, means, or instructions for switching to one or more BWPs associated with the second set of one or more beams.

In some examples of the method, apparatuses, and non-transitory computer-readable medium described herein, the UE and the network entity may be nodes in an NTN.

DETAILED DESCRIPTION

Figure 1:
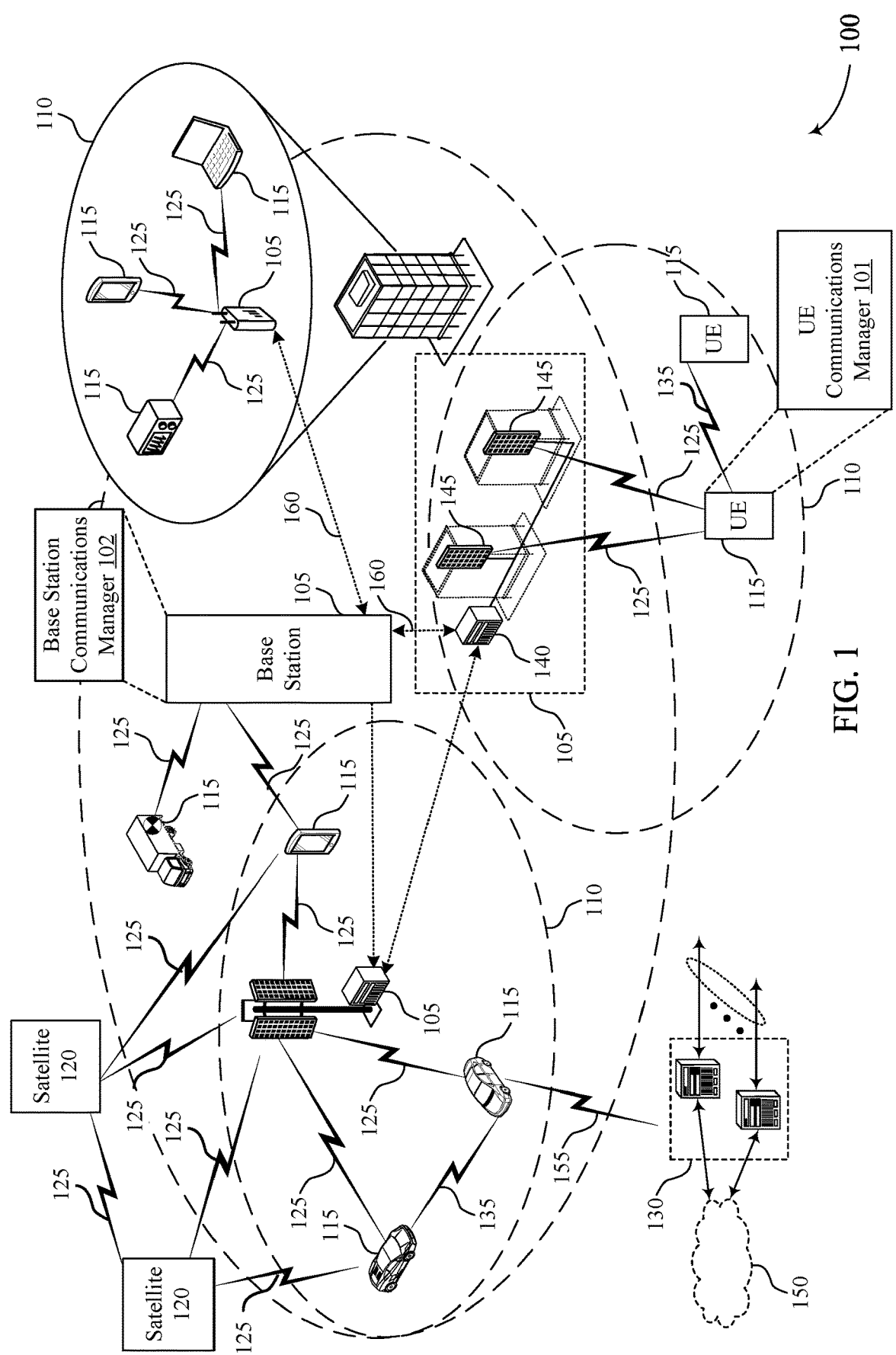
FIGS. 1 through 3 illustrate examples of wireless communications systems that support default beam for communication networks in accordance with one or more aspects of the present disclosure.

In some wireless communication environments, such as in non-terrestrial networks (e.g., satellite supported networks), beam switching may occur frequently relative to other environments (e.g., terrestrial networks). This may be due to beam coverage being relatively small while the satellites may be moving with a relatively high rate of speed. A network may configure a user equipment (UE) with each beam supported by a satellite as well as an initial resource (e.g., bandwidth part) per beam. As the beam footprints move (or as the UE moves), the network may signal the UE as to which bandwidth part to utilize. In some cases, a wireless communications system may limit the quantity of bandwidth parts that are configured at a UE. This may be due to the size of a field that is used to signal a bandwidth part. Because the UE and the network may be mobile, the limitation of bandwidth parts may affect a UEs ability to efficiently switch between beams.

In some cases, a UE and a satellite may transmit control information or data messages using one or more beams associated with one or more BWPs. The satellite and the UE may be thousands of kilometers apart and it may take some time for electromagnetic waves to propagate over the distance between the satellite and the UE. The distance that a transmission travels may result in substantial signal degradation due to, for example, atmospheric effects, interference from other radio frequency sources, signal attenuation due to vegetation or structures, and the like. Further, due to the relatively large round trip delay (RTD) associated with propagation delays (e.g., the amount of time for a signal to travel between a sender and a receiver) between the satellite and the UE, an inactivity timer associated with a beam may expire. The UE may use an inactivity timer to determine if one or more BWPs have expired (i.e., are no longer active). In some examples, such as when the satellite is in low earth orbit (e.g., an orbit close to the plant Earth or the area of space below an altitude of 2,000 kilometers (km)), the inactivity timer may expire prior to the UE leaving the coverage of the beam. However, when the inactivity timer expires, the UE may revert back to one or more default BWPs associated with an outdated beam. Additionally or alternatively, due to the high mobility of the UE relative to the satellite, the UE may frequently switch beams. In some cases, the beam switching operation may fail (e.g., due to loss of control messages), and the UE may revert back to using an outdated beam, which may cause high signaling volume and inefficient resource allocation at the UE (e.g., due to cell search operations).

As described herein, a UE may determine a default satellite beam while considering the mobility of the satellite, which may improve the efficiency of beam switching operations in non-terrestrial networks (NTNs) among other benefits. For example, the UE may determine an inactivity timer associated with a beam has expired. In some cases, the UE may identify location information corresponding to the location of the UE with respect to the satellite and may transmit the location information to the satellite. The satellite may determine beam geometry information for one or more satellite beams or beams (e.g., based on the received location information or a current beam), the one or more beams may be default beams (e.g., predetermined or pre-configured beams). Additionally or alternatively, the UE may identify the beam geometry information, for example, by using a beam identifier, a satellite identifier, the location information, or the like. The satellite may transmit the beam geometry information, which, in one example, may be a function of time, to the UE. For example, the UE may receive the beam geometry information from the network entity, or the satellite, during a cell search operation.

In some cases, the UE may process the beam geometry information and the location information to determine one or more default beams (e.g., a default beam or a default beam tuple, which may be a pair of beams) that accounts for the mobility of the satellite relative to the UE. In some examples, the UE may report the one or more default beams to the satellite or to the network, and the satellite or the network may transmit a feedback message confirming the reception of the one or more default beams. In some other examples, the satellite (e.g., a network entity) may determine the one or more default beams based on location information from the UE or based on a current beam (e.g., the current beam the satellite is using). The satellite may transmit an indication of the default beam to the UE.

In some examples, the UE may use the one or more default beams to perform a beam switching operation. For example, the UE may switch to one or more default BWPs associated with default beams. In some cases, a default BWP may be a BWP the UE reverts back to when an inactivity timer expires. Otherwise (e.g., if the default satellite beam is a beam tuple or if there are multiple default beams), the UE may transmit a scheduling request to the satellite, may perform a contention free random access (CFRA) procedure with the satellite, or may perform a contention based random access (CBRA) procedure with the satellite. The random access procedures may involve exchanging signaling (e.g., a random access preamble during a random access occasion) to establish a connection.

Aspects of the disclosure are initially described in the context of wireless communications systems. Additional aspects are described with reference to beam diagrams and a process flow. Aspects of the disclosure are further illustrated by and described with reference to apparatus diagrams, system diagrams, and flowcharts that relate to default beam for communication networks.

FIG. 1 illustrates an example of a wireless communications system 100 that supports default beam for communication networks in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 160 (e.g., via an S1, N2, N3, or other interface). The base stations 105 may communicate with one another over the backhaul links 160 (e.g., via an X2, Xn, or other interface) either directly (e.g., directly between base stations 105), or indirectly (e.g., via core network 130), or both. In some examples, the backhaul links 160 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. A satellite 120 may communicate with base stations 105 (also referred to as gateways in NTNs) and UEs 115 (or other high altitude or terrestrial communications devices). The satellite 120 may be any suitable type of communication satellite configured to relay communications between different end nodes in a wireless communication system. The satellite 120 may be an example of a space satellite, a balloon, a dirigible, an airplane, a drone, an unmanned aerial vehicle, or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth. A satellite 120 may be a high altitude platform station (HAPS), e.g., a balloon.

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa. In accordance with one or more aspects of the present disclosure, a UE 115 may communicate with a cell provided or established by a satellite 120 (e.g., via a base station 105 or a satellite 120 performing the functions of a base station 105) according to an identified default set of one or more beams based on an inactivity timer expiring, which may enhance communications reliability.

In some cases, a UE 115 and a satellite 120 may transmit control information or data messages using one or more beams associated with one or more BWPs. The satellite 120 and the UE 115 may be thousands of kilometers apart and it may take some time for electromagnetic waves to propagate over the distance between the satellite 120 and the UE 115. The distance that a transmission travels may result in substantial signal degradation due to, for example, atmospheric effects, interference from other radio frequency sources, signal attenuation due to vegetation or structures, and the like. Further, due to the relatively large RTD associated with propagation delays between the satellite 120 and the UE 115, an inactivity timer associated with a beam may expire. The UE 115 may use an inactivity timer to determine if one or more BWPs have expired (i.e., are no longer active). In some examples, such as when the satellite 120 is in low earth orbit, the inactivity timer may expire prior to the UE 115 leaving the coverage of the beam. However, when the inactivity timer expires, the UE 115 may revert back to one or more default BWPs associated with an outdated beam. Additionally or alternatively, due to the high mobility of the UE 115 relative to the satellite 120, the UE 115 may frequently switch beams. In some cases, the beam switching operation may fail (e.g., due to loss of control messages), and the UE 115 may revert back to using an outdated beam, which may cause high signaling volume and inefficient resource allocation at the UE 115 (e.g., due to cell search operations).

In some examples, a UE 115 may determine a default satellite beam while considering the mobility of the satellite 120, which may improve the efficiency of beam switching operations in NTNs among other benefits. For example, the UE 115 may determine an inactivity timer associated with a beam has expired. In some cases, the UE 115 may identify location information corresponding to the location of the UE 115 with respect to the satellite 120 and may transmit the location information to the satellite 120. The satellite 120 may determine beam geometry information for one or more beams (e.g., based on the location information or a current beam). In some cases, the satellite 120 may transmit the beam geometry information to the UE 115. Additionally or alternatively, the UE 115 may identify the beam geometry information, for example, by using a beam identifier, a satellite identifier, the location information, or the like to infer the beam geometry information, which may be a function of time.

In some cases, the UE 115 may process the beam geometry information and the location information to determine one or more default beams (e.g., a default beam or a default beam tuple) that accounts for the mobility of the satellite 120 relative to the UE 115. In some other cases, the satellite 120 may use the location information or a current beam to determine the one or more default beams. The satellite 120 may transmit an indication of the default beams to the UE 115. In some examples, the UE 115 may report the one or more default beams to the satellite 120 or to the network, and the satellite 120 or the network may transmit a feedback message confirming the reception of the one or more default beams. In some examples, the UE 115 may use the one or more default beams to perform a beam switching operation. For example, the UE 115 may switch to one or more default BWPs associated with a default beams. Otherwise (e.g., if the default beam is a beam tuple or if there are multiple default beams), the UE 115 may transmit a scheduling request to the satellite 120, may perform a CFRA procedure with the satellite 120, or may perform a CBRA procedure with the satellite 120.

Figure 2:
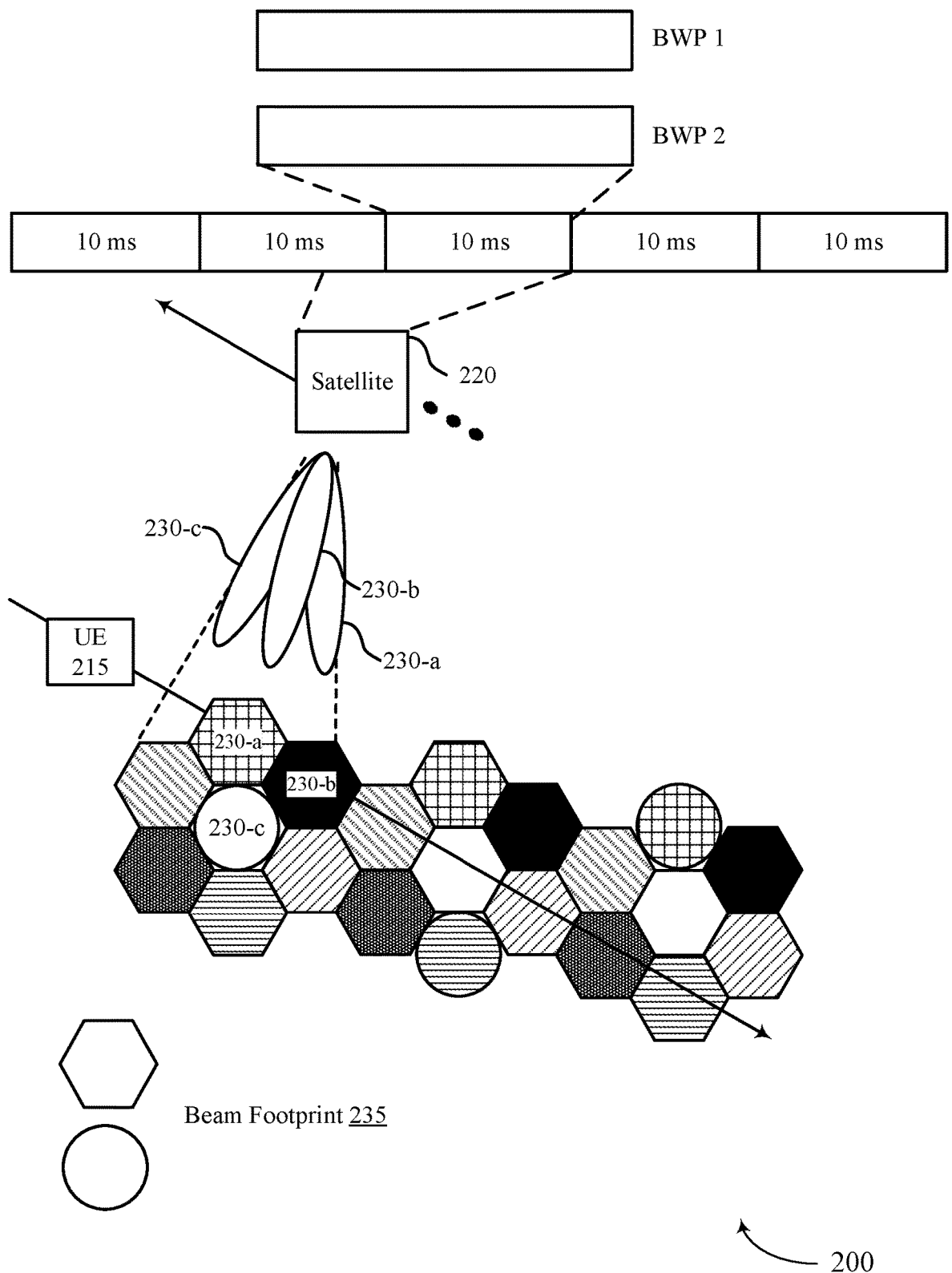

FIG. 2 illustrates an example of a wireless communications system 200 that supports default satellite beam selection for a communication network in accordance with one or more aspects of the present disclosure. In some examples, wireless communications system 200 may implement aspects of wireless communications system 100. Wireless communications system 200 may include a UE 215, a satellite 220, and communication links 225, which may be examples of a UE 115, a satellite 120, and communication links 125 as described with reference to FIG. 1. In some cases, the satellite 220 may receive a signal from a base station 105 and may relay the signal to a UE 115 or may perform the functions of a base station 105 as described with reference to FIG. 1. The satellite 220 may be referred to as a network entity.

In some wireless communication environments, beam switching may be frequent relative to other environments. In some cases, as illustrated in FIG. 2, a satellite 220 may communicate with a UE 215 via a beam 230, which may be a directional beam. The beam 230 may have a beam footprint 235 (e.g., a coverage area of the beam 230). For example, the satellite 220 may communicate with the UE 215 via beam 230-*a*. Additionally or alternatively, the satellite 220 may use beam 230-*b* or beam 230-*c* for communications. The UE 215 may, in some examples, derive a beam footprint shape (e.g., hexagonal, circular, elliptical, or the like) based on the shape and structure of the antenna associated with the beam 230. In some other examples, the UE 215 may derive a beam size based on one or more power levels associated with the beam 230. The shape and size of the footprint may depend on the distance of the transmitting device (e.g., satellite 220) from the surface of the earth, the transmitting angle, and the like. Further, footprints that are adjacent may have different shapes and sizes dependent on the transmission angle and distance of the transmitting device. In some cases, beam footprints 235 may overlap. The beam footprint 235 may be small relative to the speed of a satellite 220. In some other examples, the frequency of beam switching may depend on the mobility of the UE 215, the mobility of the UE 215 in combination with movement of a base station (e.g., a base station 105 as described with reference to FIG. 1), or both. The satellite may configure each beam 230 from a satellite as a cell with an initial BWP per beam (e.g., an initial uplink BWP, an initial downlink BWP, or an uplink BWP and downlink BWP pair). Each pattern of the beam footprint 235 in FIG. 2 may represent a different initial BWP. In some cases, each beam 230 may be associated with one or more BWPs in addition to the initial BWP, which the UE 215 and the network 220 may use to communicate. The network (e.g., satellite 220) may signal to the UE 215 which BWP to utilize as the beam footprints 235 move or the UE 215 moves.

In some cases, one or more BWPs may be configured for a beam 230 (e.g., satellite beam) per UE 215. Each beam 230 may be configured with an initial uplink bandwidth part and an initial downlink bandwidth part. Each beam 230 may also be configured with a default uplink bandwidth part and a default downlink bandwidth part for a UE 215. Additional bandwidth parts may be configured per satellite beam. As noted herein, the satellite 220 may configure BWPs in a beam 230 for the UE 215. The UE 215 may switch BWPs during a BWP switching operation. There may be two types of BWP switching operations. In inter-beam switching, a UE 215 may switch from a BWP in a beam 230 to a BWP in a different beam 230 (e.g., from a BWP in beam 230-*a* to a BWP in beam 230-*b*). For example, if the UE 215 moves from a beam footprint 235 associated with beam 230-*a* to a beam footprint 235 associated with beam 230-*b*, the UE may switch from a BWP in beam 230-*a* to a BWP in beam 230-*b*. In intra-beam BWP switching, a UE 215 may switch from a BWP to a different BWP in the same beam 230. For example, if the UE 215 performs a BWP switching operation without leaving the beam footprint 235 associated with beam 230-*a*, the UE 215 may switch from a BWP associated with beam 230-*a* to another BWP associated with beam 230-*a*. In some examples, the satellite 220 may configure the one or more beams 230 as a single cell. In some other examples, the satellite 220 may configure the one or more beams 230 as separate cells or as multiple cells. That is, each cell may include one or more beams 230 corresponding to beam footprints 235.

In some examples, the UE 215 may determine a beam 230 to use for communication based on monitoring for a broadcast message from the satellite 220. For example, the satellite 220 may broadcast one or more synchronization signal blocks (SSBs) to one or more UEs 215. The UE 215 may detect an SSB, which may include a master information block (MIB), a system information block (SIB) (e.g., a first type of SIB (SIB1)), or both. The UE 215 may decode the MIB to identify one or more parameters which may be used to detect and decode the SIB1. For example, the one or more parameters may include a bandwidth, a control resource set (CORESET), a search space, other parameters related to resource allocation, or a combination associated with the SIB1. In some examples, the SIB1 may include location information (e.g., a pointer) corresponding to a second type of SIB (SIB2). The SIB2 may include one or more configurations for BWPs associated with a beam 230 used for communication with the satellite 220. Additionally or alternatively, the UE 215 may receive radio resource control (RRC) signaling indicating the one or more configurations for the BWPs associated with the beam 230.

Due to the high mobility of the UE 215 relative to the satellite 220, the UE 215 may frequently switch BWPs associated with one or more beams 230. As illustrated in FIG. 2, the UE 215 may traverse seven different beam footprints 235, and may perform multiple BWP switching operations based on traversing across the beam footprints 235. The beam footprints 235 may correspond to a coverage area for a beam relative to the ground. For example, the UE 215 may perform a BWP switching operation to switch from BWPs associated with beam 230-a, beam 230-b, or both based on a BWP configuration and the trajectory of the UE 215. Additionally or alternatively, the UE 215 may switch to a different cell based on traversing the beam footprints 235. For example, the beam footprints 235 associated with beam 230-a, beam 230-b, and beam 230-c may be associated with a first cell, however the other beam footprints 235 may be associated with different cells. Additionally or alternatively, beam footprints 235 associated with beam 230-a, beam 230-b, and beam 230-c may be associated with different cells.

In some cases, the UE 215 may switch beams 230 within a coverage area of a satellite 220 or when moving from a first coverage area to a second coverage area. For example, the UE 215 may move from a beam footprint 235 associated with beam 230-a to a beam footprint 235 associated with beam 230-b. In such examples, the UE 215 may be communicating with satellite 220 on BWP 2, and may switch from beam 230-a to beam 230-b upon crossing into the beam footprint 235 for beam 230-b. Because of the beam switch, the UE 215 may also switch from BWP 2 to BWP 1. Similarly, the UE 215 may switch from beam 230-b to another beam 230. The beam switch may be a result of movement by the UE 215, movement or handover by a satellite 220, or a combination thereof. In some examples, the UE 215 may switch from beam 230-a to beam 230-b based on a beam selection or beam refinement procedure, or based on detected interference or degraded signal quality on beam 230-a. In some examples, the BWPs may be separated by a spectrum gap. The spectrum gap may be used by another communication system, as a guard band, or as another BWP.

In some cases, a BWP switching operation or beam switching operation from beam 230-a to beam 230-b may fail (e.g., due to loss of control messages), and the UE 215 may revert back to using beam 230-a, which may be the default beam 230. Thus, one or more default BWPs associated with beam 230-a may not work anymore because the UE 215 may be out of the coverage area of beam 230-a, which may cause high signaling volume and inefficient resource allocation at the UE 215 (e.g., due to cell search operations). In some examples, a UE 215, a satellite 220, or both may determine one or more default satellite beams while considering the mobility of the satellite 220 with respect to the UE 215, which may improve the efficiency of beam switching operations in NTNs among other benefits.

Figure 3:
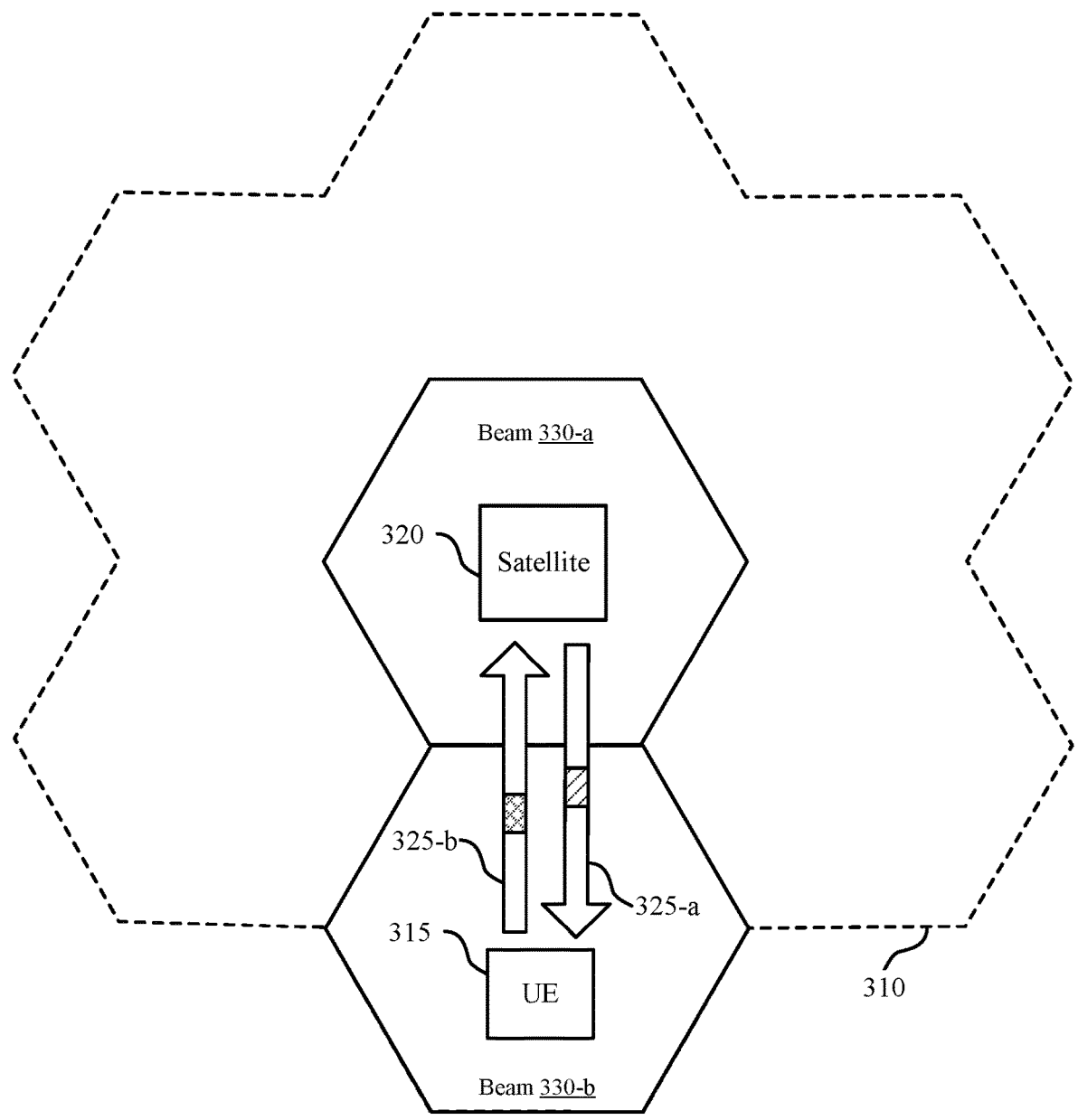

FIG. 3 illustrates an example of a wireless communications system 300 that supports default satellite beam selection for a communication network in accordance with one or more aspects of the present disclosure. In some examples, wireless communications system 300 may implement aspects of wireless communications system 100 or wireless communications system 200. Wireless communications system 200 may include a UE 315, a satellite 320, and communication links 325, which may be examples of a UE 115, a satellite 120, and communication links 125 as described with reference to FIG. 1. In some cases, the satellite 320 may receive a signal from a base station 105 and may relay the signal to a UE 115 or may perform the functions of a base station 105 as described with reference to FIG. 1. The satellite 320 may serve a coverage area 310 of a non-terrestrial network (NTN).

In some cases, the coverage area 310 may be a beam footprint corresponding to one or more beams 330 configured at the satellite 320 for communicating with one or more UEs 315. For example, the satellite 320 may use multiple antennas to form one or more beams 330 (e.g., narrow beams) for communication with one or more UEs 315. The beams 330 may operate on different frequency intervals (e.g., different BWPs) to reduce interference among the beams 330. That is, beam 330-a may operate using different BWPs than beam 330-b. In some examples, the satellite 320 may configure the one or more beams 330 as a single cell. In some other examples, the satellite 320 may configure the one or more beams as separate cells.

In some examples, the satellite 320 may communicate with the UE 315 via one or more communication links 325 using the beam 330. For example, the satellite 320 may transmit a message to the UE 315 via communication link 325-a, which may be used for downlink communications, while the UE 315 may transmit a message to the satellite 320 via communication link 325-b, which may be used for uplink communications. The satellite 320 and the UE 315 may use beam 330-a for both uplink and downlink communications.

The satellite 320 and the UE 315 may be thousands of kilometers apart and it may take some time for electromagnetic waves to propagate over the distance between the satellite 320 and the UE 315. The propagation delay for NTNs may be many orders of magnitude larger than the propagation delay for terrestrial networks. By way of example, the satellite 320 may be in an orbit, such as low earth orbit, medium earth orbit, other non-geostationary earth orbit, or geostationary earth orbit. In any of these examples, the satellite 320 may be many thousands of kilometers from earth, and therefore may be thousands of kilometers from the UE 315. Each transmission via a communication link 325 between the satellite 320 and the UE 315 (e.g., communication link 325-a, communication link 325-b, or both) may therefore travel from earth the distance to the satellite 320 and back to earth. The distance that a transmission travels may result in substantial signal degradation due to, for example, atmospheric effects, interference from other radio frequency sources, signal attenuation due to vegetation or structures, and the like.

Further, due to the relatively large RTD associated with propagation delays between the satellite 320 and the UE 315, an inactivity timer associated with a beam 330 may expire. For example, the satellite 320 and the UE 315 may be communicating using beam 330-a, which may be associated with one or more BWPs. The UE 315 may use an inactivity timer to determine if one or more BWPs have expired (i.e., are no longer active). The inactivity timer may be a predetermined value (e.g., 2 seconds). In some examples, such as when the satellite 320 is in low earth orbit, the inactivity timer may expire prior to the UE 315 leaving the coverage of the beam 330. For example, the UE 315 may be in the coverage area of beam 330-a when the inactivity timer expires, but may move to the coverage area of beam 330-b soon after. However, when the inactivity timer expires, the UE 315 may revert back to one or more default BWPs associated with beam 330-a, which may be outdated.

Additionally or alternatively, due to the high mobility of the UE 315 relative to the satellite 320, the UE 315 may frequently switch beams 330. For example, the UE 315 may perform a beam switching operation to switch from beam 330-a to beam 330-b. In some cases, the beam switching operation may fail (e.g., due to loss of control messages), and the UE 315 may revert back to using beam 330-a, which may be the default beam 330. Thus, one or more default BWPs associated with beam 330-a may not work anymore because the UE 315 may be out of the coverage area of beam 330-a, which may cause high signaling volume and inefficient resource allocation at the UE 315 (e.g., due to cell search operations).

In some examples, a UE 315, a satellite 320, or both may determine one or more default satellite beams while considering the mobility of the satellite 320 with respect to the UE 315, which may improve the efficiency of beam switching operations in NTNs among other benefits. For example, the UE 315 may determine an inactivity timer associated with beam 330-a has expired. In some cases, the UE 315 may identify location information 335 corresponding to the location of the UE 315 with respect to the satellite 320. For example, the UE 315 may determine a set of global positioning system (GPS) coordinates corresponding to the location of the UE 315 and may transmit those coordinates to the satellite 320. Once the UE 315 transmits the location information 335 to the satellite 320 via communication link 325-b, the satellite 320 may determine beam geometry information 340 for one or more beams 330. In some cases, the satellite beams in a satellite beam tuple may be referred to as satellite beams. In some examples, the satellite 320 may use the location information 335 to determine the beam geometry information 340. In some other examples, the satellite 320 may use a current beam 330 (e.g., beam 330-a) to determine the beam geometry information 340. In some cases, the satellite 320 may determine one or more default satellite beams based on the location information 335 or the current beam 330. The satellite 320 may transmit an indication of the default satellite beams to the UE 315. In some cases, the satellite 320 may transmit the beam geometry information 340 to the UE 315 via communication link 325-a.

Additionally or alternatively, the UE 315 may identify the beam geometry information 340 by some other means. For example, the UE 315 may use a beam identifier, a satellite identifier, the location information 335, or the like to determine the beam geometry information 340, which may be a function of time. In some cases, the UE 315 may use a shape and size of the coverage area for one or more beams 330, the speed of the coverage area for one or more beams 330, the direction and angular width of one or more beams 330, the altitude and speed of the satellite 320, or a combination along with the location information 335 to calculate one or more parameters associated with coverage area 310 or a default satellite beam (e.g., such as beam 330-b).

In some cases, the UE 315 may process the beam geometry information 340 and the location information 335 to determine a default satellite beam that accounts for the mobility of the satellite 320 relative to the UE 315, which is described in detail with reference to FIG. 4. In some other cases, the UE 315 may process the beam geometry information 340 and the location information 335 to determine a default satellite beam tuple that accounts for the mobility of the satellite 320 relative to the UE 315, which is described in further detail with reference to FIG. 5. In some examples, the UE 315 may report the default satellite beam to the satellite 320 or to the network, and the satellite 320 or the network may transmit a feedback message (e.g., an acknowledgement message (ACK)) confirming the reception of the default satellite beam.

In some examples, the UE 315 may use the default satellite beam to perform a beam switching operation. For example, the UE 315 may determine an inactivity timer associated with one or more BWPs corresponding to beam 330-a has expired (e.g., due to a beam switching failure or if beam 330-a is outdated). The UE 315 may process the location information 335 and the beam geometry information 340 to identify the default satellite beam, which may be beam 330-b. In some cases, if the default satellite beam is a single beam 330, such as beam 330-b, the UE 315 may switch to one or more default BWPs associated with beam 330-b. Otherwise (e.g., if the default satellite beam is a beam tuple or if there are multiple default satellite beams), the UE 315 may transmit a scheduling request to the satellite 320, may perform a CFRA procedure with the satellite 320, or may perform a CBRA procedure with the satellite 320.

In some cases, the network may allocate one or more time-frequency resources for a scheduling request on the multiple default satellite beams. The UE 315 may switch to the default downlink BWP of one of the multiple default satellite beams to monitor a downlink control channel (e.g., a physical downlink control channel (PDCCH)) addressed to the UE 315 for a duration. If the UE 315 receives the resource allocation for the scheduling request via the downlink control channel, the UE 315 may transmit the scheduling request to the satellite 320 using the default satellite beam. If the UE 315 does not receive the resource allocation for the scheduling request, the UE 315 may switch to a default downlink BWP of a different default satellite beam of the multiple default satellite beams to monitor the downlink control channel. In some other cases, the UE 315 may perform a CFRA procedure. For example, the network may signal a random access preamble to the UE 315 and a random access occasion (e.g., including a time and a frequency). The UE 315 may perform the CFRA based on the random access preamble and the random access occasion to identify the default satellite beam. In some other cases, the UE 315 may perform a CBRA procedure on the candidate default satellite beams until one is successful.

Figure 4A:
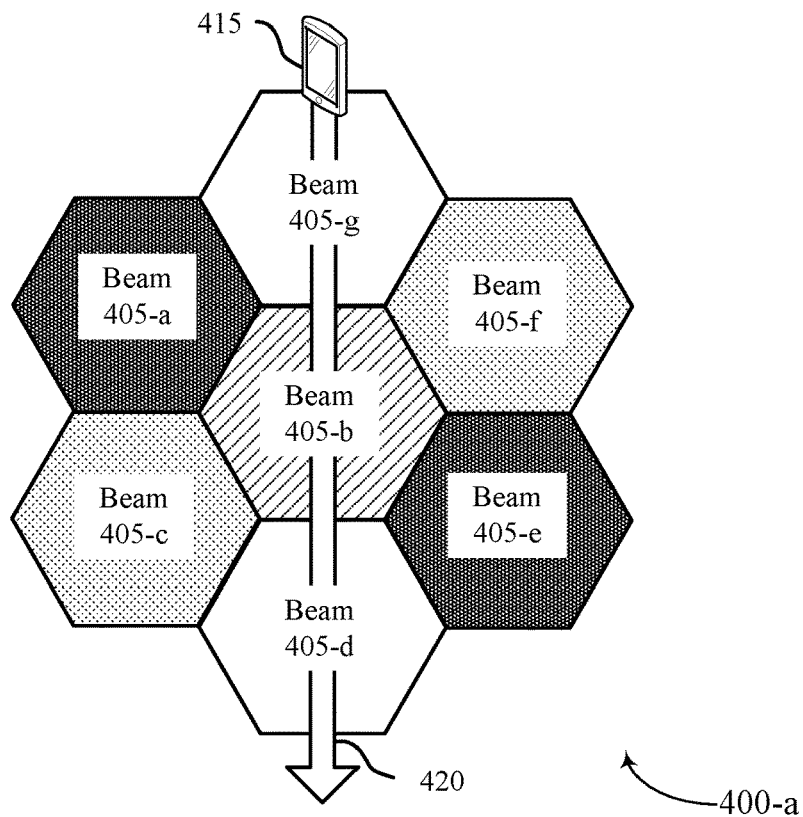
FIGS. 4A, 4B, 5A, and 5B illustrates examples of beam diagrams that support default beam for communication networks in accordance with one or more aspects of the present disclosure.
Figure 4B:
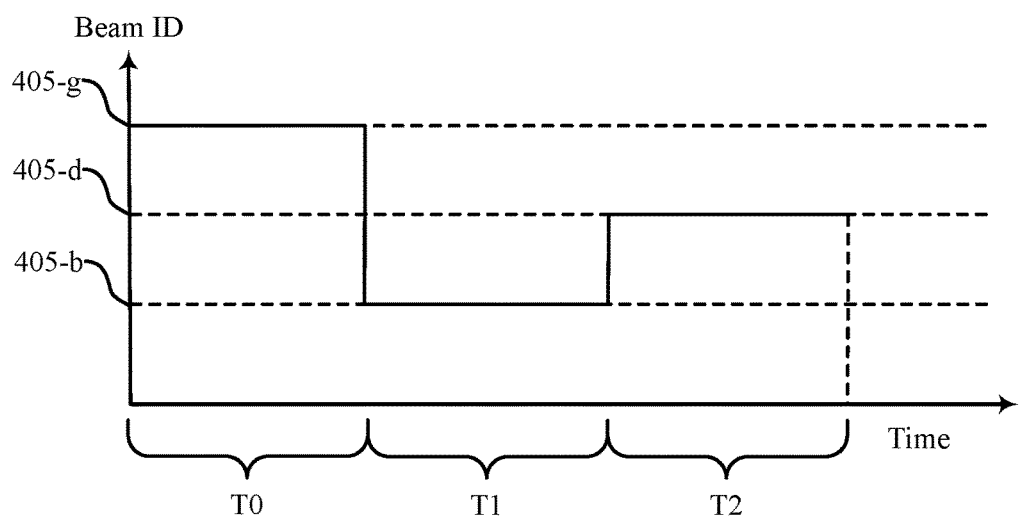

FIGS. 4A and 4B illustrate examples of beam diagrams 400 that support default satellite beam selection for a communication network in accordance with one or more aspects of the present disclosure. In some examples, beam diagrams 400 may implement aspects of wireless communications system 100, wireless communications system 200, and wireless communications system 300. For example, beam diagram 400-a may include a UE 415 and beams 405, which may be examples of a UE 115, a UE 215, or a UE 315 and beams 230 or beams 330 as described with reference to FIGS. 1 through 3. In some examples, the UE 415 may communicate with a satellite, such as satellite 120, a satellite 220, or a satellite 320 as described with reference to FIGS. 1 through 3, using one of beam 405-a through beam 405-g. In some cases, the UE 415 may select one or more default satellite beams based on the mobility of the UE 415 relative to the satellite, which may improve resource allocation and signaling overhead (e.g., by reducing cell reselection procedures) at the UE 415.

In some cases, FIG. 4A may illustrate the mobility of a UE 415 across the coverage areas of one or more beams 405 associated with a satellite. For example, the trajectory of the UE 415 may be shown in beam diagram 400-*a* with the coverage areas of the one or more beams 405 as the frame of reference. In some cases, FIG. 4B may illustrate the mobility of the UE 415 across the coverage areas of one or more beams 405 associated with a satellite with respect to time. The UE 415 may be in the coverage area of beam 405-*g* for a first time interval, TO. The position of the UE 415 relative to the coverage areas of the one or more beams 405 may change over time so that the UE 415 may be in the coverage area of beam 405-*b* during a second time interval, T1, and the UE 415 may be in the coverage area of beam 405-*d* during a third time interval, T2. Thus, it may be beneficial for the UE 415 to select a single default satellite beam based on the UE trajectory 420. Additionally, the UE 415 may perform a beam switching operation based on the selected single default satellite beam, which is described in further detail with reference to FIG. 3.

Figure 5A:
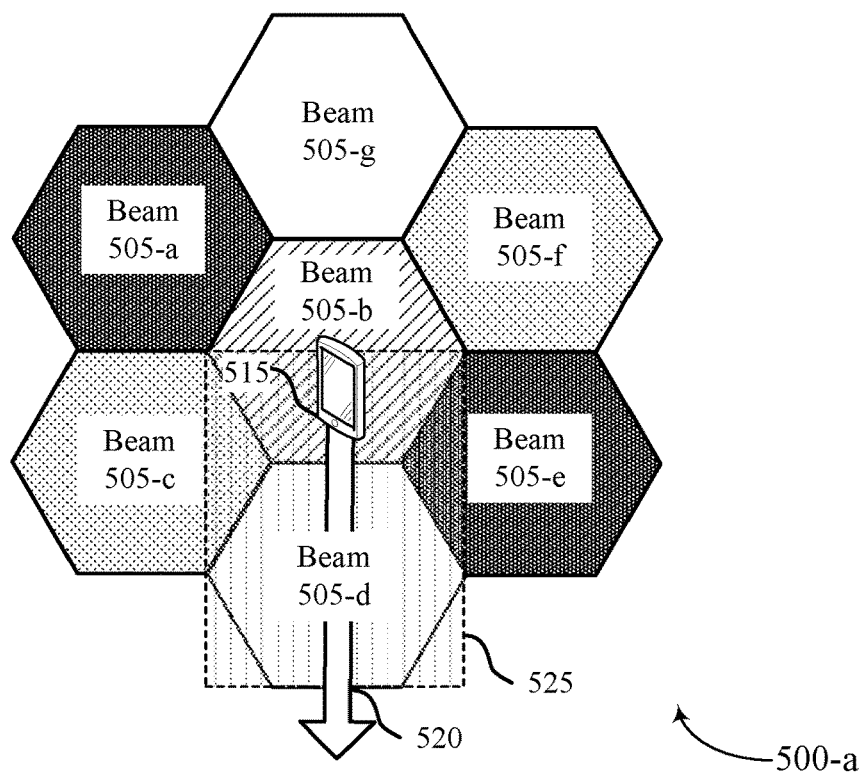
Figure 5B:
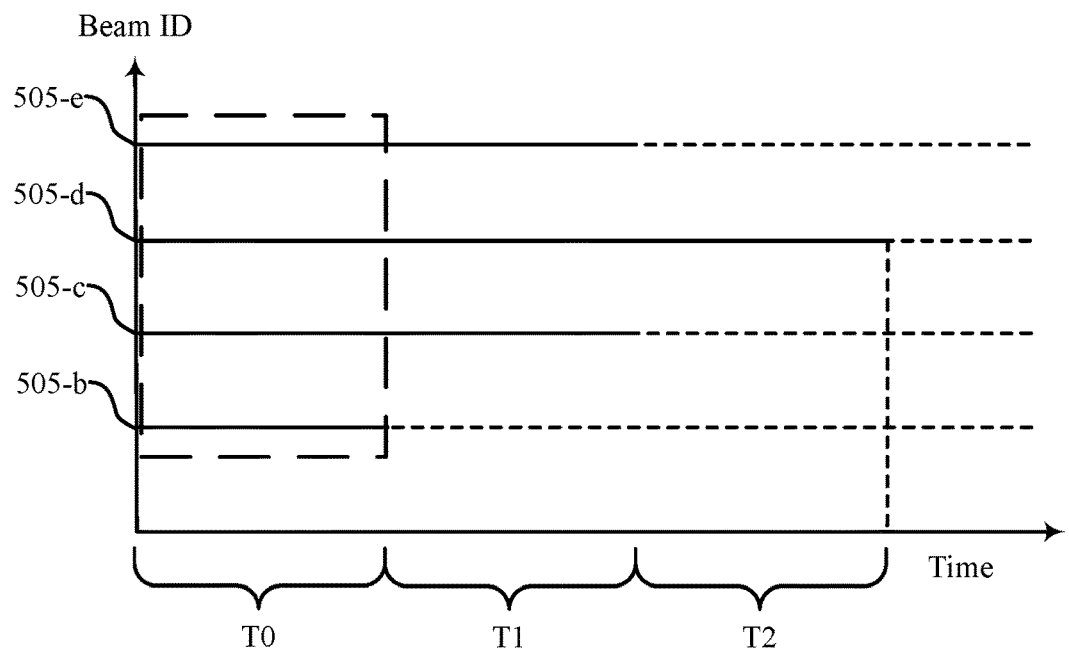

FIGS. 5A and 5B illustrate examples of beam diagrams 500 that support default satellite beam selection for a communication network in accordance with one or more aspects of the present disclosure. In some examples, beam diagrams 500 may implement aspects of wireless communications system 100, wireless communications system 200, and wireless communications system 300. For example, beam diagram 500-*a* may include a UE 515 and beams 505, which may be examples of a UE 115, a UE 215, a UE 315 and beams 230 or beams 330 as described with reference to FIGS. 1 through 3. In some examples, the UE 515 may communicate with a satellite, such as satellite 120, a satellite 220, or a satellite 320 as described with reference to FIGS. 1 through 3, using one of beam 505-*a* through beam 505-*g*. In some cases, the UE 515 may select a default satellite beam based on the mobility of the UE 515 relative to the satellite, which may improve resource allocation and signaling overhead (e.g., by reducing cell reselection procedures) at the UE 515.

In some cases, the default satellite beam may be a sequence of satellite beam tuples, each satellite beam tuple associated with a time interval during which the UE 515 is under coverage of that satellite beam tuple. In some cases, FIG. 5A may illustrate the mobility of a UE 515 across the coverage areas of one or more satellite beams 505 associated with a satellite. For example, the trajectory of the UE 515 may be shown in beam diagram 500-*a* with the coverage areas of the one or more beams 505 as the frame of reference. In some cases, FIG. 5B may illustrate the mobility of the UE 515 across the coverage areas of one or more beams 505 associated with a satellite with respect to time.

The UE 515 may determine a UE trajectory 520 relative to the coverage areas of the one or more satellite beams 505. In some cases, due to the relative speed of the satellite, the UE trajectory may be fixed. Thus, the UE 515 may identify one or more default satellite beams (e.g., a sequence of satellite beams 525) as candidates for a beam switching operation. In some cases, the sequence of satellite beams 525 may include satellite beam tuples to account for the uncertainty of the UE trajectory 520. In some cases, each beam 505 may have a beam identifier, which may correspond to the satellite. The network or the satellite may send BWP information of one or more default satellite beams to the UE 515. The BWP information may associate each beam 505 with an initial BWP pair (e.g., where random access may take place), a default BWP pair (e.g., which may be UE specific), or both. In some cases, the initial uplink BWP and the initial downlink BWP may be the same.

The UE 515 may identify a current location and a speed relative to a beam 505. For example, the UE 515 may be located in the coverage area of beam 505-*b* and may be traversing the sequence of satellite beams 525. In some cases, the UE 515 may be in the coverage area of beam 505-*b*, beam 505-*e*, beam 505-*c*, and beam 505-*d* for a first time interval, TO. Thus, the default satellite beam during TO is a beam tuple of satellite beam 505-*b*, beam 505-*e*, beam 505-*c*, and beam 505-*d*, as illustrated in beam diagram 500-*b*. The multiple beams 505 account for the uncertainty in the UE trajectory 520. The position of the UE 515 relative to the coverage areas of the one or more beams 505 may change over time so that the UE 515 may be in the coverage area of beam 505-*c*, beam 505-*d*, and beam 505-*e* during a second time interval, T1, and the UE 515 may be in the coverage area of beam 505-*d* during a third time interval, T2. The UE 515 may perform a beam switching operation based on the multiple default satellite beams, which is described in further detail with reference to FIG. 3. For example, the UE 515 may transmit a scheduling request, may perform a CFRA procedure, may perform a CBRA procedure, or a combination for the multiple default satellite beams to determine a default satellite beam for the beam switching operation.

Figure 6:
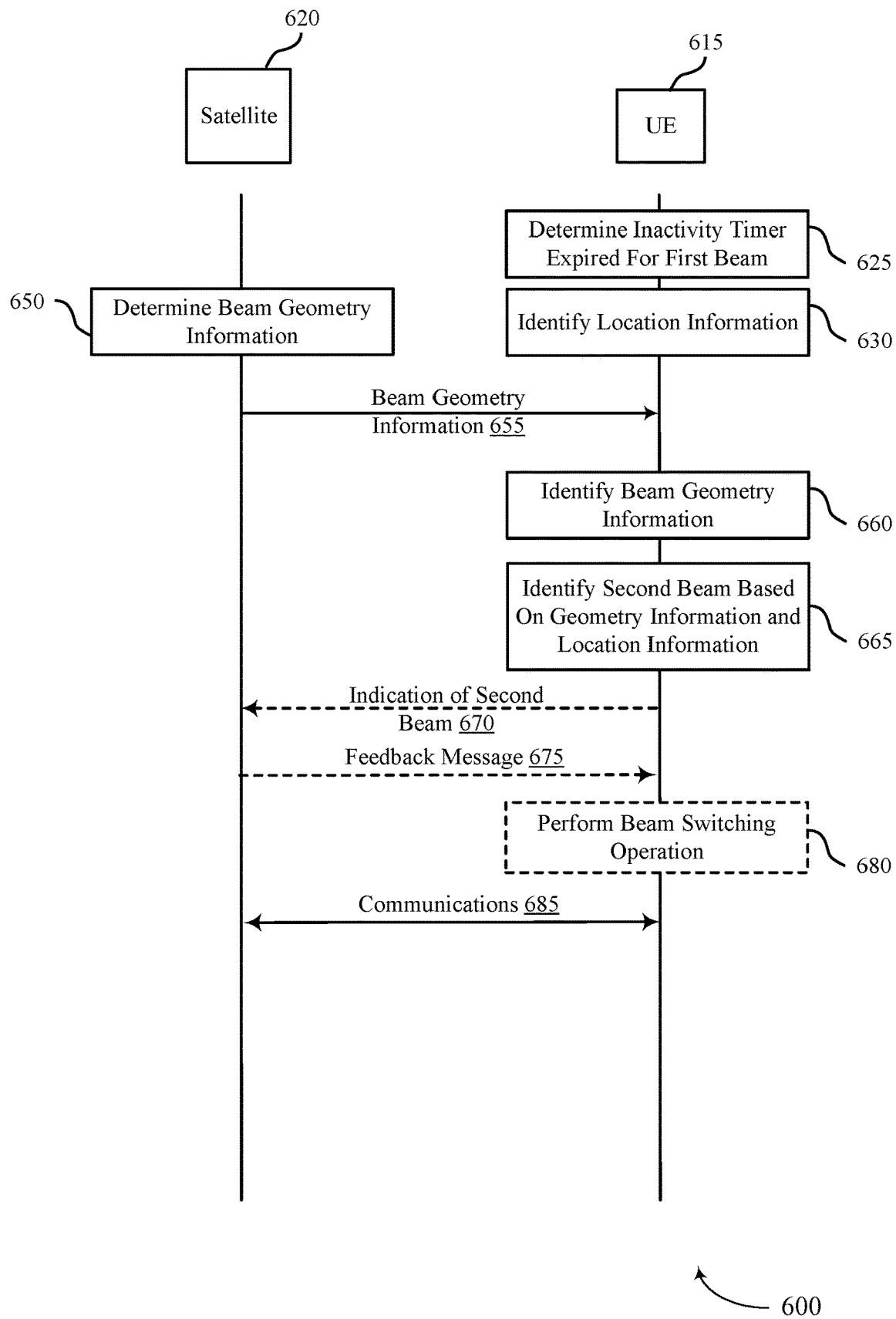
FIGS. 6 and 7 illustrate examples of process flows that supports default beam for communication networks in accordance with one or more aspects of the present disclosure.

FIG. 6 illustrates an example of a process flow 600 that supports default satellite beam selection for a communication network in accordance with one or more aspects of the present disclosure. In some examples, process flow 600 may implement aspects of wireless communications system 100, wireless communications system 200, or wireless communications system 300. The process flow 600 may illustrate an example of a default satellite beam selection based on mobility of a UE 615 and a satellite 620. Alternative examples of the following may be implemented, where some processes are performed in a different order than described or are not performed at all. In some cases, processes may include additional features not mentioned below, or further processes may be added.

In some examples, the UE 615 and the satellite 620 may be nodes in an NTN. For example, a cell may be provided or established by a satellite 620 as part of an NTN. The UE 615 may communicate with the satellite 620 via the network entity. At 625, the UE 615 may determine an inactivity timer associated with a set of one or more beams used for communicating with a satellite 620 has expired. In some cases, the satellite 620 may receive a signal from a base station 105 and may relay the signal to a UE 615 or may perform the functions of a base station 105 as described with reference to FIG. 1. At 630, the UE 615 may identify location information corresponding to the location of the UE 615 with respect to the satellite 620. In some cases, the location information may be a set of coordinates (e.g., GPS coordinates) corresponding to the location of the UE 615.

At 650, the satellite 620 may determine beam geometry information for one or more beams associated with the satellite 620. In some cases, the satellite 620 may determine the beam geometry information based on an indication of the location information from the UE 615. Additionally or alternatively, the satellite 620 may determine the beam geometry information based on the first beam (e.g., the current beam used for communicating with the UE 615). In some cases, the beam geometry information may include a shape, a size, a velocity, an angular width, or a combination associated with the one or more beams. In some cases, the satellite 620 may calculate one or more parameters associated with the beam geometry information based on an altitude of the satellite 620, a speed of the satellite 620, a direction of the one or more beams, an angular width of the one or more beams, or a combination.

At 655, the UE 615 may receive an indication of the beam geometry information for the one or more beams from the satellite 620. At 660, the UE 615 may identify the beam geometry information for the one or more beams associated with the satellite 620. In some examples, the UE 615 may calculate one or more parameters associated with the beam geometry information based on an altitude of the satellite 620, a speed of the satellite 620, a direction of the one or more beams, an angular width of the one or more beams, or a combination. The UE 615 may determine the beam geometry information based on the location of the UE 615 and a satellite identifier or beam identifier. The beam identifier may include information associated with the beam geometry information for the one or more beams associated with the satellite 620. In some cases, the UE 615 may identify the beam geometry information as a function of time. In some examples, the beam geometry information may be associated with the set of one or more beams, which may include one or more current beams.

At 665, the UE 615 may process the location information from 630 and the beam geometry information from 660 to identify a second set of one or more beams, which may include at least one default beam, of the one or more beams for communicating with the satellite 620. In some cases, the UE 615 may identify the default beam based on the inactivity timer expiring at 625. In some examples, the second set of one or more beams may be different than the first set of one or more beams (e.g., which may include the current beam).

At 670, the UE 615 may transmit an indication of the second set of one or more beams, including the default beam, to the satellite 620. At 675, the satellite 620 may transmit a feedback message based on receiving the indication from the UE 615. In some cases, the feedback message may include an ACK.

At 680, the UE 615 may perform beam switching operation from the first set of one or more beams (e.g., including one or more current beams) to the second set of one or more beams (e.g., including one or more default beams). In some cases, the beam switching operation may include switching to one or more BWPs associated with the one or more default beams. In some cases, the UE 615 may identify multiple default beams. For example, the second set of one or more beams may include multiple beam tuples, each beam tuple associated with a time interval during which the UE 615 is communicating with the satellite 620 using the beam tuple. Thus, the UE 615 may transmit a scheduling request to the satellite 620, may perform a CFRA procedure, or may perform a CBRA procedure to identify which default beams to use. In some cases, the UE 615 may identify one or more resources associated with the one or more default beams allocated for a scheduling request. In some cases, the one or more resources may be allocated by the network or by the satellite 620. The UE 615 may monitor a downlink control channel (e.g., a PCCH) using one or more BWPs associated with the one or more default beams for the one or more resources. The UE 615 may transmit the scheduling request to the satellite 620 based on the monitoring (e.g., identifying the one or more allocated resources).

In some cases, the UE 615 may receive an indication of a random access preamble and a random access occasion from the network or from the satellite 620. The UE 615 may perform a CFRA procedure based on the random access preamble and the random access occasion. The UE 615 may determine which default beams to use for the beam switching operation based on the CFRA procedure. In some other cases, the UE 615 may perform a CBRA procedure to determine one or more default beam to use for the beam switching operation. At 685, the UE 615 and the satellite 620 may communicate according to the default beams based on performing the beam switching operation.

Figure 7:
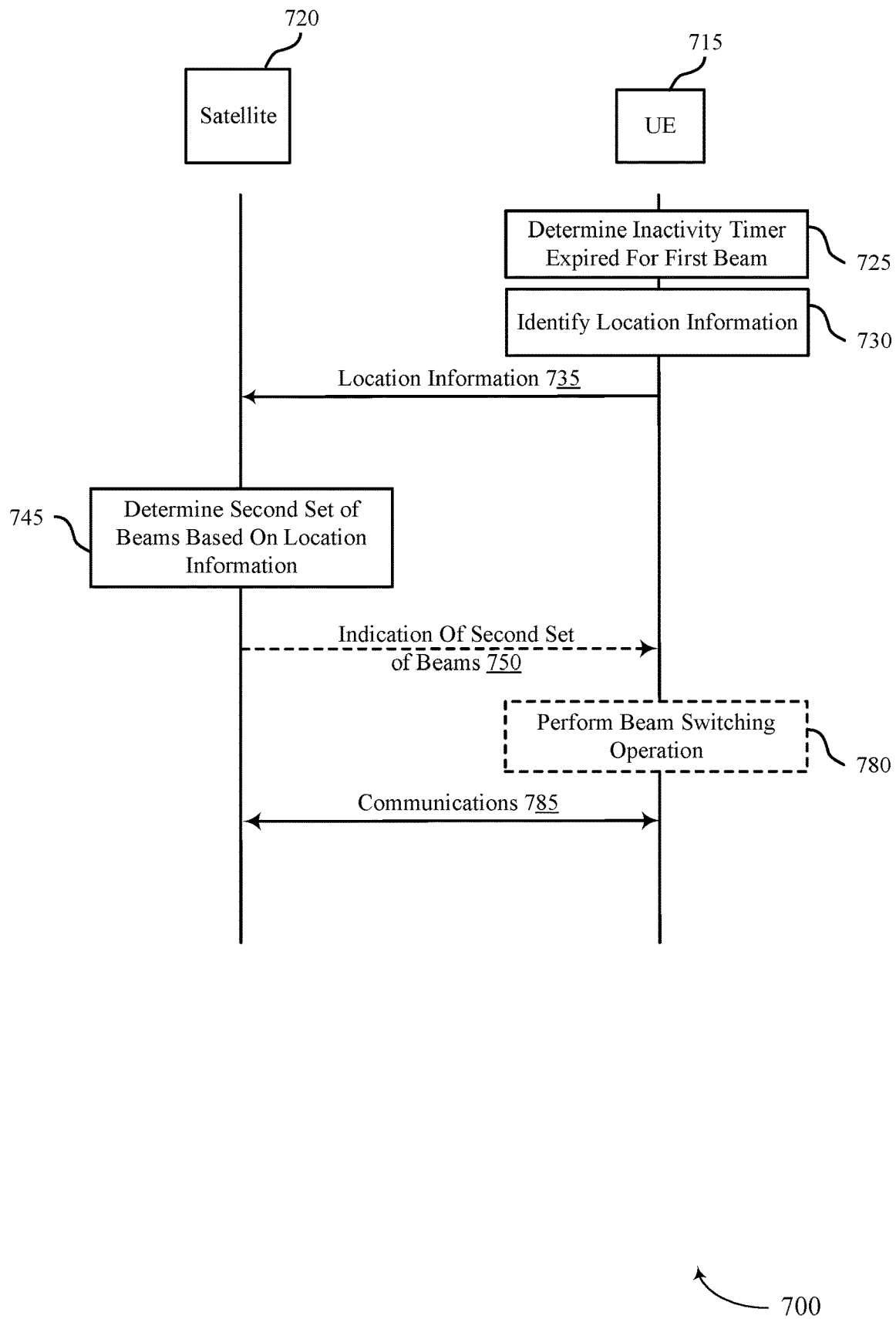

FIG. 7 illustrates an example of a process flow 700 that supports default satellite beam selection for a communication network in accordance with one or more aspects of the present disclosure. In some examples, process flow 700 may implement aspects of wireless communications system 100, wireless communications system 200, or wireless communications system 300. The process flow 700 may illustrate an example of a default satellite beam selection based on mobility of a UE 715 and a satellite 720. Alternative examples of the following may be implemented, where some processes are performed in a different order than described or are not performed at all. In some cases, processes may include additional features not mentioned below, or further processes may be added.

In some examples, the UE 715 and the satellite 720 may be nodes in an NTN. For example, a cell may be provided or established by a satellite 720 as part of an NTN. The UE 715 may communicate with the satellite 720 via a network entity. In some cases, the satellite 720 may receive a signal from a base station 105 and may relay the signal to a UE 715 or may perform the functions of a base station 105 as described with reference to FIG. 1. At 725, the UE 715 may determine an inactivity timer associated with a set of one or more beams used for communicating with a satellite 720 has expired. At 730, the UE 715 may identify location information corresponding to the location of the UE 715 with respect to the satellite 720. In some cases, the location information may be a set of coordinates (e.g., GPS coordinates) corresponding to the location of the UE 715.

At 735, the UE 715 may transmit an indication of the location information to the satellite 720. For example, the UE 715 may transmit the coordinates to the satellite 720.

At 745, the satellite 720 may identify location information corresponding to the location of the UE 715 with respect to the satellite 720 and may determine a second set of beams (e.g., a default set of beams) based on the location information.

At 750, the UE 715 may receive an indication of the second set of one or more beams, which may include at least one default beam, of the one or more beams for communicating with the satellite 720. In some examples, the second set of one or more beams may be different than the first set of one or more beams (e.g., which may include the current beam).

At 780, the UE 715 may perform beam switching operation from the first set of one or more beams (e.g., including one or more current beams) to the second set of one or more beams (e.g., including one or more default beams). In some cases, the beam switching operation may include switching to one or more BWPs associated with the one or more default beams. In some cases, the UE 715 may identify multiple default beams. For example, the second set of one or more beams may include multiple beam tuples, each beam tuple associated with a time interval during which the UE 715 is communicating with the satellite 720 using the beam tuple. Thus, the UE 715 may transmit a scheduling request to the satellite 720, may perform a CFRA procedure, or may perform a CBRA procedure to identify which default beams to use. In some cases, the UE 715 may identify one or more resources associated with the one or more default beams allocated for a scheduling request. In some cases, the one or more resources may be allocated by the network or by the satellite 720. The UE 715 may monitor a downlink control channel (e.g., a PCCH) using one or more BWPs associated with the one or more default beams for the one or more resources. The UE 715 may transmit the scheduling request to the satellite 720 based on the monitoring (e.g., identifying the one or more allocated resources).

In some cases, the UE 715 may receive an indication of a random access preamble and a random access occasion from the network or from the satellite 720. The UE 715 may perform a CFRA procedure based on the random access preamble and the random access occasion. The UE 715 may determine which default beams to use for the beam switching operation based on the CFRA procedure. In some other cases, the UE 715 may perform a CBRA procedure to determine one or more default beam to use for the beam switching operation. At 785, the UE 715 and the satellite 720 may communicate according to the default beams based on performing the beam switching operation.

Figure 8:
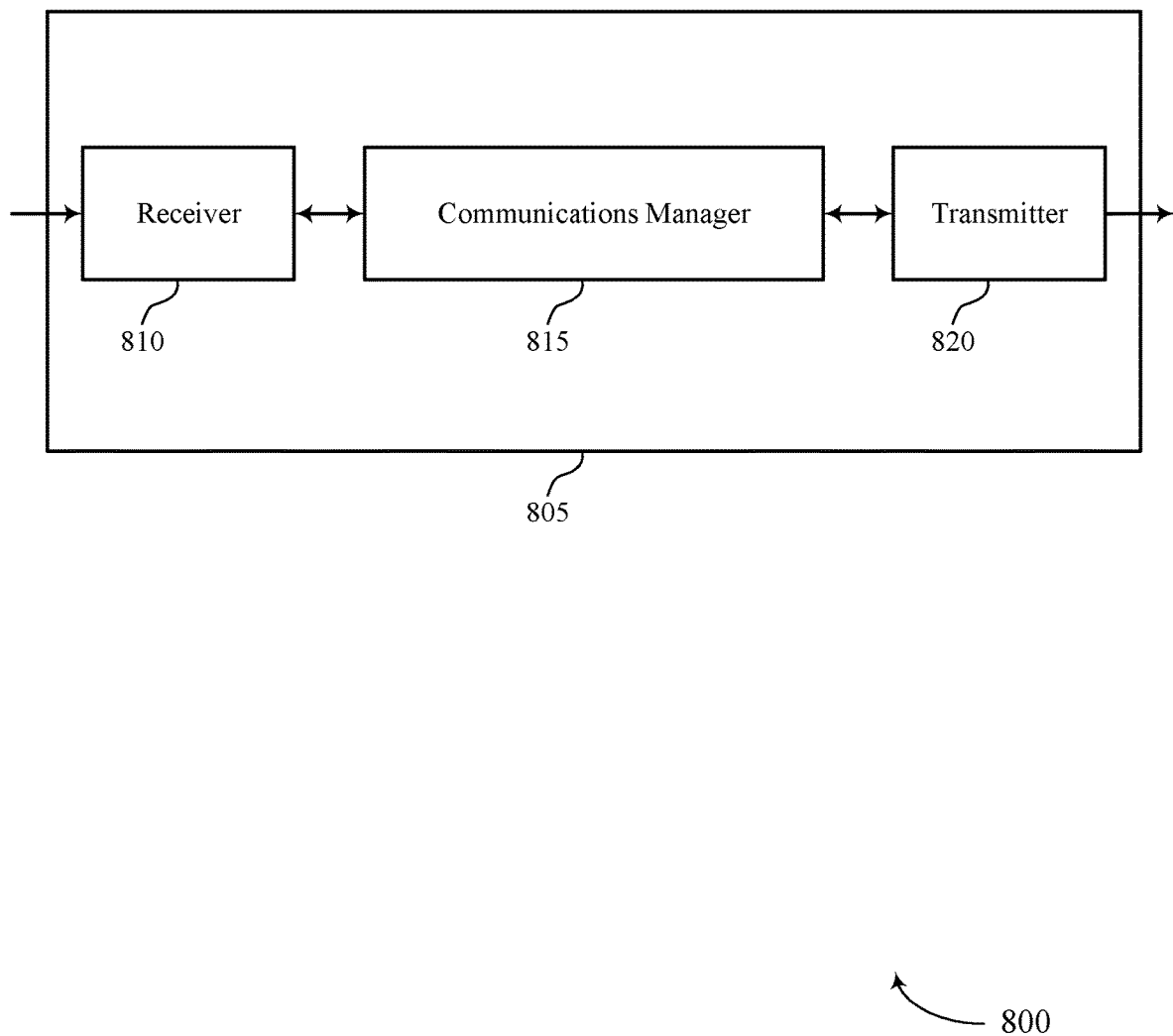
FIGS. 8 and 9 show block diagrams of devices that support default beam for communication networks in accordance with one or more aspects of the present disclosure.

FIG. 8 shows a block diagram 800 of a device 805 that supports default beam for communication networks in accordance with one or more aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to default beam for communication networks, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine an inactivity timer associated with a first set of one or more beams used for communicating with a network entity has expired, identify location information corresponding to a location of the UE with respect to the network entity, identify beam geometry information for one or more beams associated with the network entity, process the location information and the beam geometry information to identify a second set of one or more beams based on the expired inactivity timer, the second set of one or more beams different from the first set of one or more beams, and communicate with the network entity according to the second set of one or more beams.

The communications manager 815 may also determine an inactivity timer associated with a first set of one or more beams used for communicating with a network entity has expired, receive, from the network entity, an indication of a second set of one or more beams based on the expired inactivity timer, the second set of one or more beams different from the first set of one or more beams, and communicate with the network entity according to the second set of one or more beams. The communications manager 815 may be an example of aspects of the communications manager 1110 described herein.

The actions performed by the communications manager 815 as described herein may support improvements in communications. In one or more aspects, a UE may determine one or more default beams for communicating with a satellite while considering the mobility of the satellite. Determining one or more default beams may enable techniques for reducing signaling overhead in the system by improving the efficiency of beam switching operations. For example, the UE may use location information and beam geometry information to account for the change of location of the UE relative to the satellite and select one or more default beams for communication.

Based on selecting the one or more default satellite beams as described herein, a processor of a UE (e.g., a processor controlling the receiver 810, the communications manager 815, the transmitter 820, or a combination thereof) may improve communication efficiency in the system. For example, the beam selection techniques described herein may leverage an inactivity timer to indicate when the UE should identify the one or more default beams, which may realize reduced signaling overhead and power savings (e.g., by reducing cell search operations), among other benefits.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The communications manager 815 may be an example of means for performing various aspects of selecting the one or more default satellite beams as described herein. The communications manager 815, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 815, or its sub-components, may be implemented in code (e.g., as communications management software or firmware)

executed by a processor, or any combination thereof. If implemented in code executed by a processor, the functions of the communications manager 815, or its sub-components may be executed by a general-purpose processor, a DSP, an ASIC, an FPGA or other programmable logic device.

In some examples, the communication manager 815 may be configured to perform various operations (e.g., receiving, determining, transmitting) using or otherwise in cooperation with the receiver 810, the transmitter 820, or both.

Figure 9:
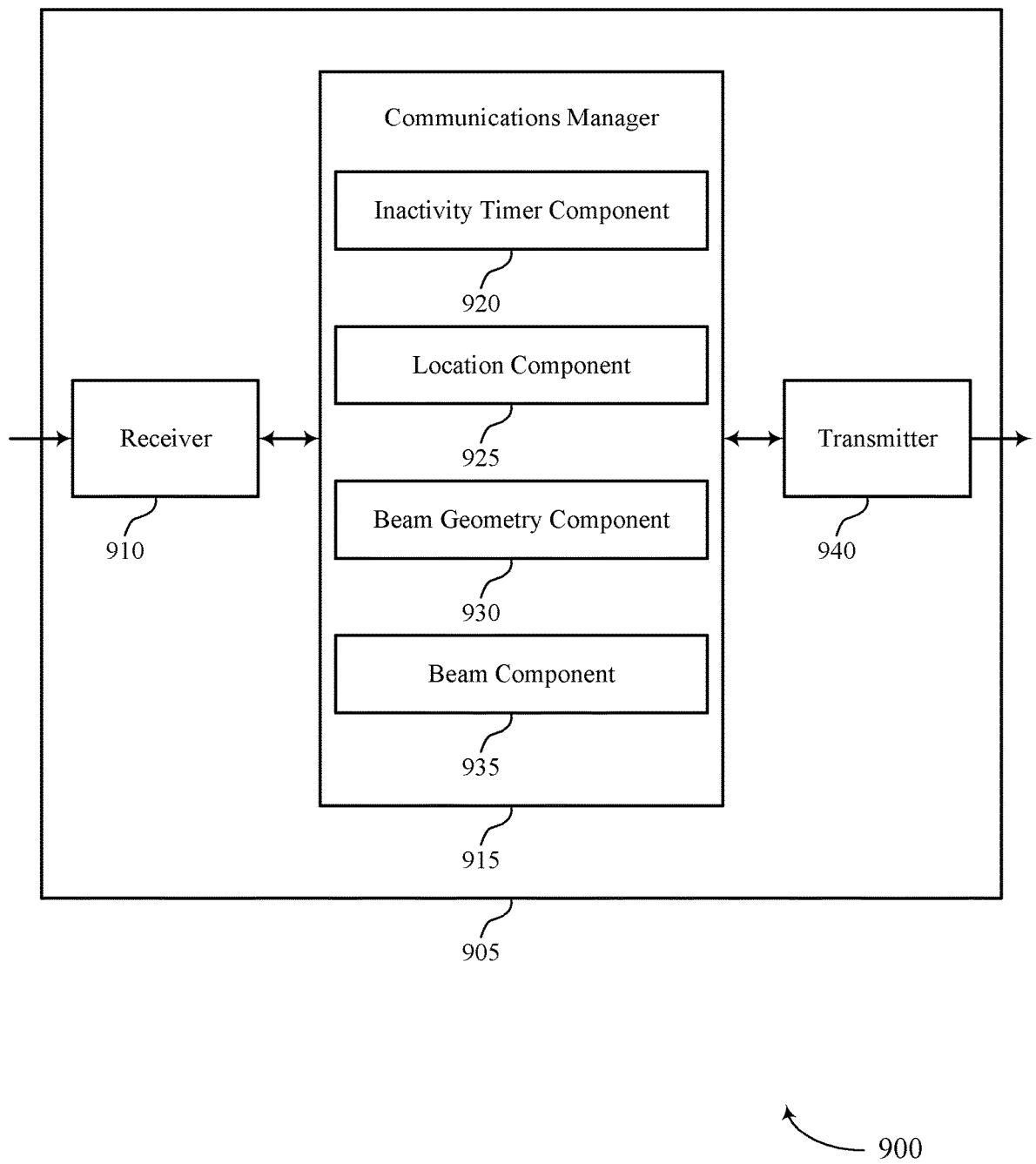

FIG. 9 shows a block diagram 900 of a device 905 that supports default beam for communication networks in accordance with one or more aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to default beam for communication networks, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an inactivity timer component 920, a location component 925, a beam geometry component 930, and a beam component 935. The communications manager 915 may be an example of aspects of the communications manager 1110 described herein.

The inactivity timer component 920 may determine an inactivity timer associated with a first set of one or more beams used for communicating with a network entity has expired. The location component 925 may identify location information corresponding to a location of the UE with respect to the network entity. The beam geometry component 930 may identify beam geometry information for one or more beams associated with the network entity. The beam component 935 may process the location information and the beam geometry information to identify a second set of one or more beams based on the expired inactivity timer, the second set of one or more beams different from the first set of one or more beams and communicate with the network entity according to the second set of one or more beams.

The beam component 935 may receive, from the network entity, an indication of a second set of one or more beams based on the expired inactivity timer, the second set of one or more beams different from the first set of one or more beams, and communicate with the network entity according to the second set of one or more beams.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
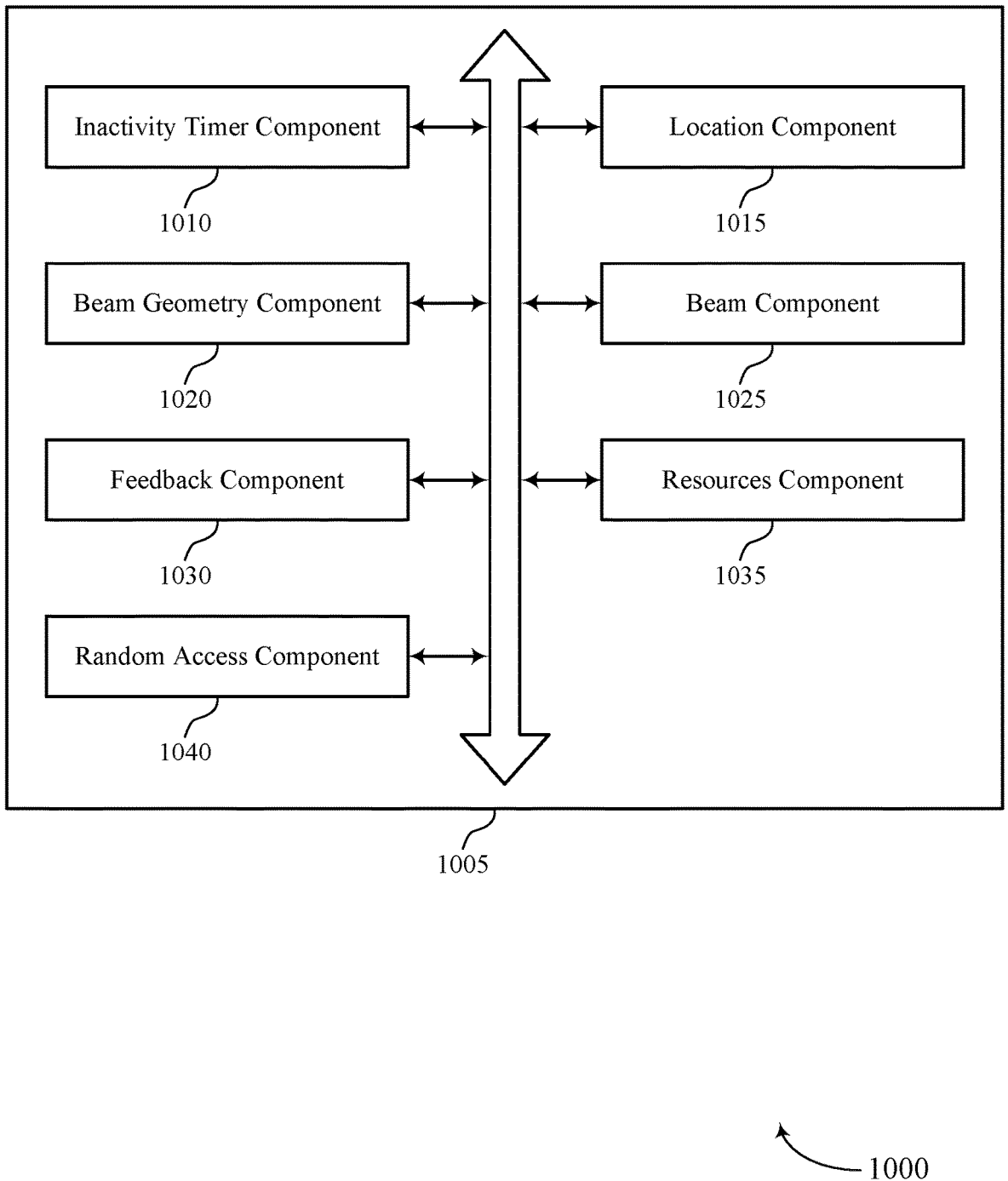
FIG. 10 shows a block diagram of a communications manager that supports default beam for communication networks in accordance with one or more aspects of the present disclosure.

FIG. 10 shows a block diagram 1000 of a communications manager 1005 that supports default beam for communication networks in accordance with one or more aspects of the present disclosure. The communications manager 1005 may be an example of aspects of a communications manager 815, a communications manager 915, or a communications manager 1110 described herein. The communications manager 1005 may include an inactivity timer component 1010, a location component 1015, a beam geometry component 1020, a beam component 1025, a feedback component 1030, a resources component 1035, and a random access component 1040. Each of these modules may communicate, directly or indirectly, with one another (e.g., via one or more buses).

The inactivity timer component 1010 may determine an inactivity timer associated with a first set of one or more beams used for communicating with a network entity has expired.

The location component 1015 may identify location information corresponding to a location of the UE with respect to the network entity. For example, the location component 1015 may determine a set of coordinates corresponding to the location of the UE, where the location information includes the set of coordinates. In some examples, the location component 1015 may transmit, to the network entity, an indication of the determined set of coordinates.

The beam geometry component 1020 may identify beam geometry information for one or more beams associated with the network entity. In some examples, the beam geometry component 1020 may receive, from the network entity, an indication of the beam geometry information for the one or more beams associated with the network entity. In some examples, the beam geometry component 1020 may identify the beam geometry information as a function of time. In some examples, the beam geometry component 1020 may calculate one or more parameters associated with the beam geometry information based on an altitude of the network entity, a speed of the network entity, a direction of the one or more beams, an angular width of the one or more beams or a combination thereof. In some cases, the beam geometry information is associated with the first set of one or more beams. In some cases, the beam geometry information includes a shape, a size, a velocity, an angular width, or a combination associated with the one or more beams. In some examples, the beam component 1025 may determine an identifier associated with the network entity, the identifier including information associated with the beam geometry information for the one or more beams associated with the network entity, where identifying the second set of one or more beams is based on the set of coordinates and the identifier.

The beam component 1025 may process the location information and the beam geometry information to identify a second set of one or more beams based on the expired inactivity timer, the second set of one or more beams different from the first set of one or more beams. In some examples, the beam component 1025 may receive, from the network entity, an indication of the second set of one or more beams.

In some examples, the beam component 1025 may determine an inactivity timer associated with a first set of one or more beams used for communicating with a network entity has expired. In some examples, the beam component 1025 may receive, from the network entity, an indication of a second set of one or more beams based on the expired inactivity timer, the second set of one or more beams different from the first set of one or more beams. In some examples, the beam component 1025 may communicate with the network entity according to the second set of one or more beams.

In some examples, the beam component 1025 may communicate with the network entity according to the second set of one or more beams. In some examples, the beam component 1025 may transmit, to the network entity, an indication of the second set of one or more beams. The feedback component 1030 may receive a feedback message corresponding to the indication.

In some examples, the beam component 1025 may perform a beam switching operation from the first set of one or more beams to the second set of one or more beams. In some examples, the beam component 1025 may switch to one or more BWPs associated with the second set of one or more beams. In some cases, the second set of one or more beams includes a set of beam tuples, each beam tuple of the set of beam tuples including a subset of the second set of one or more beams and each beam tuple associated with a time interval during which the UE is communicating with the network entity using the beam tuple. In some cases, the UE and the network entity are nodes in a non-terrestrial network (NTN).

The resources component 1035 may identify one or more resources associated with the second set of one or more beams, the one or more resources allocated for a scheduling request. In some examples, the resources component 1035 may monitor a downlink control channel using one or more BWPs associated with the second set of one or more beams for the one or more resources. In some examples, the resources component 1035 may transmit, to the network entity, the scheduling request based on the monitoring.

The random access component 1040 may receive, from the network entity, an indication of a random access preamble and a random access occasion associated with a CFRA procedure. In some examples, the random access component 1040 may perform the CFRA procedure according to the random access preamble and the random access occasion. In some examples, the random access component 1040 may perform a CBRA procedure for at least one beam of the second set of one or more beams.

Figure 11:
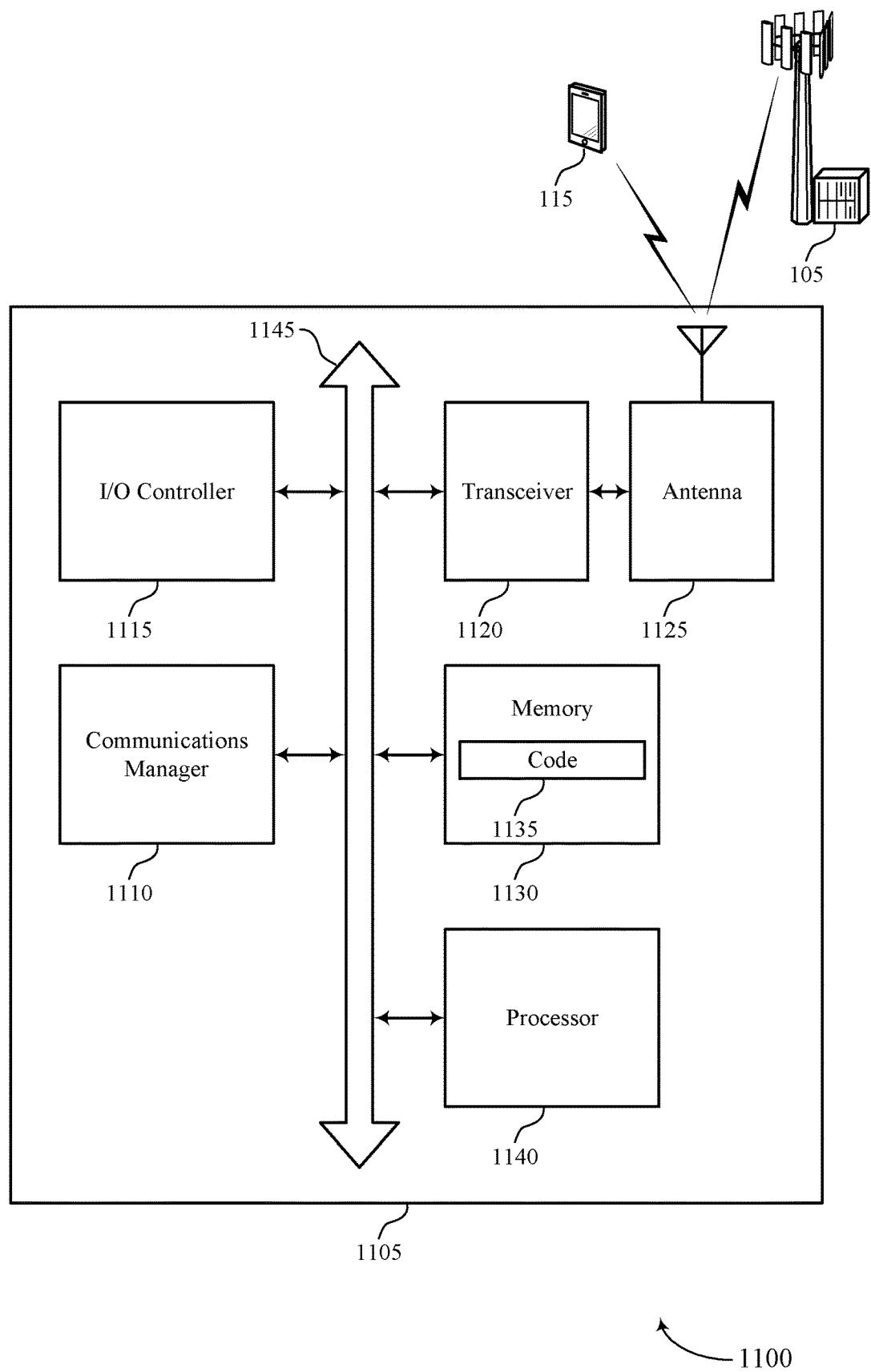
FIG. 11 shows a diagram of a system including a device that supports default beam for communication networks in accordance with one or more aspects of the present disclosure.

FIG. 11 shows a diagram of a system 1100 including a device 1105 that supports default beam for communication networks in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may determine an inactivity timer associated with a first set of one or more beams used for communicating with a network entity has expired, identify location information corresponding to a location of the UE with respect to the network entity, identify beam geometry information for one or more beams associated with the network entity, process the location information and the beam geometry information to identify a second set of one or more beams based on the expired inactivity timer, the second set of one or more beams different from the first set of one or more beams, and communicate with the network entity according to the second set of one or more beams. The communications manager 1110 may also determine an inactivity timer associated with a first set of one or more beams used for communicating with a network entity has expired, receive, from the network entity, an indication of a second set of one or more beams based on the expired inactivity timer, the second set of one or more beams different from the first set of one or more beams, and communicate with the network entity according to the second set of one or more beams.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as IOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting default beam for communication networks).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
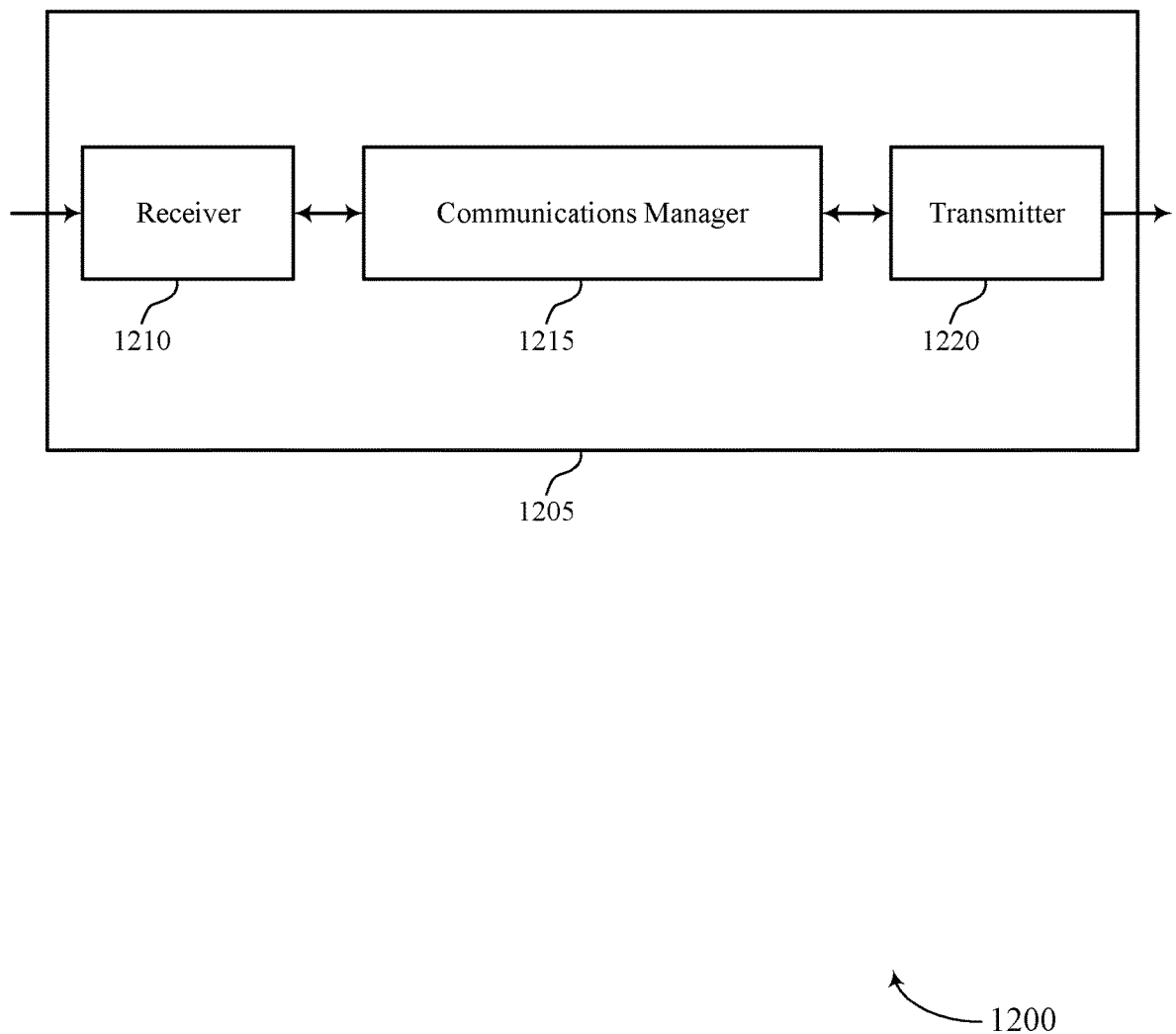
FIGS. 12 and 13 show block diagrams of devices that support default beam for communication networks in accordance with one or more aspects of the present disclosure.

FIG. 12 shows a block diagram 1200 of a device 1205 that supports default beam for communication networks in accordance with one or more aspects of the present disclosure. The device 1205 may be an example of aspects of a satellite (e.g., a satellite 120, 220, 320, 620, or 720), or a network entity, as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to default beam for communication networks, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a message via a first set of one or more beams, communicate with the UE according to a second set of one or more beams, the second set of one or more beams different from the first set of one or more beams, identify location information corresponding to a location of the UE with respect to the network entity, determine beam geometry information for one or more beams associated with the network entity, and transmit, to the UE, an indication of the determined beam geometry information. The communications manager 1215 may also determine an inactivity timer associated with a first set of one or more beams used for communicating with a UE has expired, transmit, to a UE, an indication of a second set of one or more beams based on the expired inactivity timer, the second set of one or more beams different from the first set of one or more beams, and communicate with the UE according to the second set of one or more beams. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
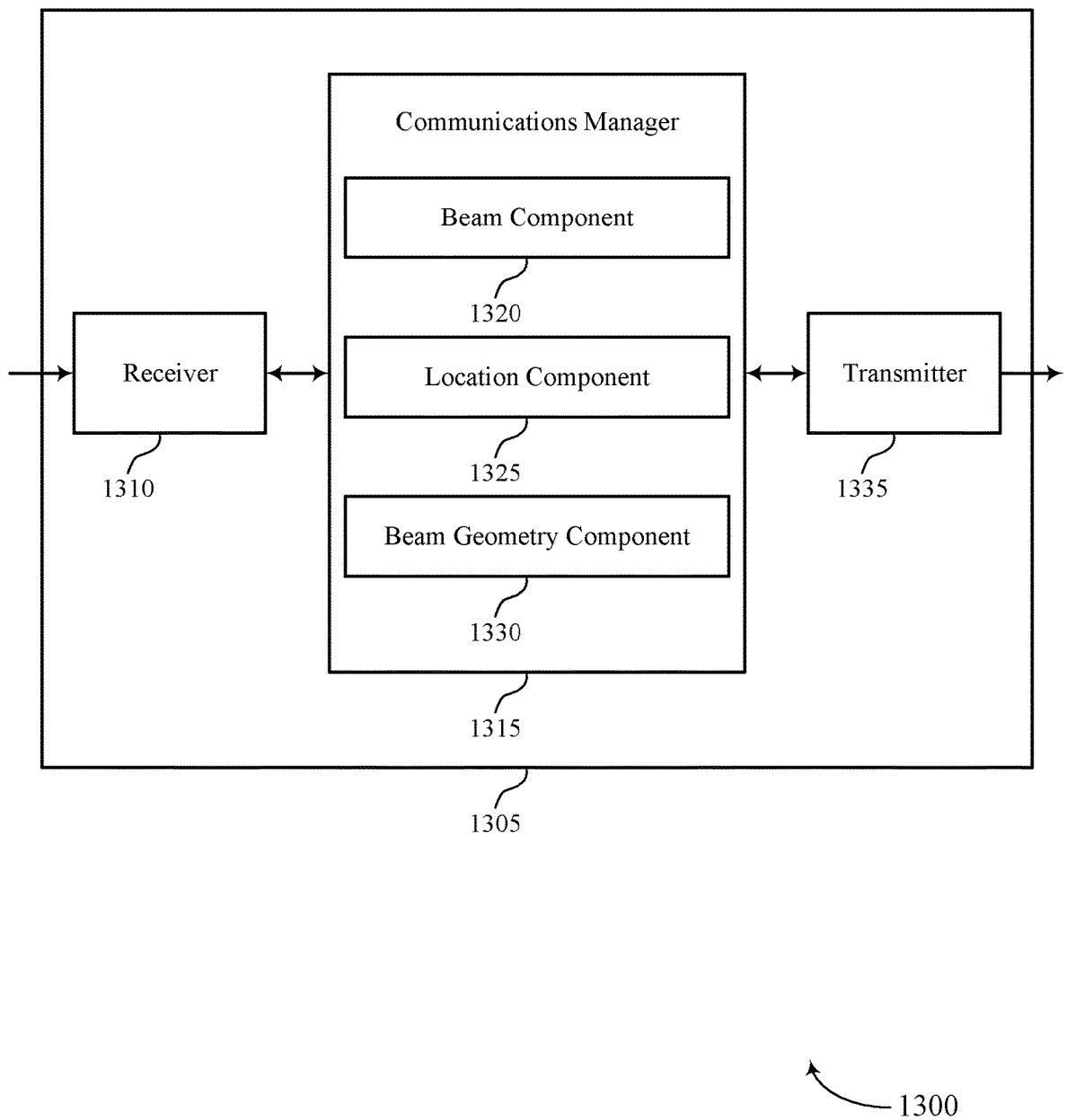

FIG. 13 shows a block diagram 1300 of a device 1305 that supports default beam for communication networks in accordance with one or more aspects of the present disclosure. The device 1305 may be an example of aspects of a device 1205, or a satellite (e.g., a satellite 120, 220, 320, 620, or 720), or a network entity, as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to default beam for communication networks, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a beam component 1320, a location component 1325, and a beam geometry component 1330. The communications manager 1315 may be an example of aspects of the communications manager 1510 described herein.

The beam component 1320 may transmit, to a UE, a message via a first set of one or more beams and communicate with the UE according to a second set of one or more beams, the second set of one or more beams different from the first set of one or more beams. The location component 1325 may identify location information corresponding to a location of the UE with respect to the network entity. The beam geometry component 1330 may determine beam geometry information for one or more beams associated with the network entity and transmit, to the UE, an indication of the determined beam geometry information.

The beam component 1320 may determine an inactivity timer associated with a first set of one or more beams used for communicating with a UE has expired, transmit, to a UE, an indication of a second set of one or more beams based on the expired inactivity timer, the second set of one or more beams different from the first set of one or more beams, and communicate with the UE according to the second set of one or more beams.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
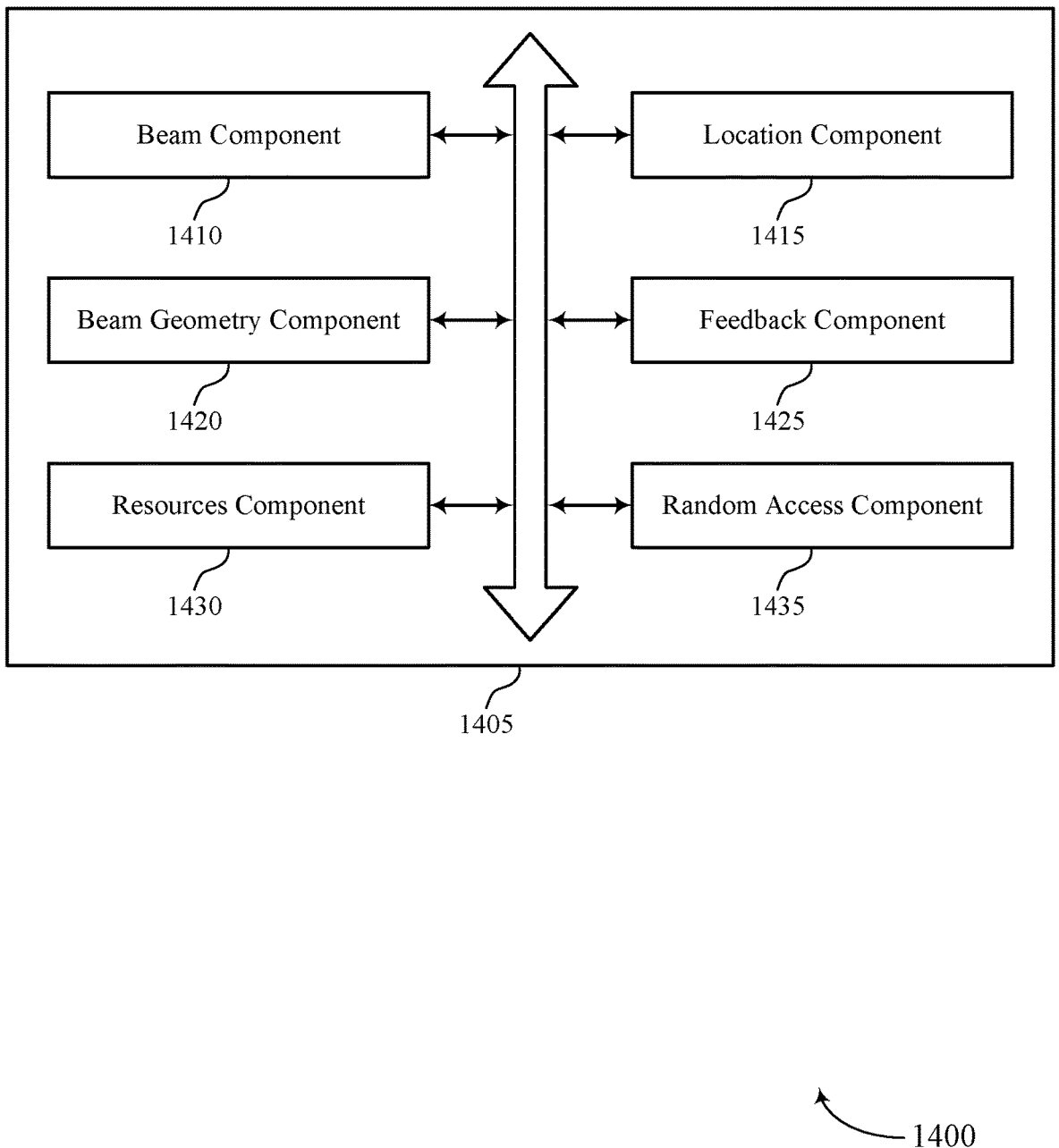
FIG. 14 shows a block diagram of a communications manager that supports default beam for communication networks in accordance with one or more aspects of the present disclosure.

FIG. 14 shows a block diagram 1400 of a communications manager 1405 that supports default beam for communication networks in accordance with one or more aspects of the present disclosure. The communications manager 1405 may be an example of aspects of a communications manager 1215, a communications manager 1315, or a communications manager 1510 described herein. The communications manager 1405 may include a beam component 1410, a location component 1415, a beam geometry component 1420, a feedback component 1425, a resources component 1430, and a random access component 1435. Each of these modules may communicate, directly or indirectly, with one another (e.g., via one or more buses).

The beam component 1410 may transmit, to a UE, a message via a first set of one or more beams.

The location component 1415 may identify location information corresponding to a location of the UE with respect to the network entity. In some examples, the location component 1415 may receive, from the UE, an indication of the location information corresponding to the location of the UE with respect to the network entity. In some examples, the location component 1415 may receive, from the UE, an indication of a set of coordinates corresponding to the location of the UE.

The beam geometry component 1420 may determine beam geometry information for one or more beams associated with the network entity. In some examples, the beam geometry component 1420 may transmit, to the UE, an indication of the determined beam geometry information. In some examples, the beam geometry component 1420 may identify the beam geometry information as a function of time. In some examples, the beam geometry component 1420 may calculate one or more parameters associated with the beam geometry information based on an altitude of the network entity, a speed of the network entity, a direction of the one or more beams, an angular width of the one or more beams or a combination thereof. In some cases, the beam geometry information is associated with the first set of one or more beams. In some cases, the beam geometry information includes a shape, a size, a velocity, an angular width, or a combination associated with the one or more beams.

In some examples, the beam component 1410 may identify a second set of one or more beams based on the location information. In some examples, the beam component 1410 may transmit, to the UE, an indication of the second set of one or more beams. In some other examples, the beam component 1410 may receive, from the UE, an indication of the second set of one or more beams. The feedback component 1425 may transmit a feedback message based on the received indication.

In some examples, the beam component 1410 may determine an inactivity timer associated with a first set of one or more beams used for communicating with a network entity has expired. In some examples, the beam component 1410 may transmit, to a UE, an indication of a second set of one or more beams based on the expired inactivity timer, the second set of one or more beams different from the first set of one or more beams.

In some examples, the beam component 1410 may communicate with the UE according to the second set of one or more beams, the second set of one or more beams different from the first set of one or more beams. In some cases, the second set of one or more beams includes a set of beam tuples, each beam tuple of the set of beam tuples including a subset of the second set of one or more beams and each beam tuple associated with a time interval during which the UE is communicating with the network entity using the beam tuple. In some cases, the UE and the network entity are nodes in a non-terrestrial network (NTN).

The resources component 1430 may transmit, to the UE, an indication of one or more resources associated with the second set of one or more beams, the one or more resources allocated for a scheduling request. In some examples, the resources component 1430 may receive, from the UE, the scheduling request during the one or more resources. The random access component 1435 may transmit, to the UE, an indication of a random access preamble and a random access occasion associated with a CFRA procedure.

Figure 15:
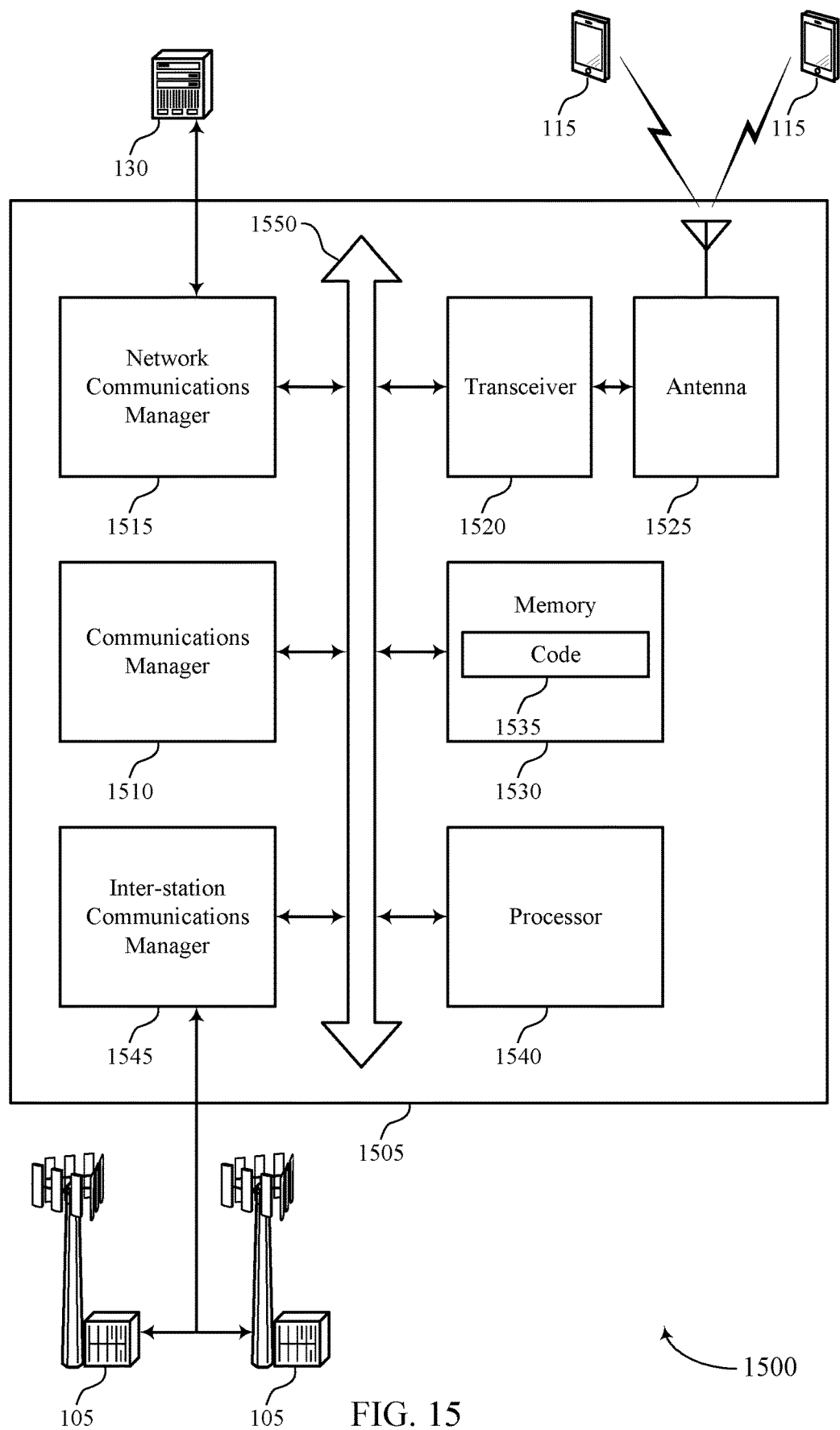
FIG. 15 shows a diagram of a system including a device that supports default beam for communication networks in accordance with one or more aspects of the present disclosure.

FIG. 15 shows a diagram of a system 1500 including a device 1505 that supports default beam for communication networks in accordance with one or more aspects of the present disclosure. The device 1505 may be an example of or include the components of device 1205, device 1305, or a satellite (e.g., a satellite 120, 220, 320, 620, or 720), or a network entity, as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a message via a first set of one or more beams, communicate with the UE according to a second set of one or more beams, the second set of one or more beams different from the first set of one or more beams, identify location information corresponding to a location of the UE with respect to the network entity, determine beam geometry information for one or more beams associated with the network entity, and transmit, to the UE, an indication of the determined beam geometry information. The communications manager 1510 may also determine an inactivity timer associated with a first set of one or more beams used for communicating with a UE has expired, transmit, to a UE, an indication of a second set of one or more beams based on the expired inactivity timer, the second set of one or more beams different from the first set of one or more beams, and communicate with the UE according to the second set of one or more beams.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting default beam for communication networks).

The inter-station communications manager 1545 may manage communications with other satellites (e.g., a satellites 120, 220, 320, 620, or 720), or network entities, and may include a controller or scheduler for controlling communications with UEs 115 in cooperation with other satellites. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between satellites (e.g., a satellite 120, 220, 320, 620, or 720), or a network entities.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
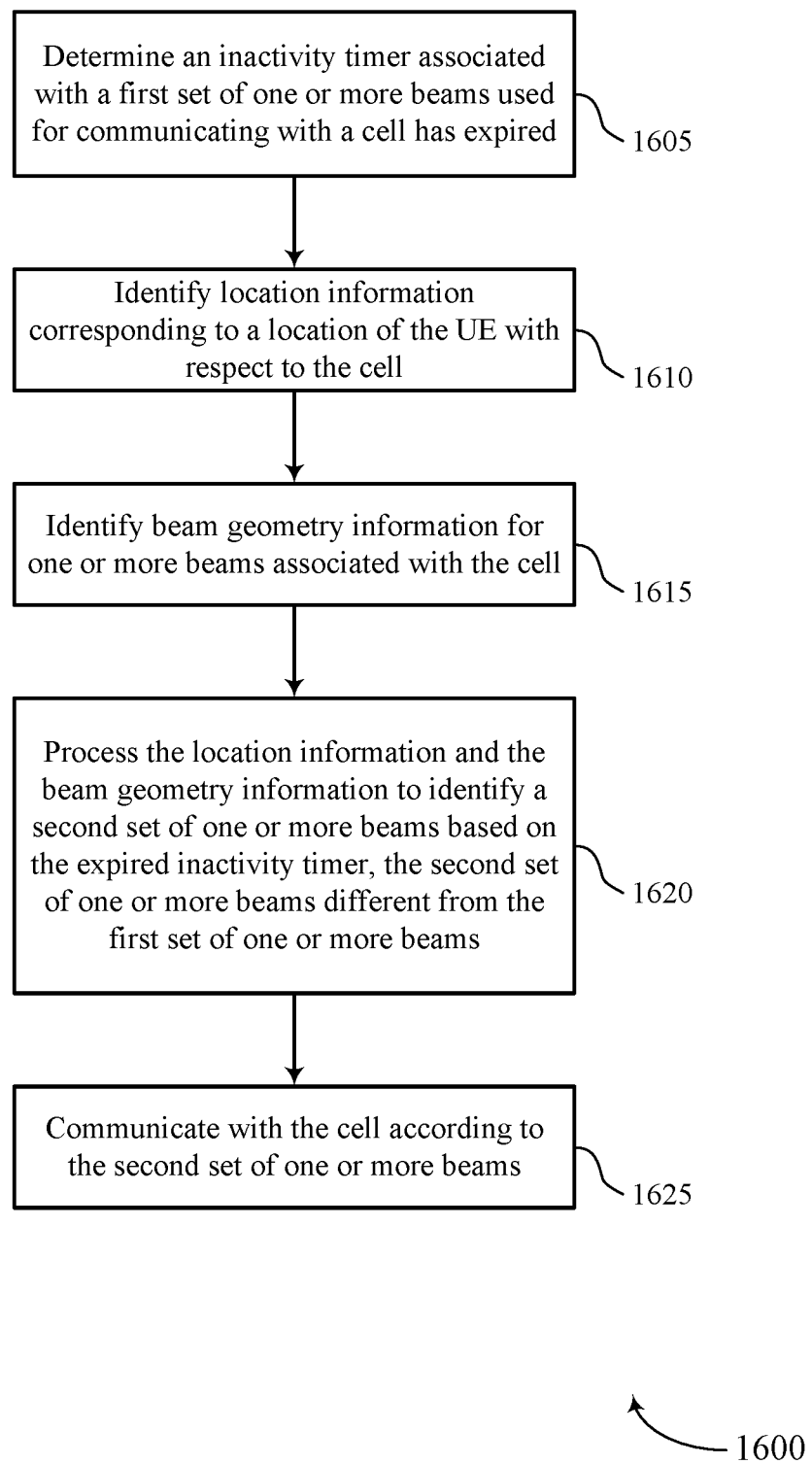
FIGS. 16 through 28 show flowcharts illustrating methods that support default beam for communication networks in accordance with one or more aspects of the present disclosure.

FIG. 16 shows a flowchart illustrating a method 1600 that supports default beam for communication networks in accordance with one or more aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may determine an inactivity timer associated with a first set of one or more beams used for communicating with a network entity has expired. The operations of 1605 may be performed according to the methods described herein. In some examples, aspects of the operations of 1605 may be performed by an inactivity timer component as described with reference to FIGS. 8 through 11.

At 1610, the UE may identify location information corresponding to a location of the UE with respect to the network entity. The operations of 1610 may be performed according to the methods described herein. In some examples, aspects of the operations of 1610 may be performed by a location component as described with reference to FIGS. 8 through 11.

At 1615, the UE may identify beam geometry information for one or more beams associated with the network entity. The operations of 1615 may be performed according to the methods described herein. In some examples, aspects of the operations of 1615 may be performed by a beam geometry component as described with reference to FIGS. 8 through 11.

At 1620, the UE may process the location information and the beam geometry information to identify a second set of one or more beams based on the expired inactivity timer, the second set of one or more beams different from the first set of one or more beams. The operations of 1620 may be performed according to the methods described herein. In some examples, aspects of the operations of 1620 may be performed by a beam component as described with reference to FIGS. 8 through 11.

At 1625, the UE may communicate with the network entity according to the second set of one or more beams. The operations of 1625 may be performed according to the methods described herein. In some examples, aspects of the operations of 1625 may be performed by a beam component as described with reference to FIGS. 8 through 11.

Figure 17:
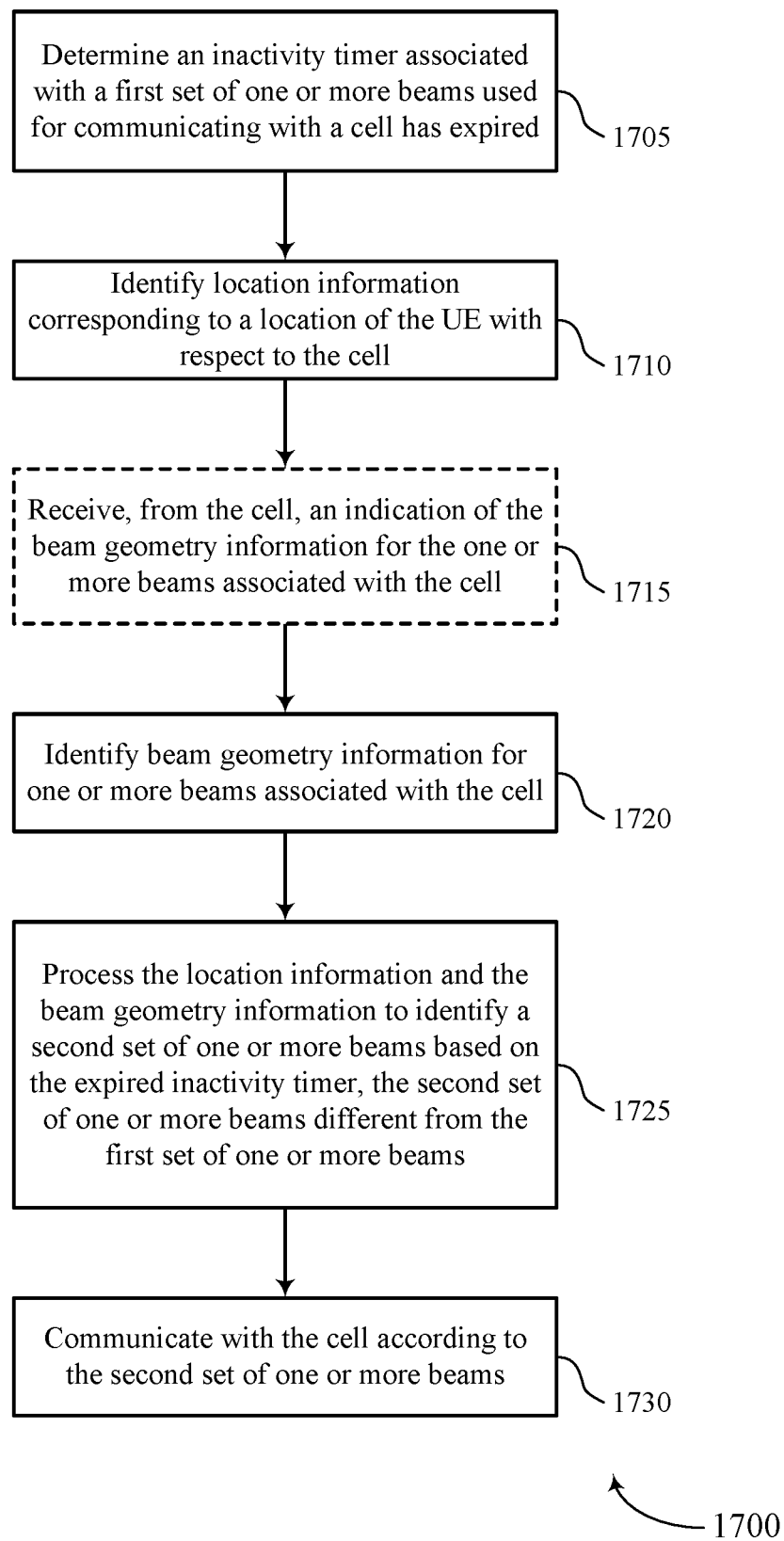

FIG. 17 shows a flowchart illustrating a method 1700 that supports default beam for communication networks in accordance with one or more aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may determine an inactivity timer associated with a first set of one or more beams used for communicating with a network entity has expired. The operations of 1705 may be performed according to the methods described herein. In some examples, aspects of the operations of 1705 may be performed by an inactivity timer component as described with reference to FIGS. 8 through 11.

At 1710, the UE may identify location information corresponding to a location of the UE with respect to the network entity. The operations of 1710 may be performed according to the methods described herein. In some examples, aspects of the operations of 1710 may be performed by a location component as described with reference to FIGS. 8 through 11.

At 1715, the UE may receive, from the network entity, an indication of the beam geometry information for the one or more beams associated with the network entity. The operations of 1715 may be performed according to the methods described herein. In some examples, aspects of the operations of 1715 may be performed by a beam geometry component as described with reference to FIGS. 8 through 11.

At 1720, the UE may identify beam geometry information for one or more beams associated with the network entity. The operations of 1720 may be performed according to the methods described herein. In some examples, aspects of the operations of 1720 may be performed by a beam geometry component as described with reference to FIGS. 8 through 11.

At 1725, the UE may process the location information and the beam geometry information to identify a second set of one or more beams based on the expired inactivity timer, the second set of one or more beams different from the first set of one or more beams. The operations of 1725 may be performed according to the methods described herein. In some examples, aspects of the operations of 1725 may be performed by a beam component as described with reference to FIGS. 8 through 11.

At 1730, the UE may communicate with the network entity according to the second set of one or more beams. The operations of 1730 may be performed according to the methods described herein. In some examples, aspects of the operations of 1730 may be performed by a beam component as described with reference to FIGS. 8 through 11.

Figure 18:
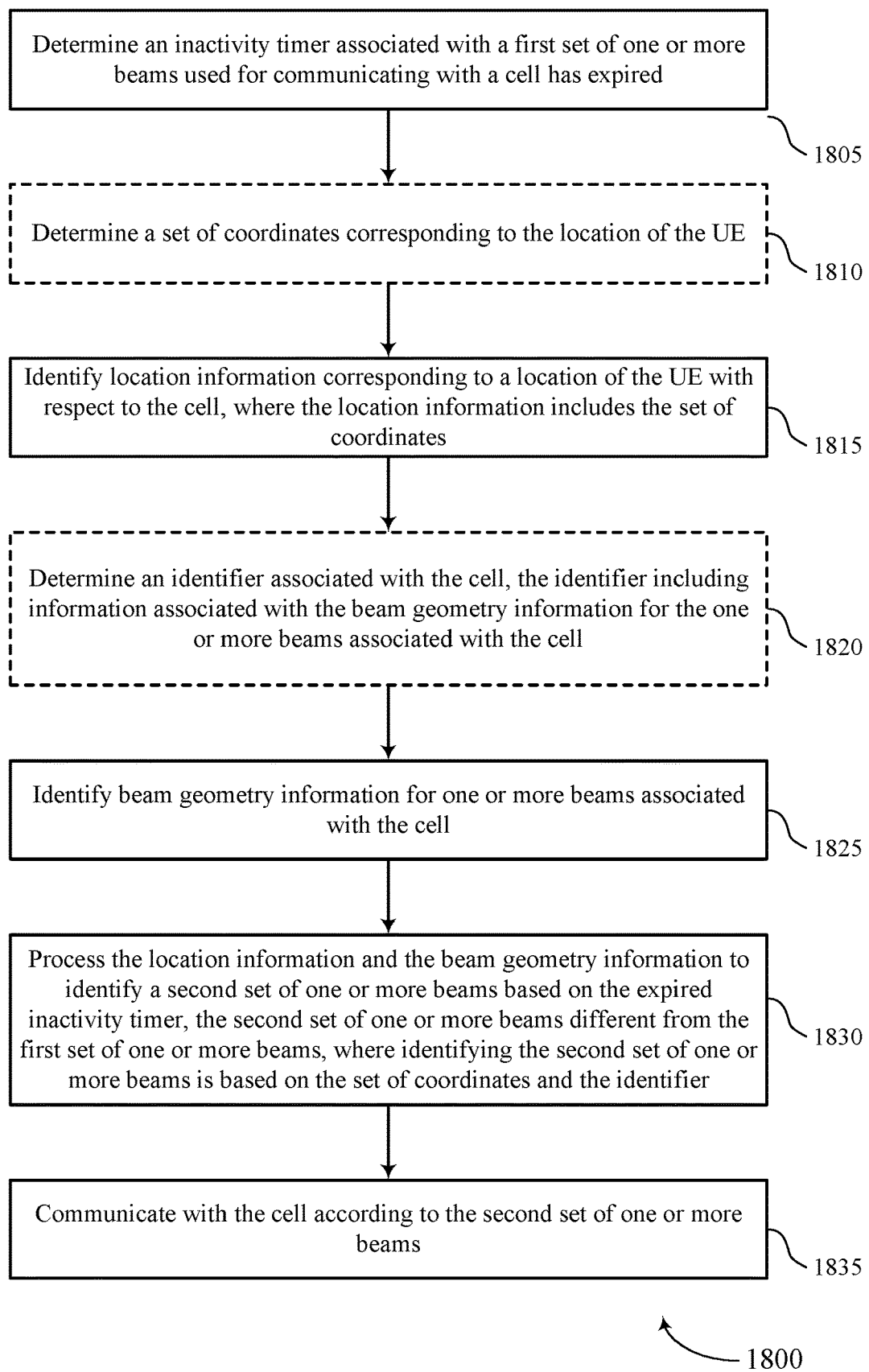

FIG. 18 shows a flowchart illustrating a method 1800 that supports default beam for communication networks in accordance with one or more aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may determine an inactivity timer associated with a first set of one or more beams used for communicating with a network entity has expired. The operations of 1805 may be performed according to the methods described herein. In some examples, aspects of the operations of 1805 may be performed by an inactivity timer component as described with reference to FIGS. 8 through 11.

At 1810, the UE may determine a set of coordinates corresponding to the location of the UE. The operations of 1810 may be performed according to the methods described herein. In some examples, aspects of the operations of 1810 may be performed by a location component as described with reference to FIGS. 8 through 11.

At 1815, the UE may identify location information corresponding to a location of the UE with respect to the network entity, where the location information includes the set of coordinates. The operations of 1815 may be performed according to the methods described herein. In some examples, aspects of the operations of 1815 may be performed by a location component as described with reference to FIGS. 8 through 11.

At 1820, the UE may determine an identifier associated with the network entity, the identifier including information associated with the beam geometry information for the one or more beams associated with the network entity. The operations of 1820 may be performed according to the methods described herein. In some examples, aspects of the operations of 1820 may be performed by a beam component as described with reference to FIGS. 8 through 11.

At 1825, the UE may identify beam geometry information for one or more beams associated with the network entity. The operations of 1825 may be performed according to the methods described herein. In some examples, aspects of the operations of 1825 may be performed by a beam geometry component as described with reference to FIGS. 8 through 11.

At 1830, the UE may process the location information and the beam geometry information to identify a second set of one or more beams based on the expired inactivity timer, the second set of one or more beams different from the first set of one or more beams, where identifying the second set of one or more beams is based on the set of coordinates and the identifier. The operations of 1830 may be performed according to the methods described herein. In some examples, aspects of the operations of 1830 may be performed by a beam component as described with reference to FIGS. 8 through 11.

At 1835, the UE may communicate with the network entity according to the second set of one or more beams. The operations of 1835 may be performed according to the methods described herein. In some examples, aspects of the operations of 1835 may be performed by a beam component as described with reference to FIGS. 8 through 11.

Figure 19:
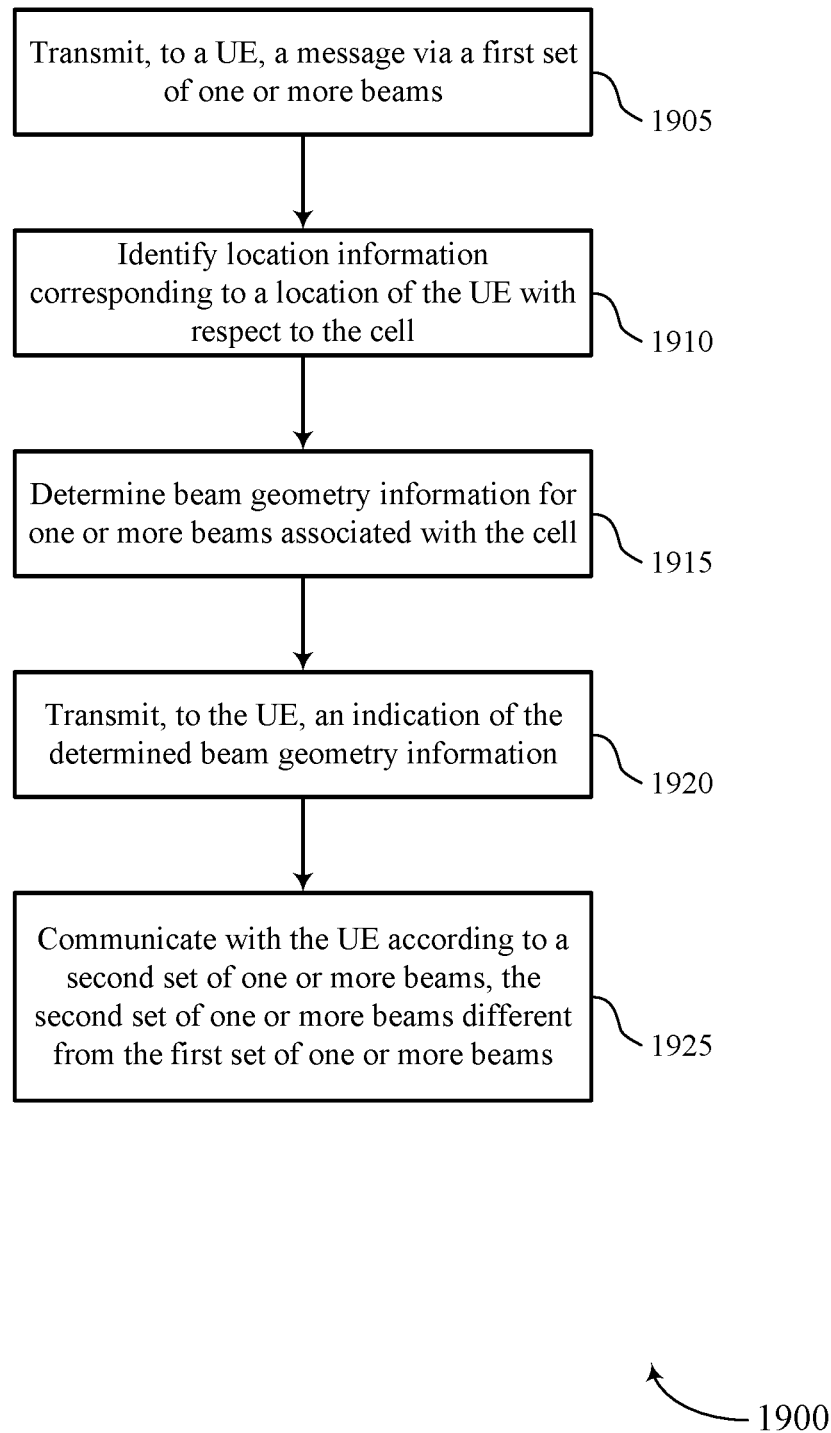

FIG. 19 shows a flowchart illustrating a method 1900 that supports default beam for communication networks in accordance with one or more aspects of the present disclosure. The operations of method 1900 may be implemented by a satellite (e.g., a satellite 120, 220, 320, 620, or 720), or a network entity, or its components as described herein. For example, the operations of method 1900 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 1905, the network entity may transmit, to a UE, a message via a first set of one or more beams. The operations of 1905 may be performed according to the methods described herein. In some examples, aspects of the operations of 1905 may be performed by a beam component as described with reference to FIGS. 12 through 15.

At 1910, the network entity may identify location information corresponding to a location of the UE with respect to the network entity. The operations of 1910 may be performed according to the methods described herein. In some examples, aspects of the operations of 1910 may be performed by a location component as described with reference to FIGS. 12 through 15.

At 1915, the network entity may determine beam geometry information for one or more beams associated with the network entity. The operations of 1915 may be performed according to the methods described herein. In some examples, aspects of the operations of 1915 may be performed by a beam geometry component as described with reference to FIGS. 12 through 15.

At 1920, the network entity may transmit, to the UE, an indication of the determined beam geometry information. The operations of 1920 may be performed according to the methods described herein. In some examples, aspects of the operations of 1920 may be performed by a beam geometry component as described with reference to FIGS. 12 through 15.

At 1925, the network entity may communicate with the UE according to a second set of one or more beams, the second set of one or more beams different from the first set of one or more beams. The operations of 1925 may be performed according to the methods described herein. In some examples, aspects of the operations of 1925 may be performed by a beam component as described with reference to FIGS. 12 through 15.

Figure 20:
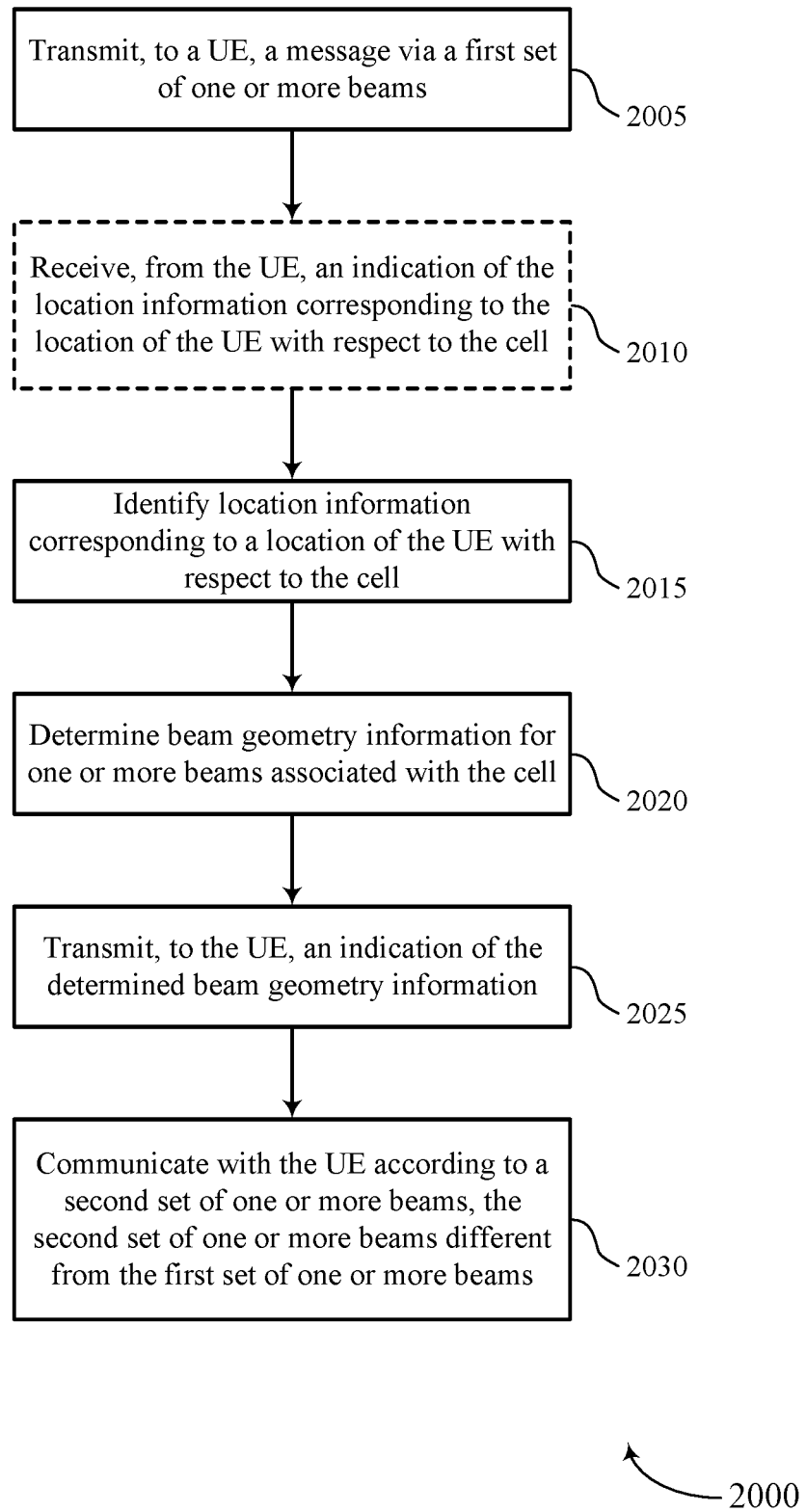

FIG. 20 shows a flowchart illustrating a method 2000 that supports default beam for communication networks in accordance with one or more aspects of the present disclosure. The operations of method 2000 may be implemented by a satellite (e.g., a satellite 120, 220, 320, 620, or 720), or a network entity or its components as described herein. For example, the operations of method 2000 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2005, the network entity may transmit, to a UE, a message via a first set of one or more beams. The operations of 2005 may be performed according to the methods described herein. In some examples, aspects of the operations of 2005 may be performed by a beam component as described with reference to FIGS. 12 through 15.

At 2010, the network entity may receive, from the UE, an indication of the location information corresponding to the location of the UE with respect to the network entity. The operations of 2010 may be performed according to the methods described herein. In some examples, aspects of the operations of 2010 may be performed by a location component as described with reference to FIGS. 12 through 15.

At 2015, the network entity may identify location information corresponding to a location of the UE with respect to the network entity. The operations of 2015 may be performed according to the methods described herein. In some examples, aspects of the operations of 2015 may be performed by a location component as described with reference to FIGS. 12 through 15.

At 2020, the network entity may determine beam geometry information for one or more beams associated with the network entity. The operations of 2020 may be performed according to the methods described herein. In some examples, aspects of the operations of 2020 may be performed by a beam geometry component as described with reference to FIGS. 12 through 15.

At 2025, the network entity may transmit, to the UE, an indication of the determined beam geometry information. The operations of 2025 may be performed according to the methods described herein. In some examples, aspects of the operations of 2025 may be performed by a beam geometry component as described with reference to FIGS. 12 through 15.

At 2030, the network entity may communicate with the UE according to a second set of one or more beams, the second set of one or more beams different from the first set of one or more beams. The operations of 2030 may be performed according to the methods described herein. In some examples, aspects of the operations of 2030 may be performed by a beam component as described with reference to FIGS. 12 through 15.

Figure 21:
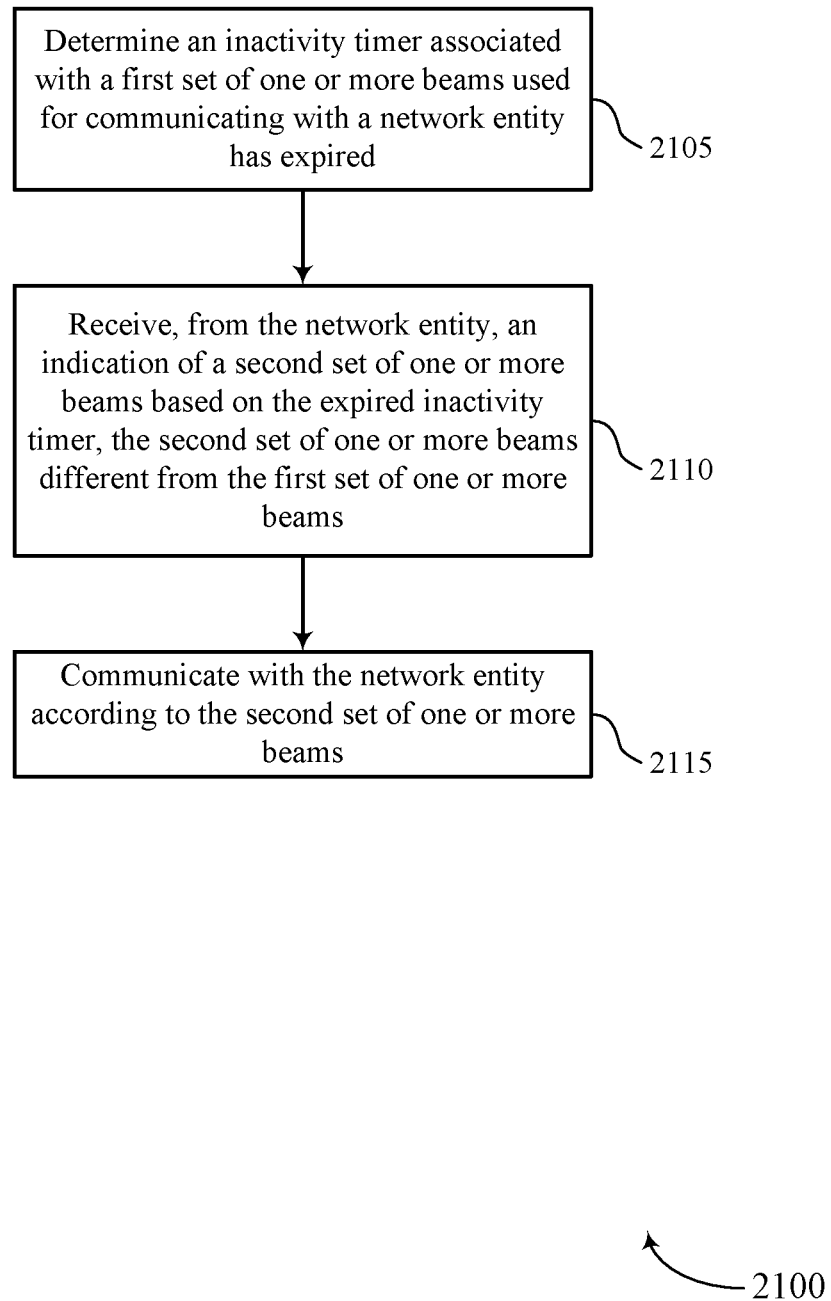

FIG. 21 shows a flowchart illustrating a method 2100 that supports default beam for communication networks in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may determine an inactivity timer associated with a first set of one or more beams used for communicating with a network entity has expired. The operations of 2105 may be performed according to the methods described herein. In some examples, aspects of the operations of 2105 may be performed by a beam component as described with reference to FIGS. 8 through 11.

At 2110, the UE may receive, from the network entity, an indication of a second set of one or more beams based on the expired inactivity timer, the second set of one or more beams different from the first set of one or more beams. The operations of 2110 may be performed according to the methods described herein. In some examples, aspects of the operations of 2110 may be performed by a beam component as described with reference to FIGS. 8 through 11.

At 2115, the UE may communicate with the network entity according to the second set of one or more beams. The operations of 2115 may be performed according to the methods described herein. In some examples, aspects of the operations of 2115 may be performed by a beam component as described with reference to FIGS. 8 through 11.

Figure 22:
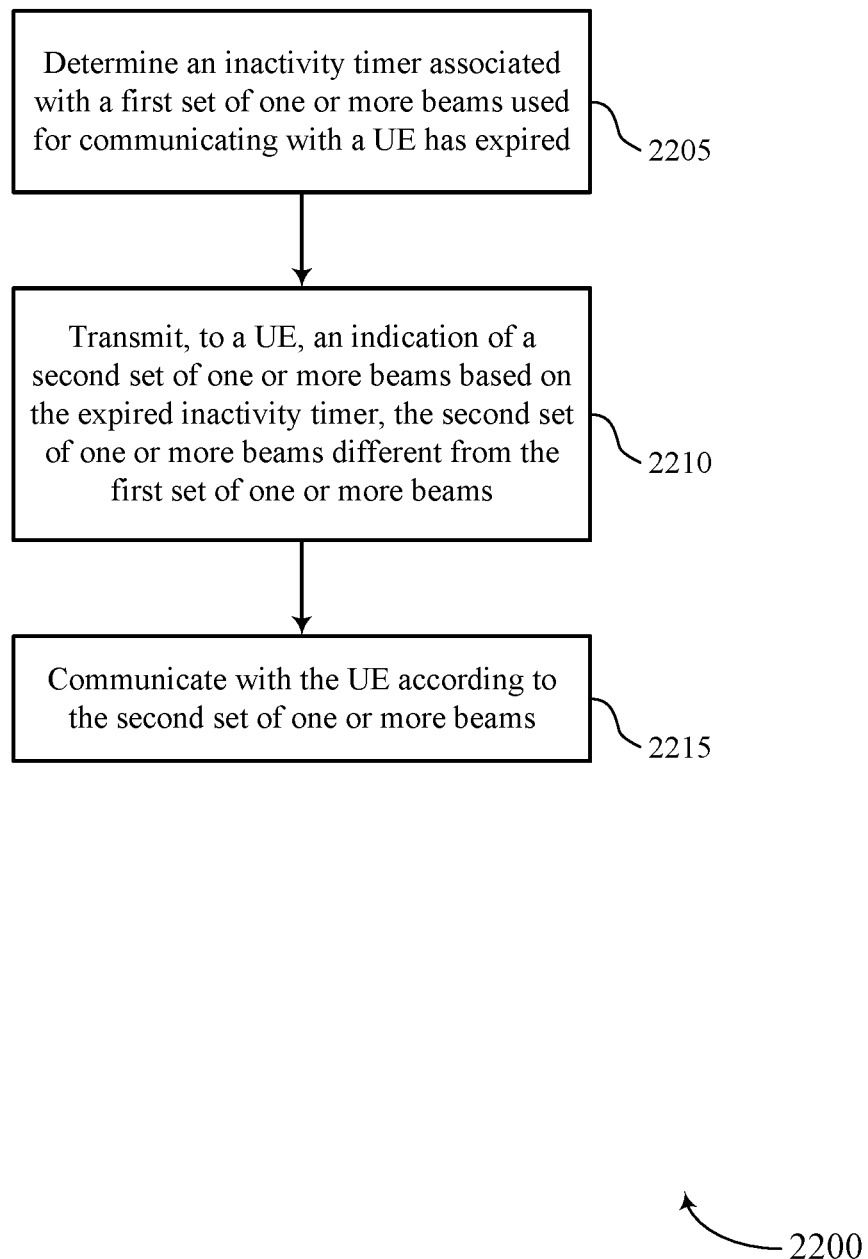

FIG. 22 shows a flowchart illustrating a method 2200 that supports default beam for communication networks in accordance with aspects of the present disclosure. The operations of method 2200 may be implemented by a satellite (e.g., a satellite 120, 220, 320, 620, or 720), or a network entity or its components as described herein. For example, the operations of method 2200 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2205, the network entity may determine an inactivity timer associated with a first set of one or more beams used for communicating with a UE has expired. The operations of 2205 may be performed according to the methods described herein. In some examples, aspects of the operations of 2205 may be performed by a beam component as described with reference to FIGS. 12 through 15.

At 2210, the network entity may transmit, to a UE, an indication of a second set of one or more beams based on the expired inactivity timer, the second set of one or more beams different from the first set of one or more beams. The operations of 2210 may be performed according to the methods described herein. In some examples, aspects of the operations of 2210 may be performed by a beam component as described with reference to FIGS. 12 through 15.

At 2215, the network entity may communicate with the UE according to the second set of one or more beams. The operations of 2215 may be performed according to the methods described herein. In some examples, aspects of the operations of 2215 may be performed by a beam component as described with reference to FIGS. 12 through 15.

Figure 23:
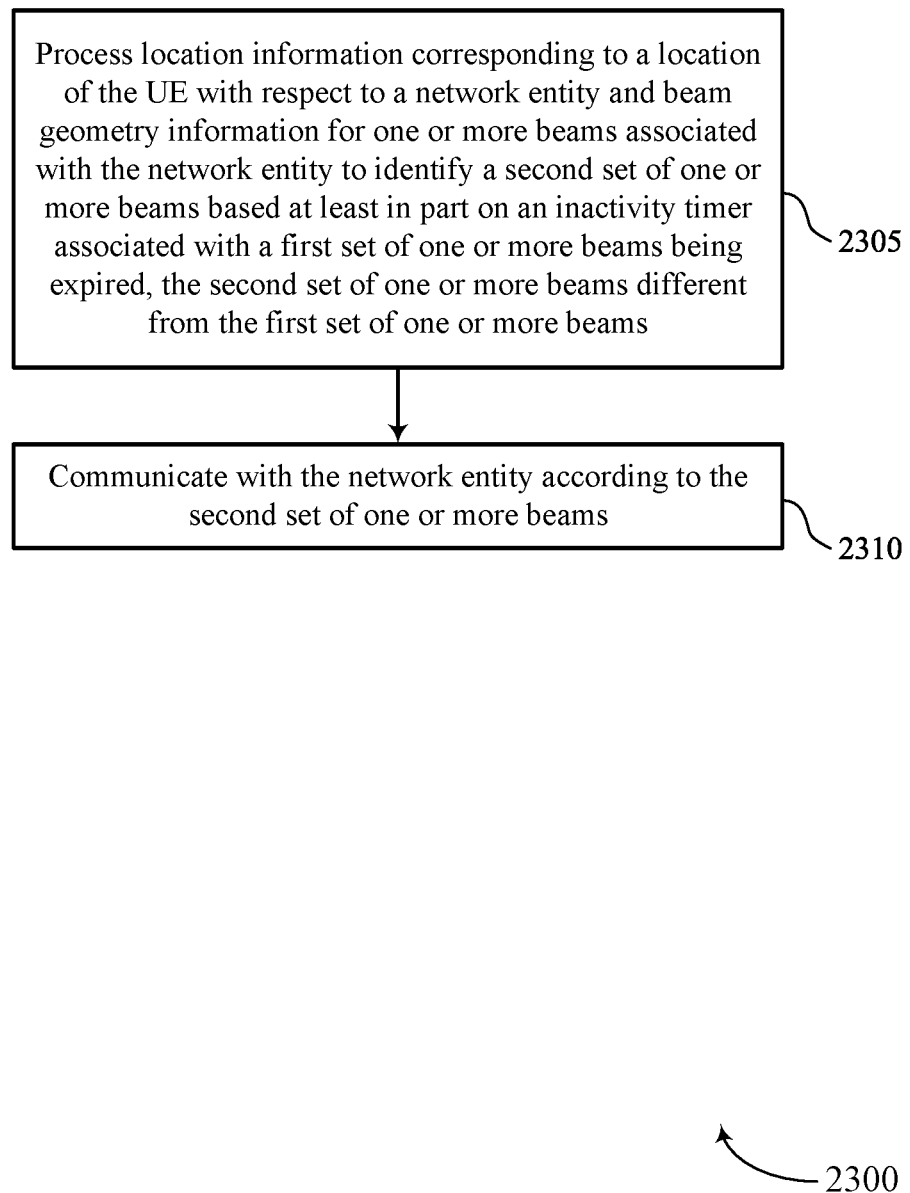

FIG. 23 shows a flowchart illustrating a method 2300 that supports default beam for communication networks in accordance with one or more aspects of the present disclosure. The operations of method 2300 may be implemented by a UE 115 or its components as described herein. For example, the operations of method 2300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2305, the method may include processing location information corresponding to a location of the UE with respect to a network entity and beam geometry information for one or more beams associated with the network entity to identify a second set of one or more beams based on an inactivity timer associated with a first set of one or more beams being expired, the second set of one or more beams different from the first set of one or more beams. The operations of 2305 may be performed in accordance with examples as disclosed herein. In some examples, aspects of the operations of 2305 may be performed by a beam component as described with reference to FIGS. 8 through 11.

At 2310, the method may include communicating with the network entity according to the second set of one or more beams. The operations of 2310 may be performed in accordance with examples as disclosed herein. In some examples, aspects of the operations of 2310 may be performed by a beam component as described with reference to FIGS. 8 through 11.

Figure 24:
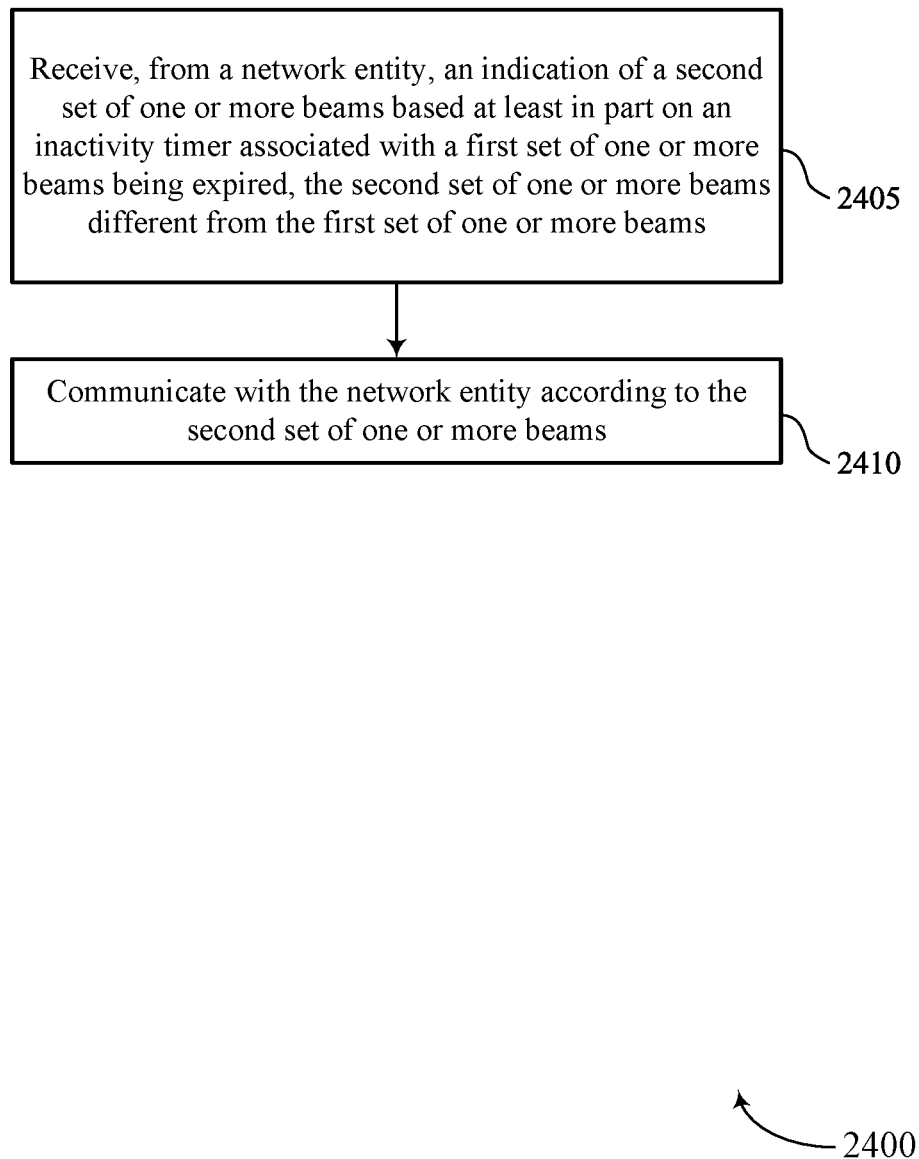

FIG. 24 shows a flowchart illustrating a method 2400 that supports default beam for communication networks in accordance with one or more aspects of the present disclosure. The operations of method 2400 may be implemented by a UE 115 or its components as described herein. For example, the operations of method 2400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2405, the method may include receiving, from a network entity, an indication of a second set of one or more beams based on an inactivity timer associated with a first set of one or more beams being expired, the second set of one or more beams different from the first set of one or more beams. The operations of 2405 may be performed in accordance with examples as disclosed herein. In some examples, aspects of the operations of 2405 may be performed by a beam component as described with reference to FIGS. 8 through 11.

At 2410, the method may include communicating with the network entity according to the second set of one or more beams. The operations of 2410 may be performed in accordance with examples as disclosed herein. In some examples, aspects of the operations of 2410 may be performed by a beam component as described with reference to FIGS. 8 through 11.

Figure 25:
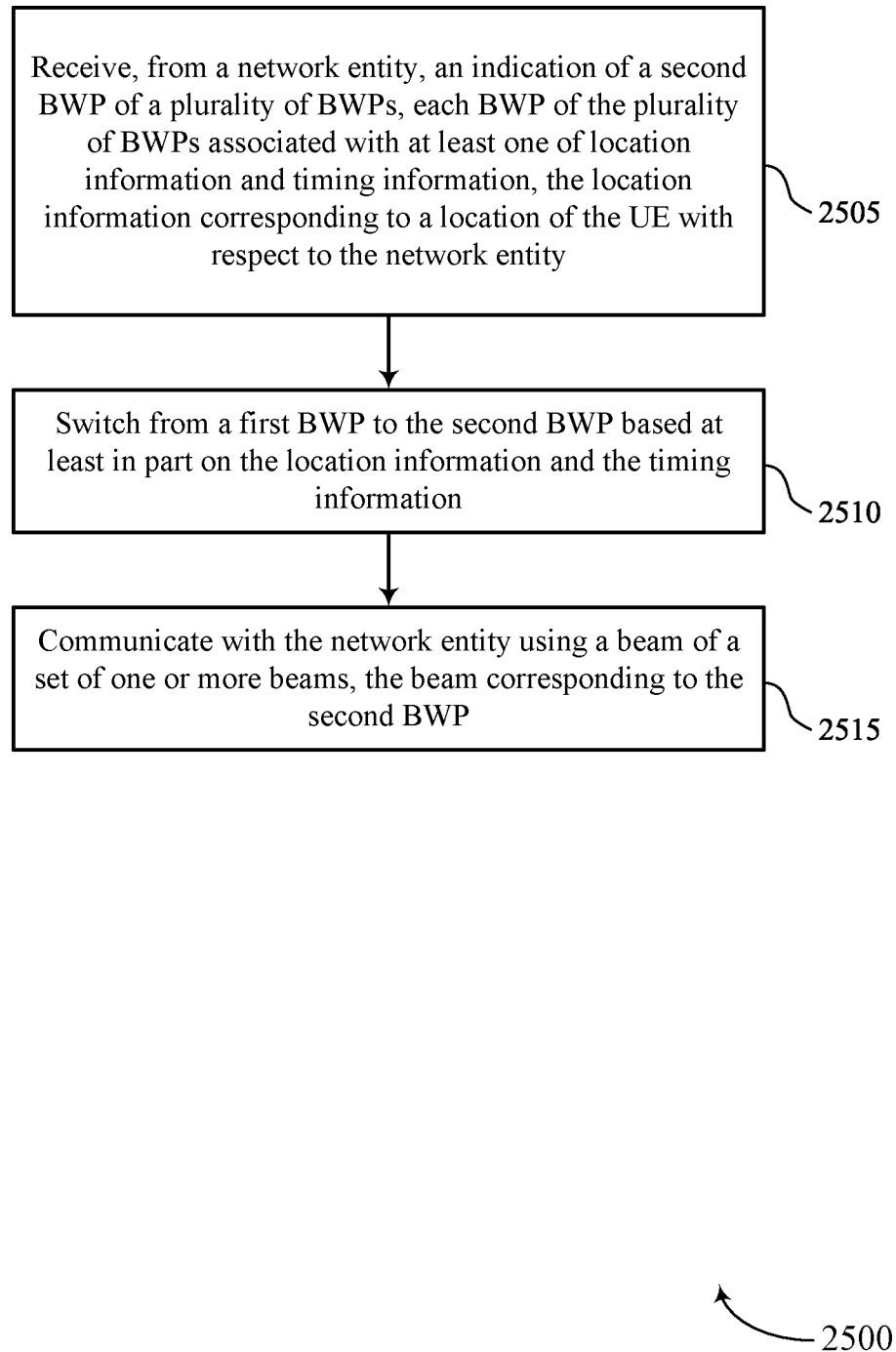

FIG. 25 shows a flowchart illustrating a method 2500 that supports default beam for communication networks in accordance with one or more aspects of the present disclosure. The operations of method 2500 may be implemented by a UE 115 or its components as described herein. For example, the operations of method 2500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2505, the method may include receiving, from a network entity, an indication of a second BWP of a set of multiple BWPs, each BWP of the set of multiple BWPs associated with at least one of location information and timing information, the location information corresponding to a location of the UE with respect to the network entity. The operations of 2505 may be performed in accordance with examples as disclosed herein. In some examples, aspects of the operations of 2505 may be performed by a beam component as described with reference to FIGS. 8 through 11.

At 2510, the method may include switching from a first BWP to the second BWP based on the location information and the timing information. The operations of 2510 may be performed in accordance with examples as disclosed herein. In some examples, aspects of the operations of 2510 may be performed by a beam component as described with reference to FIGS. 8 through 11.

At 2515, the method may include communicating with the network entity using a beam of a set of one or more beams, the beam corresponding to the second BWP. The operations of 2515 may be performed in accordance with examples as disclosed herein. In some examples, aspects of the operations of 2515 may be performed by a beam component as described with reference to FIGS. 8 through 11.

Figure 26:
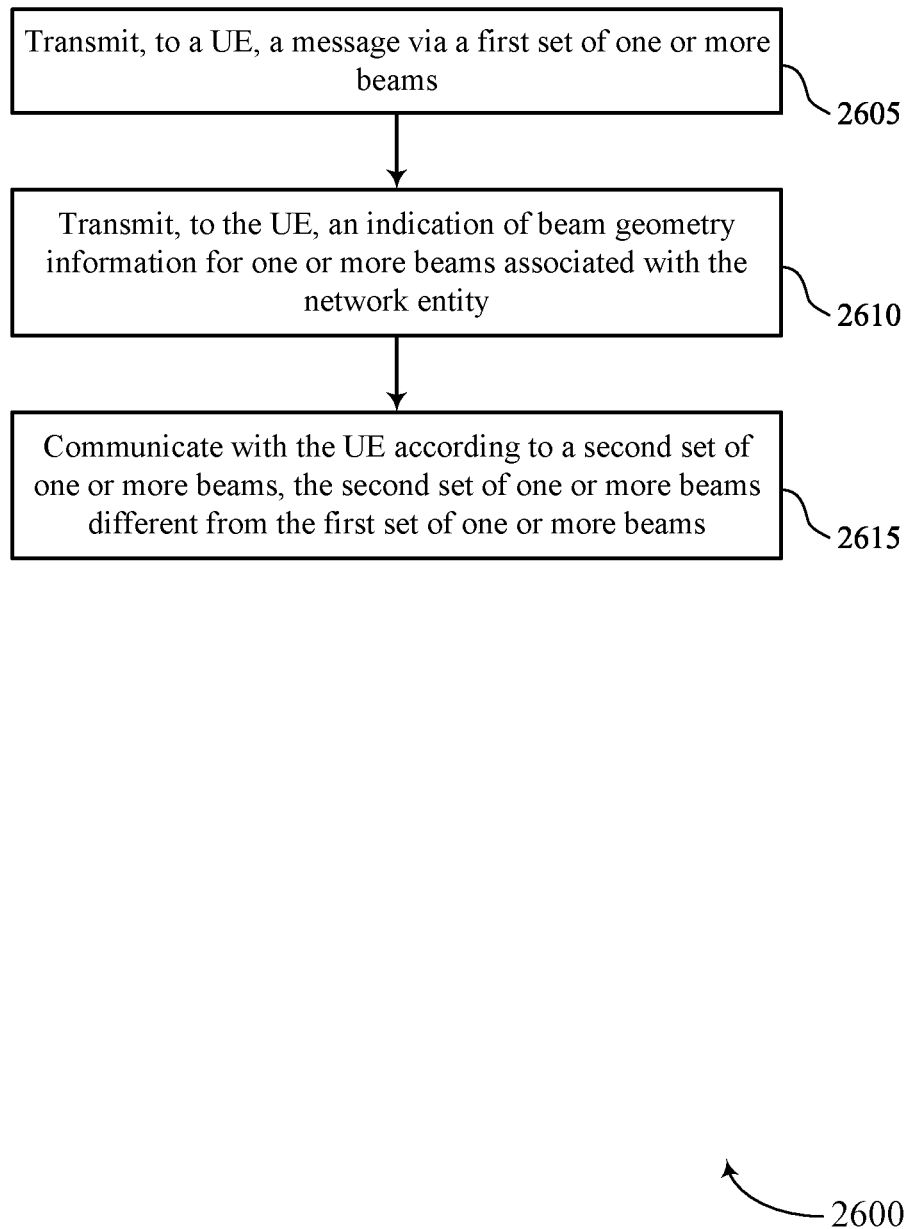

FIG. 26 shows a flowchart illustrating a method 2600 that supports default beam for communication networks in accordance with aspects of the present disclosure. The operations of method 2600 may be implemented by a satellite (e.g., a satellite 120, 220, 320, 620, or 720), or a network entity or its components as described herein. For example, the operations of method 2600 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2605, the method may include transmitting, to a UE, a message via a first set of one or more beams. The operations of 2605 may be performed in accordance with examples as disclosed herein. In some examples, aspects of the operations of 2605 may be performed by a beam component as described with reference to FIGS. 12 through 15.

At 2610, the method may include transmitting, to the UE, an indication of beam geometry information for one or more beams associated with the network entity. The operations of 2610 may be performed in accordance with examples as disclosed herein. In some examples, aspects of the operations of 2610 may be performed by a beam component as described with reference to FIGS. 12 through 15.

At 2615, the method may include communicating with the UE according to a second set of one or more beams, the second set of one or more beams different from the first set of one or more beams. The operations of 2615 may be performed in accordance with examples as disclosed herein. In some examples, aspects of the operations of 2615 may be performed by a beam component as described with reference to FIGS. 12 through 15.

Figure 27:
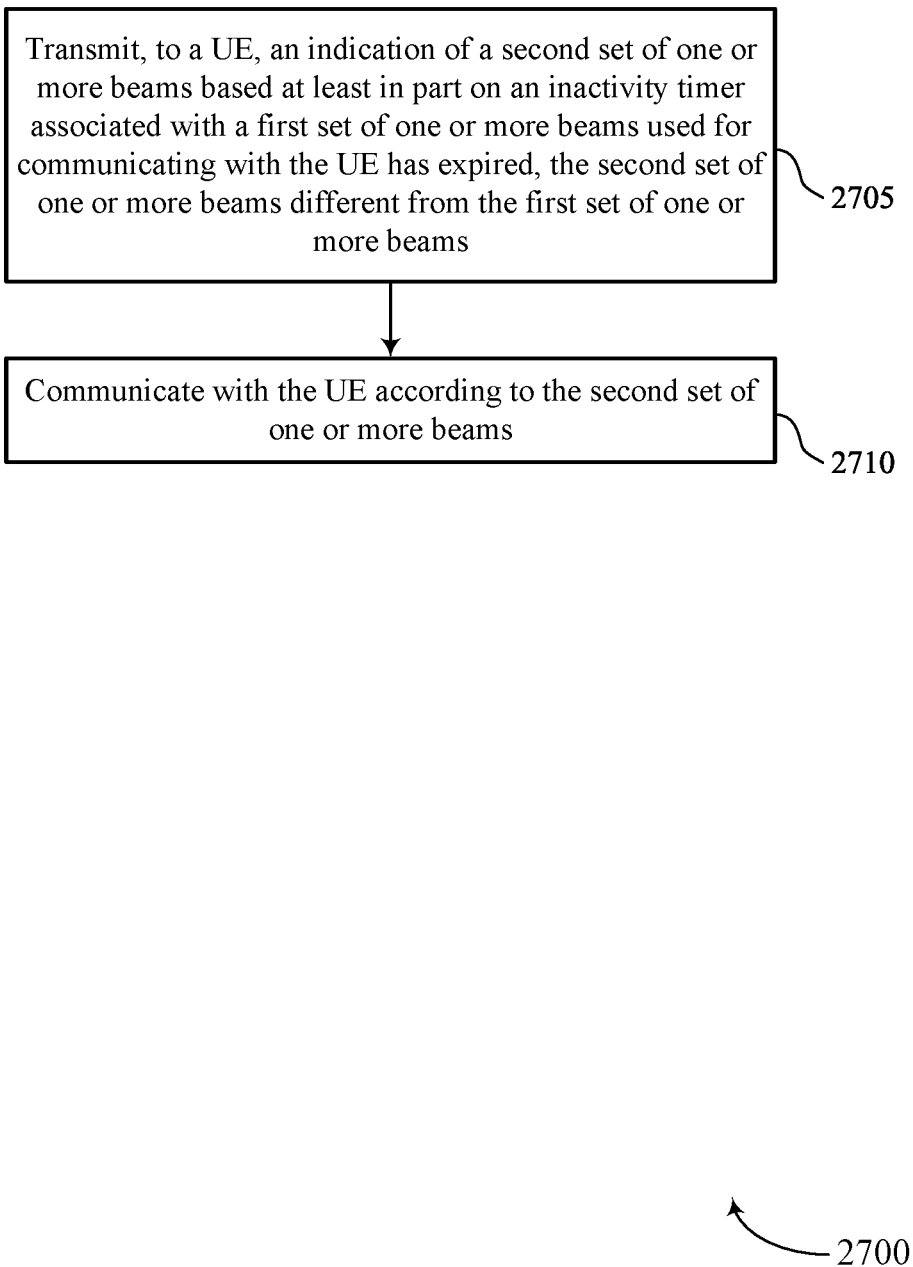

FIG. 27 shows a flowchart illustrating a method 2700 that supports default beam for communication networks in accordance with aspects of the present disclosure. The operations of method 2700 may be implemented by a satellite (e.g., a satellite 120, 220, 320, 620, or 720), or a network entity or its components as described herein. For example, the operations of method 2700 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2705, the method may include transmitting, to a UE, an indication of a second set of one or more beams based on an inactivity timer associated with a first set of one or more beams used for communicating with the UE has expired, the second set of one or more beams different from the first set of one or more beams. The operations of 2705 may be performed in accordance with examples as disclosed herein. In some examples, aspects of the operations of 2705 may be performed by a beam component as described with reference to FIGS. 12 through 15.

At 2710, the method may include communicating with the UE according to the second set of one or more beams. The operations of 2710 may be performed in accordance with examples as disclosed herein. In some examples, aspects of the operations of 2710 may be performed by a beam component as described with reference to FIGS. 12 through 15.

Figure 28:
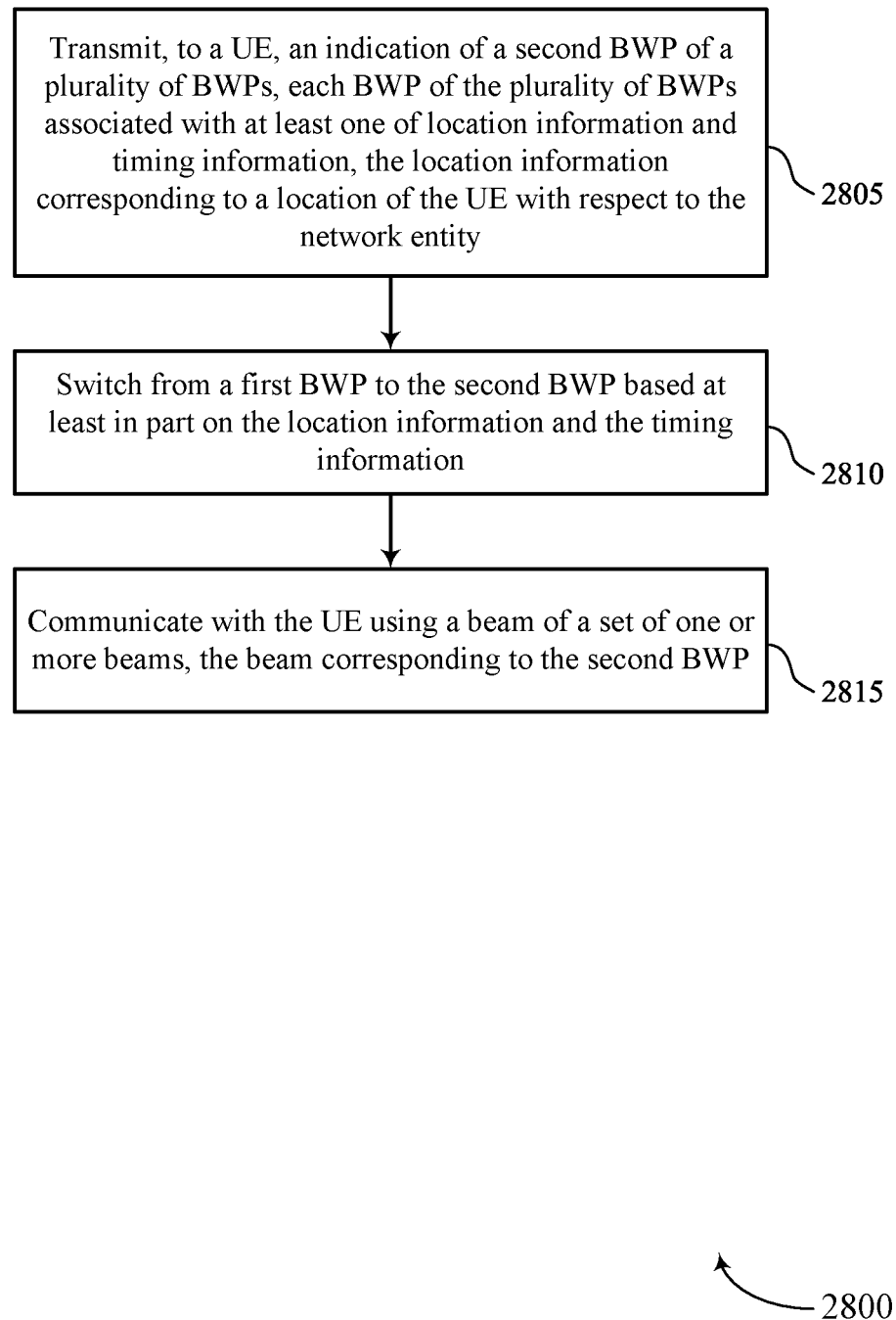

FIG. 28 shows a flowchart illustrating a method 2800 that supports default beam for communication networks in accordance with aspects of the present disclosure. The operations of method 2800 may be implemented by a satellite (e.g., a satellite 120, 220, 320, 620, or 720), or a network entity or its components as described herein. For example, the operations of method 2800 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2805, the method may include transmitting, to a UE, an indication of a second BWP of a set of multiple BWPs, each BWP of the set of multiple BWPs associated with at least one of location information and timing information, the location information corresponding to a location of the UE with respect to the network entity. The operations of 2805 may be performed in accordance with examples as disclosed herein. In some examples, aspects of the operations of 2805 may be performed by a beam component as described with reference to FIGS. 12 through 15.

At 2810, the method may include switching from a first BWP to the second BWP based on the location information and the timing information. The operations of 2810 may be performed in accordance with examples as disclosed herein. In some examples, aspects of the operations of 2810 may be performed by a beam component as described with reference to FIGS. 12 through 15.

At 2815, the method may include communicating with the UE using a beam of a set of one or more beams, the beam corresponding to the second BWP. The operations of 2815 may be performed in accordance with examples as disclosed herein. In some examples, aspects of the operations of 2815 may be performed by a beam component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: processing location information corresponding to a location of the UE with respect to a network entity and beam geometry information for one or more beams associated with the network entity to identify a second set of one or more beams based at least in part on an inactivity timer associated with a first set of one or more beams being expired, the second set of one or more beams different from the first set of one or more beams; and communicating with the network entity according to the second set of one or more beams.

Aspect 2: The method of aspect 1, further comprising: receiving, from the network entity, an indication of the beam geometry information for the one or more beams associated with the network entity.

Aspect 3: The method of aspect 2, further comprising: determining a set of coordinates corresponding to the location of the UE, wherein the location information comprises the set of coordinates; and transmitting, to the network entity, an indication of the determined set of coordinates.

Aspect 4: The method of any of aspects 2 through 3, wherein the beam geometry information is associated with the first set of one or more beams.

Aspect 5: The method of any of aspects 1 through 4, further comprising: determining a set of coordinates corresponding to the location of the UE, wherein the location information comprises the set of coordinates; and determining an identifier associated with the network entity, the identifier comprising information associated with the beam geometry information for the one or more beams associated with the network entity; and identifying the second set of one or more beams is based at least in part on the set of coordinates and the identifier.

Aspect 6: The method of any of aspects 1 through 5, wherein the second set of one or more beams comprises a plurality of beam tuples, each beam tuple of the plurality of beam tuples comprising a subset of the second set of one or more beams and each beam tuple associated with a time interval during which the UE is communicating with the network entity using the beam tuple.

Aspect 7: The method of any of aspects 1 through 6, further comprising: receiving, from the network entity, an indication of the second set of one or more beams.

Aspect 8: The method of any of aspects 1 through 7, further comprising: transmitting, to the network entity, an indication of the second set of one or more beams; and receiving a feedback message corresponding to the indication.

Aspect 9: The method of any of aspects 1 through 8, the communicating with the network entity comprises: performing a beam switching operation from the first set of one or more beams to the second set of one or more beams.

Aspect 10: The method of aspect 9, further comprising: switching to one or more bandwidth parts associated with the second set of one or more beams.

Aspect 11: The method of any of aspects 1 through 10, further comprising: determining the inactivity timer associated with the first set of one or more beams used for communicating with the network entity has expired; identifying the location information corresponding to the location of the UE with respect to the network entity; and identifying the beam geometry information for the one or more beams associated with the network entity.

Aspect 12: The method of aspect 11, the identifying the second set of one or more beams comprises: identifying one or more resources associated with the second set of one or more beams, the one or more resources allocated for a scheduling request; monitoring a downlink control channel using one or more bandwidth parts associated with the second set of one or more beams for the one or more resources; and transmitting, to the network entity, the scheduling request based at least in part on the monitoring.

Aspect 13: The method of any of aspects 11 through 12, the identifying the second set of one or more beams comprises: receiving, from the network entity, an indication of a random access preamble and a random access occasion associated with a contention free random access procedure; and performing the contention free random access procedure according to the random access preamble and the random access occasion.

Aspect 14: The method of any of aspects 11 through 13, the identifying the second set of one or more beams comprises: performing a contention based random access procedure for at least one beam of the second set of one or more beams.

Aspect 15: The method of any of aspects 11 through 14, the identifying the beam geometry information for the one or more beams associated with the network entity comprises: identifying the beam geometry information as a function of time.

Aspect 16: The method of aspect 15, wherein the beam geometry information comprises a shape, a size, a velocity, an angular width, or a combination associated with the one or more beams.

Aspect 17: The method of any of aspects 15 through 16, further comprising: calculating one or more parameters associated with the beam geometry information based at least in part on an altitude of the network entity, a speed of the network entity, a direction of the one or more beams, an angular width of the one or more beams or a combination thereof.

Aspect 18: The method of any of aspects 1 through 17, wherein the UE and the network entity are nodes in a non-terrestrial network (NTN).

Aspect 19: A method for wireless communications at a UE, comprising: receiving, from a network entity, an indication of a second set of one or more beams based at least in part on an inactivity timer associated with a first set of one or more beams being expired, the second set of one or more beams different from the first set of one or more beams; and communicating with the network entity according to the second set of one or more beams.

Aspect 20: The method of aspect 19, further comprising: determining the inactivity timer associated with the first set of one or more beams used for communicating with the network entity has expired, wherein transmitting the indication is based at least in part on determining the inactivity timer has expired and the first set of one or more beams is a sequence of beams.

Aspect 21: The method of any of aspects 19 through 20, further comprising: identifying location information corresponding to a location of the UE with respect to the network entity; and transmitting, to the network entity, the location information.

Aspect 22: The method of aspect 21, wherein the location information comprises a set of coordinates.

Aspect 23: The method of any of aspects 19 through 22, the communicating with the network entity comprises: performing a beam switching operation from the first set of one or more beams to the second set of one or more beams.

Aspect 24: The method of aspect 23, further comprising: switching to one or more bandwidth parts associated with the second set of one or more beams.

Aspect 25: The method of any of aspects 19 through 24, wherein the UE and the network entity are nodes in a non-terrestrial network (NTN).

Aspect 26: A method for wireless communications at a network entity, comprising: transmitting, to a UE, a message via a first set of one or more beams; transmitting, to the UE, an indication of beam geometry information for one or more beams associated with the network entity; and communicating with the UE according to a second set of one or more beams, the second set of one or more beams different from the first set of one or more beams.

Aspect 27: The method of aspect 26, further comprising: identifying location information corresponding to a location of the UE with respect to the network entity; and determining the beam geometry information for the one or more beams associated with the network entity.

Aspect 28: The method of aspect 27, the determining the beam geometry information comprises: receiving, from the UE, an indication of the location information corresponding to the location of the UE with respect to the network entity.

Aspect 29: The method of aspect 28, further comprising: receiving, from the UE, an indication of a set of coordinates corresponding to the location of the UE.

Aspect 30: The method of any of aspects 26 through 29, wherein the beam geometry information is associated with the first set of one or more beams.

Aspect 31: The method of any of aspects 26 through 30, further comprising: identifying the second set of one or more beams based at least in part on location information corresponding to a location of the UE; and transmitting, to the UE, an indication of the second set of one or more beams.

Aspect 32: The method of any of aspects 26 through 31, wherein the second set of one or more beams comprises a plurality of beam tuples, each beam tuple of the plurality of beam tuples comprising a subset of the second set of one or more beams and each beam tuple associated with a time interval during which the UE is communicating with the network entity using the beam tuple.

Aspect 33: The method of any of aspects 26 through 32, further comprising: receiving, from the UE, an indication of the second set of one or more beams; and transmitting a feedback message based at least in part on the received indication.

Aspect 34: The method of any of aspects 26 through 33, further comprising: transmitting, to the UE, an indication of one or more resources associated with the second set of one or more beams, the one or more resources allocated for a scheduling request; and receiving, from the UE, the scheduling request during the one or more resources.

Aspect 35: The method of any of aspects 26 through 34, further comprising: transmitting, to the UE, an indication of a random access preamble and a random access occasion associated with a contention free random access procedure.

Aspect 36: The method of any of aspects 26 through 35, further comprising: identifying the beam geometry information as a function of time.

Aspect 37: The method of aspect 36, wherein the beam geometry information comprises a shape, a size, a velocity, an angular width, or a combination associated with the one or more beams.

Aspect 38: The method of any of aspects 36 through 37, further comprising: calculating one or more parameters associated with the beam geometry information based at least in part on an altitude of the network entity, a speed of the network entity, a direction of the one or more beams, an angular width of the one or more beams or a combination thereof.

Aspect 39: The method of any of aspects 26 through 38, wherein the UE and the network entity are nodes in a non-terrestrial network (NTN).

Aspect 40: A method for wireless communications at a network entity, comprising: transmitting, to a UE, an indication of a second set of one or more beams based at least in part on an inactivity timer associated with a first set of one or more beams used for communicating with the UE has expired, the second set of one or more beams different from the first set of one or more beams; and communicating with the UE according to the second set of one or more beams.

Aspect 41: The method of aspect 40, further comprising: determining the inactivity timer associated with the first set of one or more beams used for communicating with the UE has expired, wherein transmitting the indication is based at least in part on determining the inactivity timer has expired and the first set of one or more beams is a sequence of beams.

Aspect 42: The method of any of aspects 40 through 41, further comprising: receiving, from the UE, location information corresponding to a location of the UE with respect to the network entity; and determining the second set of one or more beams based at least in part on the location information.

Aspect 43: The method of aspect 42, wherein the location information comprises a set of coordinates.

Aspect 44: The method of any of aspects 40 through 43, further comprising: determining the second set of one or more beams based at least in part on the first set of one or more beams.

Aspect 45: The method of any of aspects 40 through 44, the communicating with the network entity comprises: performing a beam switching operation from the first set of one or more beams to the second set of one or more beams.

Aspect 46: The method of aspect 45, further comprising: switching to one or more bandwidth parts associated with the second set of one or more beams.

Aspect 47: The method of any of aspects 40 through 46, wherein the UE and the network entity are nodes in a non-terrestrial network (NTN).

Aspect 48: A method for wireless communications at a UE, comprising: receiving, from a network entity, an indication of a second bandwidth part of a plurality of bandwidth parts, each bandwidth part of the plurality of bandwidth parts associated with at least one of location information and timing information, the location information corresponding to a location of the UE with respect to the network entity; switching from a first bandwidth part to the second bandwidth part based at least in part on the location information and the timing information; and communicating with the network entity using a beam of a set of one or more beams, the beam corresponding to the second bandwidth part.

Aspect 49: The method of aspect 48, wherein the set of one or more beams is a sequence of beams.

Aspect 50: The method of aspect 49, further comprising: mapping each beam in the sequence of beams to a corresponding bandwidth part.

Aspect 51: A method for wireless communications at a network entity, comprising: transmitting, to a UE, an indication of a second bandwidth part of a plurality of bandwidth parts, each bandwidth part of the plurality of bandwidth parts associated with at least one of location information and timing information, the location information corresponding to a location of the UE with respect to the network entity; switching from a first bandwidth part to the second bandwidth part based at least in part on the location information and the timing information; and communicating with the UE using a beam of a set of one or more beams, the beam corresponding to the second bandwidth part.

Aspect 52: The method of aspect 51, wherein the set of one or more beams is a sequence of beams.

Aspect 53: The method of aspect 52, further comprising: mapping each beam in the sequence of beams to a corresponding bandwidth part.

Aspect 54: An apparatus for wireless communications at a UE, comprising a processor; and memory coupled to the processor, the processor and memory configured to cause the apparatus to perform a method of any of aspects 1 through 18.

Aspect 55: An apparatus for wireless communications at a UE, comprising at least one means for performing a method of any of aspects 1 through 18.

Aspect 56: A non-transitory computer-readable medium storing code for wireless communications at a UE, the code comprising instructions executable by a processor to perform a method of any of aspects 1 through 18.

Aspect 57: An apparatus for wireless communications at a UE, comprising a processor; and memory coupled to the processor, the processor and memory configured to cause the apparatus to perform a method of any of aspects 19 through 25.

Aspect 58: An apparatus for wireless communications at a UE, comprising at least one means for performing a method of any of aspects 19 through 25.

Aspect 59: A non-transitory computer-readable medium storing code for wireless communications at a UE, the code comprising instructions executable by a processor to perform a method of any of aspects 19 through 25.

Aspect 60: An apparatus for wireless communications at a network entity, comprising a processor; and memory coupled to the processor, the processor and memory configured to cause the apparatus to perform a method of any of aspects 26 through 39.

Aspect 61: An apparatus for wireless communications at a network entity, comprising at least one means for performing a method of any of aspects 26 through 39.

Aspect 62: A non-transitory computer-readable medium storing code for wireless communications at a network entity, the code comprising instructions executable by a processor to perform a method of any of aspects 26 through 39.

Aspect 63: An apparatus for wireless communications at a network entity, comprising a processor; and memory coupled to the processor, the processor and memory configured to cause the apparatus to perform a method of any of aspects 40 through 47.

Aspect 64: An apparatus for wireless communications at a network entity, comprising at least one means for performing a method of any of aspects 40 through 47.

Aspect 65: A non-transitory computer-readable medium storing code for wireless communications at a network entity, the code comprising instructions executable by a processor to perform a method of any of aspects 40 through 47.

Aspect 66: An apparatus for wireless communications at a UE, comprising a processor; and memory coupled to the processor, the processor and memory configured to cause the apparatus to perform a method of any of aspects 48 through 50.

Aspect 67: An apparatus for wireless communications at a UE, comprising at least one means for performing a method of any of aspects 48 through 50.

Aspect 68: A non-transitory computer-readable medium storing code for wireless communications at a UE, the code comprising instructions executable by a processor to perform a method of any of aspects 48 through 50.

Aspect 69: An apparatus for wireless communications at a network entity, comprising a processor; and memory coupled to the processor, the processor and memory configured to cause the apparatus to perform a method of any of aspects 51 through 53.

Aspect 70: An apparatus for wireless communications at a network entity, comprising at least one means for performing a method of any of aspects 51 through 53.

Aspect 71: A non-transitory computer-readable medium storing code for wireless communications at a network entity, the code comprising instructions executable by a processor to perform a method of any of aspects 51 through 53.

Aspect 1: A method for wireless communications at a user equipment (UE), comprising: determining an inactivity timer associated with a first set of one or more beams used for communicating with a network entity has expired; identifying location information corresponding to a location of the UE with respect to the network entity; identifying beam geometry information for one or more beams associated with the network entity; processing the location information and the beam geometry information to identify a second set of one or more beams based at least in part on the expired inactivity timer, the second set of one or more beams different from the first set of one or more beams; and communicating with the network entity according to the second set of one or more beams.

Aspect 2: The method of Aspect 1, further comprising: receiving, from the network entity, an indication of the beam geometry information for the one or more beams associated with the network entity.

Aspect 3: The method of Aspect 1 or 2, further comprising: determining a set of coordinates corresponding to the location of the UE, wherein the location information comprises the set of coordinates; and transmitting, to the network entity, an indication of the determined set of coordinates.

Aspect 4: The method of any of Aspects 1 to 3, wherein the beam geometry information is associated with the first set of one or more beams.

Aspect 5: The method of any of Aspects 1 to 4, further comprising: determining a set of coordinates corresponding to the location of the UE, wherein the location information comprises the set of coordinates; and determining an identifier associated with the network entity, the identifier comprising information associated with the beam geometry information for the one or more beams associated with the network entity, wherein identifying the second set of one or more beams is based at least in part on the set of coordinates and the identifier.

Aspect 6: The method of any of Aspects 1 to 5, wherein the second set of one or more beams comprises a plurality of beam tuples, each beam tuple of the plurality of beam tuples comprising a subset of the second set of one or more beams and each beam tuple associated with a time interval during which the UE is communicating with the network entity using the beam tuple.

Aspect 7: The method of any of Aspects 1 to 6, further comprising: receiving, from the network entity, an indication of the second set of one or more beams.

Aspect 8: The method of any of Aspects 1 to 7, further comprising: transmitting, to the network entity, an indication of the second set of one or more beams; and receiving a feedback message corresponding to the indication.

Aspect 9: The method of any of Aspects 1 to 8, the communicating with the network entity comprises: performing a beam switching operation from the first set of one or more beams to the second set of one or more beams.

Aspect 10: The method of any of Aspects 1 to 9, further comprising: switching to one or more bandwidth parts associated with the second set of one or more beams.

Aspect 11: The method of any of Aspects 1 to 10, the identifying the second set of one or more beams comprises: identifying one or more resources associated with the second set of one or more beams, the one or more resources allocated for a scheduling request; monitoring a downlink control channel using one or more bandwidth parts associated with the second set of one or more beams for the one or more resources; and transmitting, to the network entity, the scheduling request based at least in part on the monitoring.

Aspect 12: The method of any of Aspects 1 to 10, the identifying the second set of one or more beams comprises: receiving, from the network entity, an indication of a random access preamble and a random access occasion associated with a contention free random access procedure; and performing the contention free random access procedure according to the random access preamble and the random access occasion.

Aspect 13: The method of any of Aspects 1 to 10, the identifying the second set of one or more beams comprises: performing a contention based random access procedure for at least one beam of the second set of one or more beams.

Aspect 14: The method of any of Aspects 1 to 13, the identifying the beam geometry information for the one or more beams associated with the network entity comprises: identifying the beam geometry information as a function of time.

Aspect 15: The method of any of Aspects 1 to 14, wherein the beam geometry information comprises a shape, a size, a velocity, an angular width, or a combination associated with the one or more beams.

Aspect 16: The method of any of Aspects 1 to 15, further comprising: calculating one or more parameters associated with the beam geometry information based at least in part on an altitude of the network entity, a speed of the network entity, a direction of the one or more beams, an angular width of the one or more beams or a combination thereof.

Aspect 17: The method of any of Aspects 1 to 16, wherein the UE and the network entity are nodes in a non-terrestrial network (NTN).

Aspect 18: A method for wireless communications at a user equipment (UE), comprising: determining an inactivity timer associated with a first set of one or more beams used for communicating with a network entity has expired; receiving, from the network entity, an indication of a second set of one or more beams based at least in part on the expired inactivity timer, the second set of one or more beams different from the first set of one or more beams; and communicating with the network entity according to the second set of one or more beams.

Aspect 19: The method of Aspect 18, further comprising: identifying location information corresponding to a location of the UE with respect to the network entity; and transmitting, to the network entity, the location information.

Aspect 20: The method of Aspect 18 or 19, wherein the location information comprises a set of coordinates.

Aspect 21: The method of any of Aspects 18 to 20, the communicating with the network entity comprises: performing a beam switching operation from the first set of one or more beams to the second set of one or more beams.

Aspect 22: The method of any of Aspects 18 to 21, further comprising: switching to one or more bandwidth parts associated with the second set of one or more beams.

Aspect 23: The method of any of Aspects 18 to 22, wherein the UE and the network entity are nodes in a non-terrestrial network (NTN).

Aspect 24: A method for wireless communications at a network entity, comprising: transmitting, to a user equipment (UE), a message via a first set of one or more beams; identifying location information corresponding to a location of the UE with respect to the network entity; determining beam geometry information for one or more beams associated with the network entity; transmitting, to the UE, an indication of the determined beam geometry information; and communicating with the UE according to a second set of one or more beams, the second set of one or more beams different from the first set of one or more beams.

Aspect 25: The method of Aspect 24, the determining the beam geometry information comprises: receiving, from the UE, an indication of the location information corresponding to the location of the UE with respect to the network entity.

Aspect 26: The method of Aspect 24 or 25, further comprising: receiving, from the UE, an indication of a set of coordinates corresponding to the location of the UE.

Aspect 27: The method of any of Aspects 24 to 26, wherein the beam geometry information is associated with the first set of one or more beams.

Aspect 28: The method of any of Aspects 24 to 27, further comprising: identifying the second set of one or more beams based at least in part on the location information; and transmitting, to the UE, an indication of the second set of one or more beams.

Aspect 29: The method of any of Aspects 24 to 28, wherein the second set of one or more beams comprises a plurality of beam tuples, each beam tuple of the plurality of beam tuples comprising a subset of the second set of one or more beams and each beam tuple associated with a time interval during which the UE is communicating with the network entity using the beam tuple.

Aspect 30: The method of any of Aspects 24 to 29, further comprising: receiving, from the UE, an indication of the second set of one or more beams; and transmitting a feedback message based at least in part on the received indication.

Aspect 31: The method of any of Aspects 24 to 30, further comprising: transmitting, to the UE, an indication of one or more resources associated with the second set of one or more beams, the one or more resources allocated for a scheduling request; and receiving, from the UE, the scheduling request during the one or more resources.

Aspect 32: The method of any of Aspects 24 to 31, further comprising: transmitting, to the UE, an indication of a random access preamble and a random access occasion associated with a contention free random access procedure.

Aspect 33: The method of any of Aspects 24 to 32, the determining the beam geometry information for the one or more beams associated with the network entity comprises: identifying the beam geometry information as a function of time.

Aspect 34: The method of any of Aspects 24 to 33, wherein the beam geometry information comprises a shape, a size, a velocity, an angular width, or a combination associated with the one or more beams.

Aspect 35: The method of any of Aspects 24 to 33, further comprising: calculating one or more parameters associated with the beam geometry information based at least in part on an altitude of the network entity, a speed of the network entity, a direction of the one or more beams, an angular width of the one or more beams or a combination thereof.

Aspect 36: The method of any of Aspects 24 to 35, wherein the UE and the network entity are nodes in a non-terrestrial network (NTN).

Aspect 37: A method for wireless communications at a network entity, comprising: determining an inactivity timer associated with a first set of one or more beams used for communicating with a user equipment (UE) has expired; transmitting, to the UE, an indication of a second set of one or more beams based at least in part on the expired inactivity timer, the second set of one or more beams different from the first set of one or more beams; and communicating with the UE according to the second set of one or more beams.

Aspect 38: The method of Aspect 37, further comprising: receiving, from the UE, location information corresponding to a location of the UE with respect to the network entity; and determining the second set of one or more beams based at least in part on the location information.

Aspect 39: The method of Aspect 37 or 38, wherein the location information comprises a set of coordinates.

Aspect 40: The method of any of Aspects 37 to 39, further comprising: determining the second set of one or more beams based at least in part on the first set of one or more beams.

Aspect 41: The method of any of Aspects 37 to 40, the communicating with the network entity comprises: performing a beam switching operation from the first set of one or more beams to the second set of one or more beams.

Aspect 42: The method of any of Aspects 37 to 41, further comprising: switching to one or more bandwidth parts associated with the second set of one or more beams.

Aspect 43: The method of any of Aspects 37 to 42, wherein the UE and the network entity are nodes in a non-terrestrial network (NTN).

Aspect 44: An apparatus for wireless communications comprising a processor; and memory coupled to the processor, the processor and memory configured to perform a method of any of Aspects 1 to 17.

Aspect 45: An apparatus for wireless communications comprising a processor; and memory coupled to the processor, the processor and memory configured to perform a method of any of Aspects 18 to 23.

Aspect 46: An apparatus for wireless communications comprising a processor; and memory coupled to the processor, the processor and memory configured to perform a method of any of Aspects 24 to 36.

Aspect 47: An apparatus for wireless communications comprising a processor; and memory coupled to the processor, the processor and memory configured to perform a method of any of Aspects 37 to 42.

Aspect 48: An apparatus comprising at least one means for performing a method of any of Aspects 1 to 17.

Aspect 49: An apparatus comprising at least one means for performing a method of any of Aspects 18 to 23.

Aspect 50: An apparatus comprising at least one means for performing a method of any of Aspects 24 to 36.

Aspect 51: An apparatus comprising at least one means for performing a method of any of Aspects 37 to 42.

Aspect 52: A non-transitory computer-readable medium storing code for wireless communications, the code comprising instructions executable by a processor to perform a method of any of Aspects 1 to 17.

Aspect 53: A non-transitory computer-readable medium storing code for wireless communications, the code comprising instructions executable by a processor to perform a method of any of Aspects 18 to 23.

Aspect 54: A non-transitory computer-readable medium storing code for wireless communications, the code comprising instructions executable by a processor to perform a method of any of Aspects 24 to 36.

Aspect 55: A non-transitory computer-readable medium storing code for wireless communications, the code comprising instructions executable by a processor to perform a method of any of Aspects 37 to 42.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
      receive an indication of a sequence of a plurality of default bandwidth parts;
      communicate according to a first bandwidth part, the first bandwidth part associated with a first beam, wherein, for the communication according to the first bandwidth part, an inactivity timer is associated with a first default bandwidth part of the plurality of default bandwidth parts; and
      communicate, upon expiration of the inactivity timer, according to a second default bandwidth part of the plurality of default bandwidth parts based at least in part on beam geometry information associated with one or more beams including the first beam.

2. The apparatus of claim 1, wherein the one or more processors are configured to cause the UE to:
receive the beam geometry information; and
determine the one or more beams based at least in part on the beam geometry information, the one or more beams corresponding to one or more coverage areas associated with the beam geometry information along a trajectory of the UE relative to a network entity.

3. The apparatus of claim 2, wherein the one or more processors are configured to cause the UE to determine the one or more beams based at least in part on location information corresponding to a location of the UE with respect to the network entity in combination with the beam geometry information.

4. The apparatus of claim 1, wherein the beam geometry information comprises a shape, a size, a velocity, an angular width, or a combination thereof associated with the one or more beams.

5. The apparatus of claim 1, wherein, for the communication according to the second default bandwidth part, the one or more processors are configured to cause the UE to:
perform a beam switching operation from the first beam to one or more second beams.

6. The apparatus of claim 5, wherein the second default bandwidth part is associated with the one or more second beams.

7. The apparatus of claim 1, wherein the UE and a network entity are nodes in a non-terrestrial network (NTN).

8. An apparatus for wireless communication at a network entity, comprising:
one or more memories; and
one or more processors coupled with the one or more memories and configured to cause the network entity to:
transmit an indication of a sequence of a plurality of default bandwidth parts;
communicate according to a first bandwidth part, the first bandwidth part associated with a first beam, wherein, for the communication according to the first bandwidth part, an inactivity timer is associated with a first default bandwidth part; and
communicate, upon expiration of the inactivity timer, according to a second default bandwidth part of the plurality of default bandwidth parts based at least in part on beam geometry information associated with one or more beams including the first beam.

9. The apparatus of claim 8, wherein the one or more processors are configured to cause the network entity to:
determine the beam geometry information for the one or more beams based at least in part on the first beam or location information corresponding to a location of a user equipment (UE); and
transmit the beam geometry information.

10. The apparatus of claim 8, wherein the one or more processors are configured to cause the network entity to:
determine the one or more beams based at least in part on the first beam or location information corresponding to a location of a user equipment (UE), the one or more beams corresponding to one or more coverage areas associated with the beam geometry information along a trajectory of the UE relative to the network entity.

11. The apparatus of claim 8, wherein the beam geometry information comprises a shape, a size, a velocity, an angular width, or a combination thereof associated with the one or more beams.

12. The apparatus of claim 8, wherein the second default bandwidth part is associated with one or more second beams.

13. The apparatus of claim 8, wherein a user equipment (UE) and the network entity are nodes in a non-terrestrial network (NTN).

14. A method for wireless communications at a user equipment (UE), comprising:
receiving an indication of a sequence of a plurality of default bandwidth parts;
communicating according to a first bandwidth part, the first bandwidth part associated with a first beam, wherein, for the communication according to the first bandwidth part, an inactivity timer is associated with a first default bandwidth part of the plurality of default bandwidth parts; and
communicating, upon expiration of the inactivity timer, according to a second default bandwidth part of the plurality of default bandwidth parts based at least in part on beam geometry information associated with one or more beams including the first beam.

15. The method of claim 14, further comprising:
receiving the beam geometry information; and
determining the one or more beams based at least in part on the beam geometry information, the one or more beams corresponding to one or more coverage areas associated with the beam geometry information along a trajectory of the UE relative to a network entity.

16. The method of claim 15, further comprising:
determining the one or more beams based at least in part on location information corresponding to a location of the UE with respect to the network entity in combination with the beam geometry information.

17. A method for wireless communications at a network entity, comprising:
transmitting an indication of a sequence of a plurality of default bandwidth parts;
communicating according to a first bandwidth part, the first bandwidth part associated with a first beam, wherein, for the communication according to the first bandwidth part, an inactivity timer is associated with a first default bandwidth part; and
communicating, upon expiration of the inactivity timer, according to a second default bandwidth part of the plurality of default bandwidth parts based at least in part on beam geometry information associated with one or more beams including the first beam.

18. The method of claim 17, further comprising:
determining the beam geometry information for the one or more beams based at least in part on the first beam or location information corresponding to a location of a user equipment (UE); and
transmitting the beam geometry information.

19. The method of claim 17, further comprising:
determining the one or more beams based at least in part on the first beam or location information corresponding to a location of a user equipment (UE), the one or more beams corresponding to one or more coverage areas associated with the beam geometry information along a trajectory of the UE relative to the network entity.

* * * * *